(12) United States Patent  
Rekimoto et al.

(10) Patent No.: US 6,795,060 B2
(45) Date of Patent: Sep. 21, 2004

(54) DATA INPUT/OUTPUT SYSTEM, DATA INPUT/OUTPUT METHOD, AND PROGRAM RECORDING MEDIUM

(75) Inventors: Junichi Rekimoto, Tokyo (JP); Haruo Oba, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 10/039,310

(22) Filed: Oct. 24, 2001

(65) Prior Publication Data

US 2002/0113778 A1 Aug. 22, 2002

(30) Foreign Application Priority Data

Oct. 25, 2000 (JP) ........................................ 2000-325223

(51) Int. Cl.[7] .............................................. G09G 5/00
(52) U.S. Cl. ...................................... 345/173; 345/179
(58) Field of Search .............................. 345/173, 174, 345/175, 176, 177, 178, 179; 178/18.01, 18.1

(56) References Cited

U.S. PATENT DOCUMENTS

| | | | |
|---|---|---|---|
| 6,040,825 A | * | 3/2000 | Yamamoto et al. ......... 345/173 |
| 6,160,540 A | * | 12/2000 | Fishkin et al. ............... 345/184 |
| 6,326,946 B1 | * | 12/2001 | Moran et al. ................ 345/156 |
| 6,369,805 B1 | * | 4/2002 | Kuzunuki et al. ........... 345/173 |
| 6,476,378 B2 | * | 11/2002 | Nougaret et al. ...... 250/227.11 |
| 6,545,660 B1 | * | 4/2003 | Shen et al. .................. 345/156 |
| 6,618,040 B1 | * | 9/2003 | Mattaway et al. .......... 345/173 |
| 2002/0140682 A1 | * | 10/2002 | Brown et al. ................ 345/173 |

* cited by examiner

*Primary Examiner*—Xiao Wu
(74) *Attorney, Agent, or Firm*—Frommer Lawrence & Haug LLP; William S. Frommer

(57) ABSTRACT

An interactive-type data system comprising an integration of instinctive operability of the real objects with multiple purpose functions is disclosed. Concretely, by utilizing a transparent tile incorporating a wireless tag as a unit of interface, a plurality of tiles are disposed on a flat display surface or a tablet. The computing system reads identification data contained in each wireless tag and then activates a corresponding processing operation. For example, the computing system accesses such data resources related to tiles or activates a corresponding function or application program. Further, based on physical positional relationship between plural tiles, it is possible to integrally combine basic capability provided for by individual tiles.

11 Claims, 39 Drawing Sheets

FIG. 2
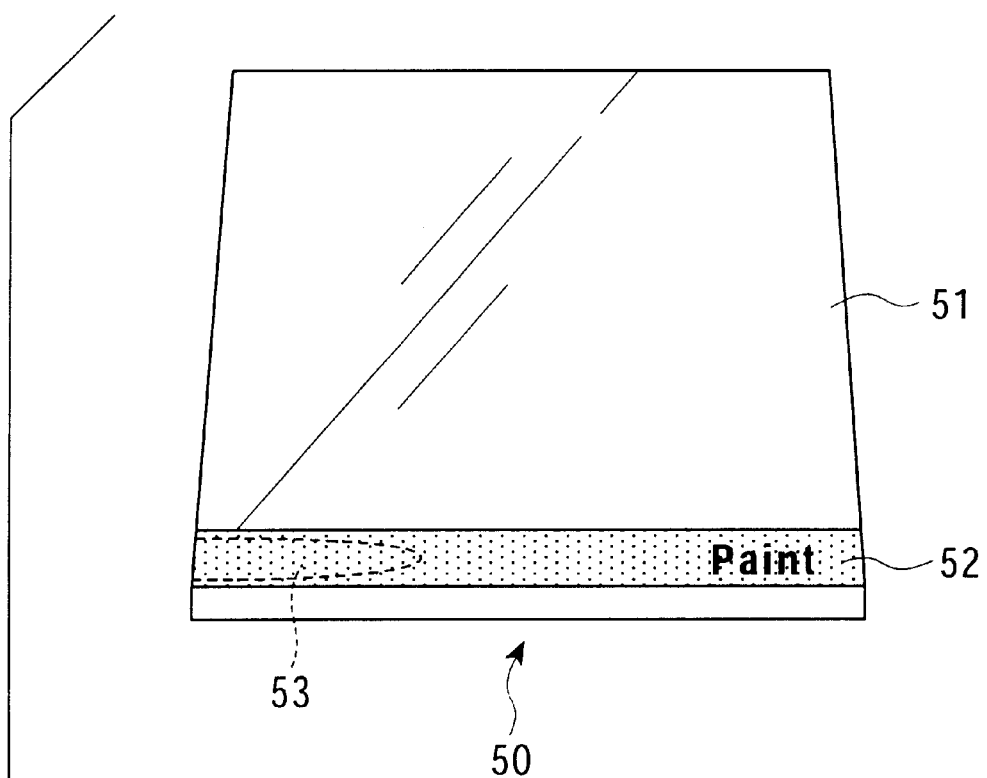
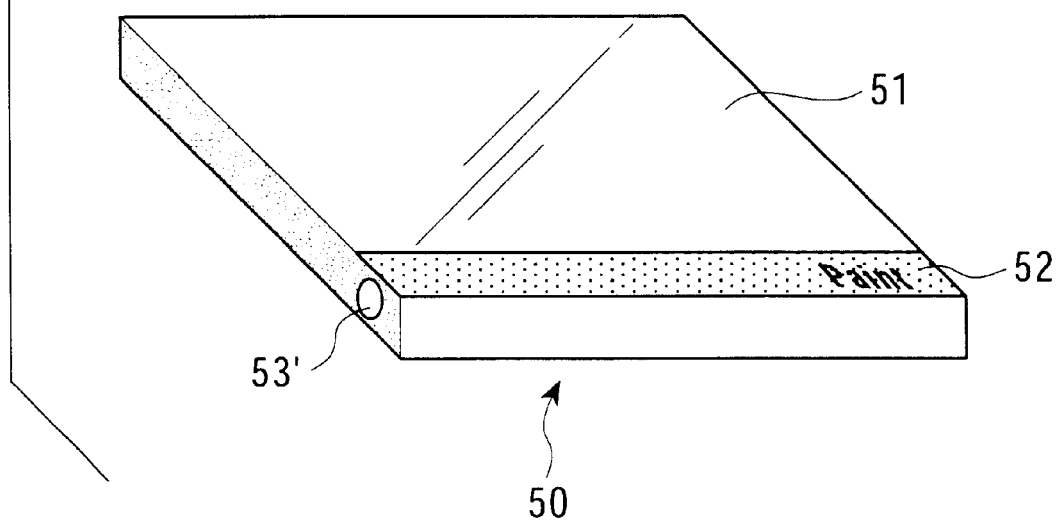

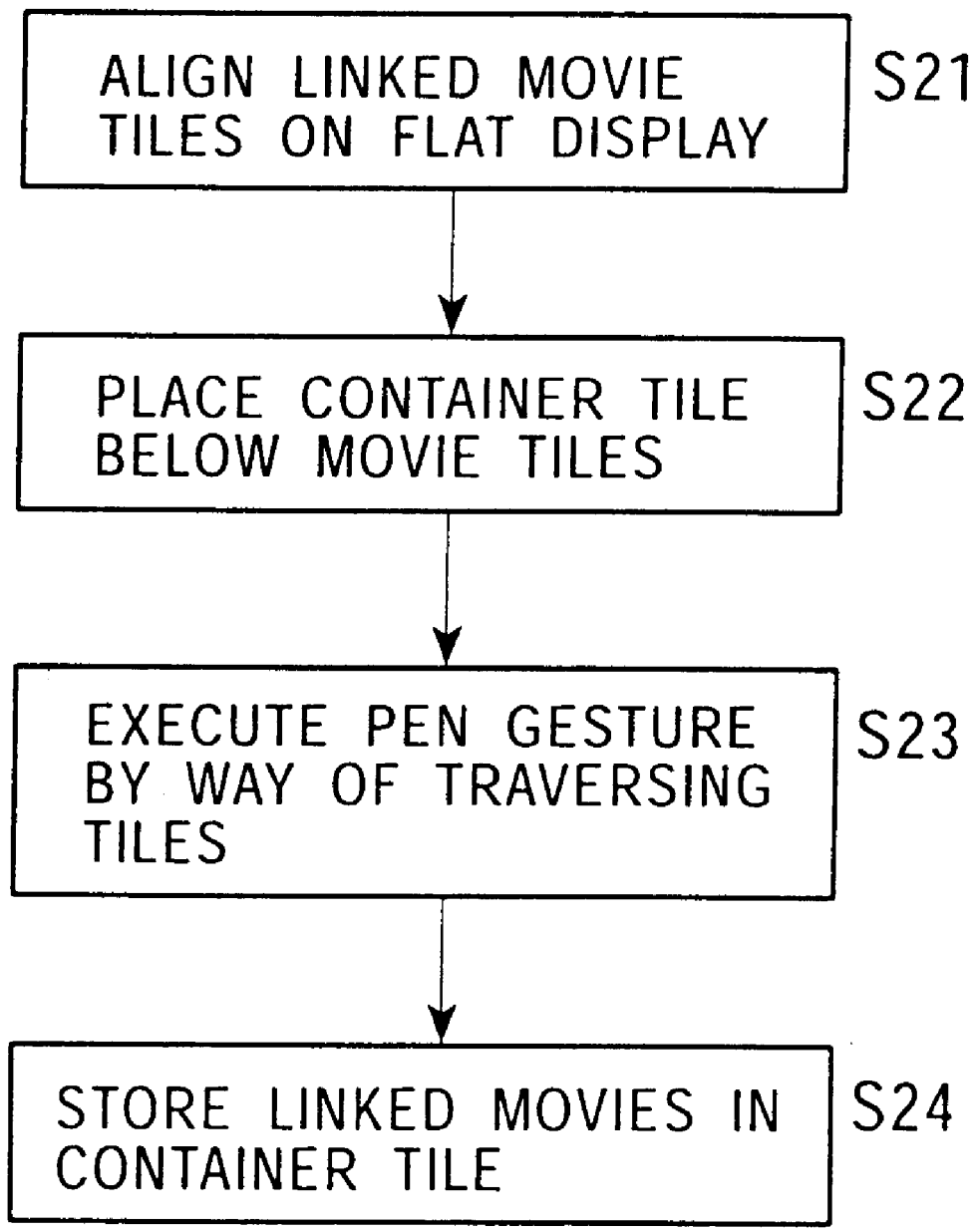

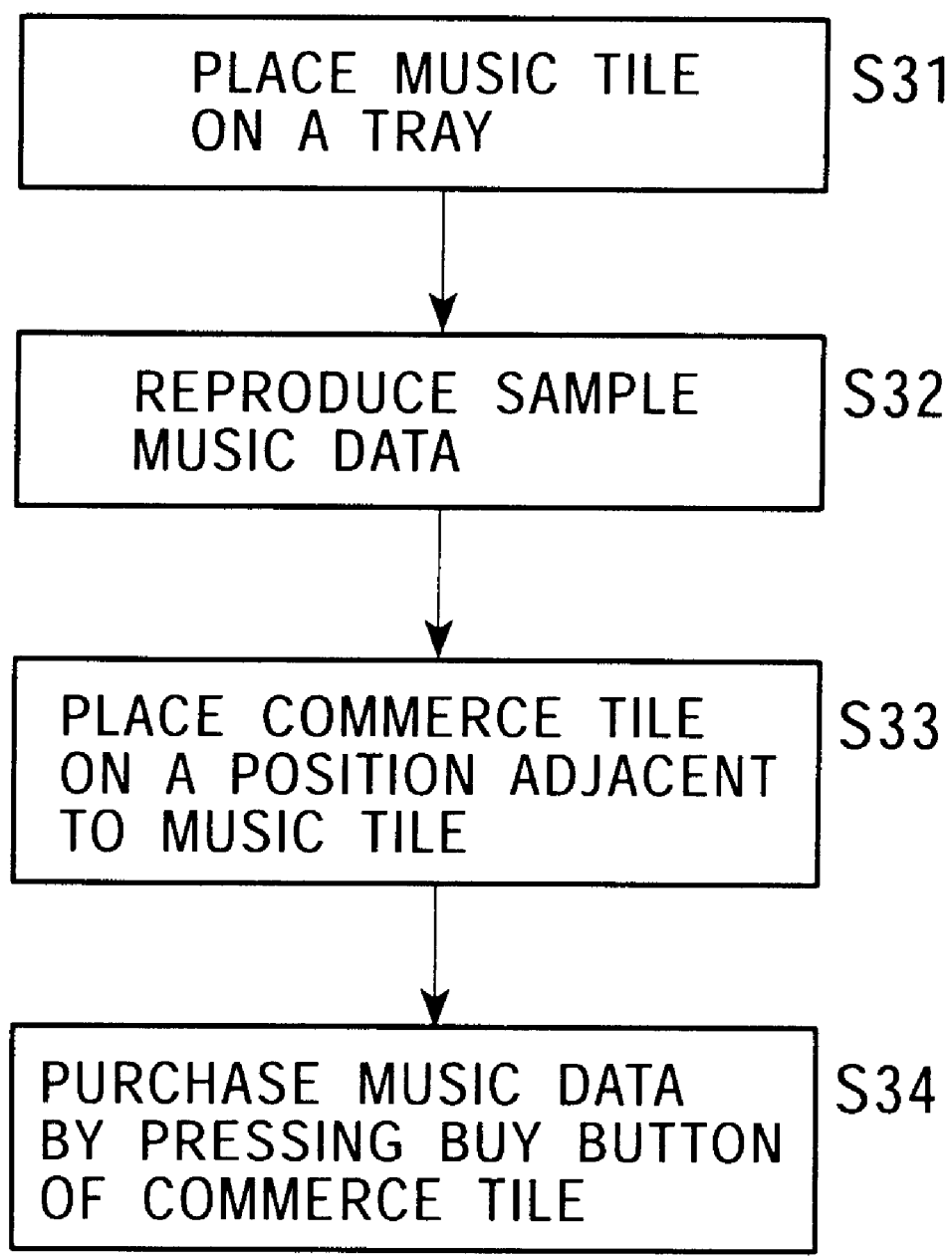

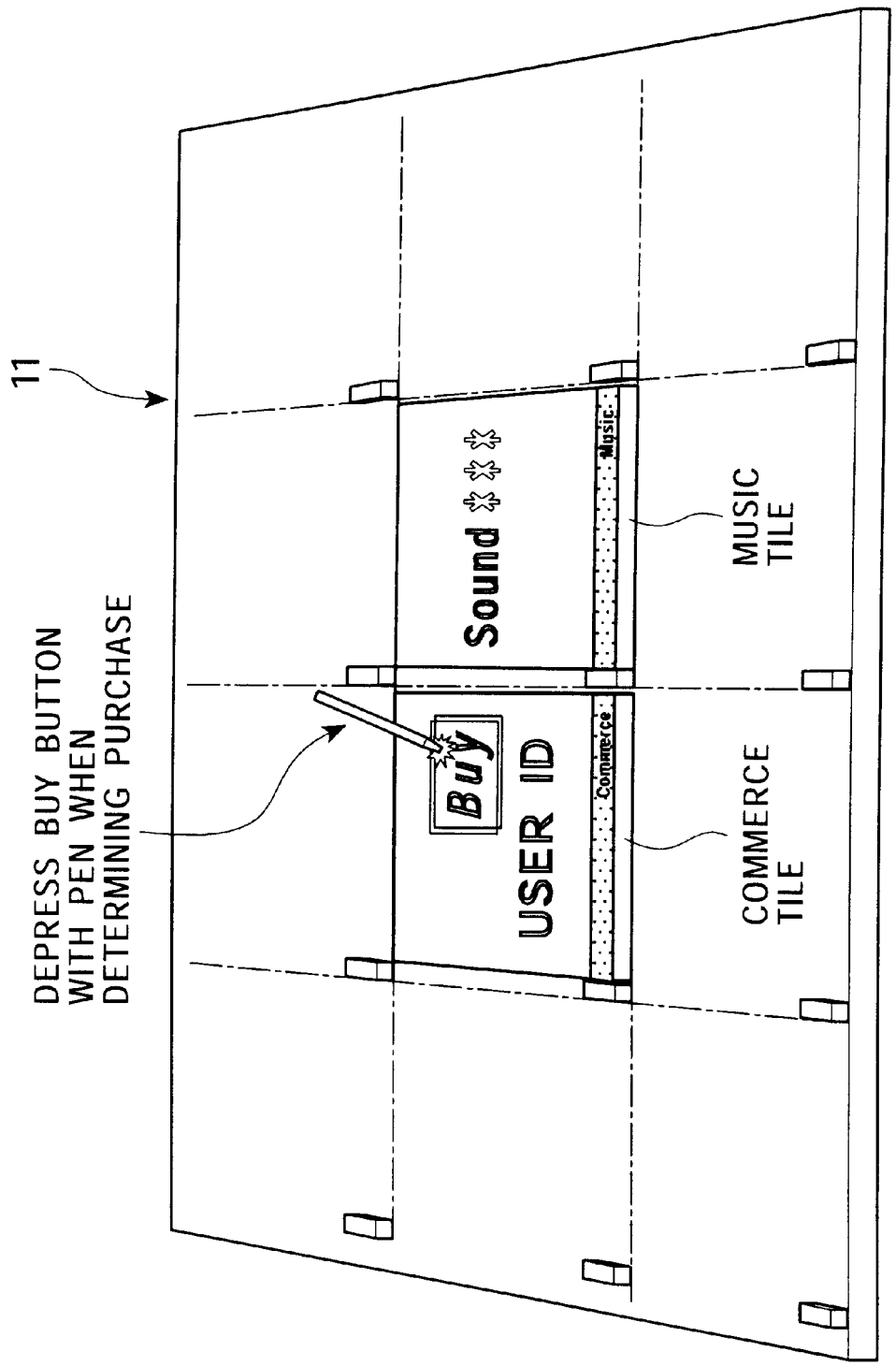

DATA INPUT/OUTPUT SYSTEM, DATA INPUT/OUTPUT METHOD, AND PROGRAM RECORDING MEDIUM

CROSS REFERENCES TO RELATED APPLICATIONS

The present invention claims priority to priority document no. 2000-325223 filed in Japan on Oct. 25, 2000, and incorporated by reference herein.

BACKGROUND OF THE INVENTION

1. Field of the Invention

The present invention relates to a user interface for executing an operation of object and a command input operation against a computer. In particular, the present invention relates to such user interface capable of instinctively and intelligibly executing an operation of object and a command input operation.

More particularly, the present invention relates to such a proposal pertaining to a user interface environment which instinctively and intelligibly expresses a set of operations by harmonizing a physical interface existing in a real space and a visual interface such as display for displaying a logical space of each computer. In particular, the present invention relates to such a proposal pertaining to a user interface environment capable of easily executing operation for linking mutually a plurality of apparatuses such as a data exchanging operation among these apparatuses.

2. Description of the Prior Art

Along with progress of technological innovation in recent years, a wide variety of general-purpose computer systems incorporating high value-added and highly sophisticated functions called work-stations or personal computers have thus been developed and commercially promoted in market with relatively small size and low price. Actually, these computer systems have widely been promoted in universities, research institutions, business enterprises, offices, and even in daily life of individual homes.

Generally, any of computer systems is driven in response to a command input by a user and provides an interactive processing environment by way of displaying the processed result on a display screen. Recently, it is noted that such a character-based user input environment called a CUI (Character User Interface) via a conventional keyboard represented by a DOS (Disk Operating System) shell screen has been shifted to a GUI (Graphical User Interface) that has realized a graphic-based user input operation. Under the GUI environment, such a desk-top with a simulated computer system and an innumerable number of icons are prepared on a display screen.

All of resource objects dealt in a computer system such as files are expressed as icons on a GUI-oriented desk top. By way of directly giving operation (such as click or drag and drop) to a display object on the screen to the icons individually symbolizing specific programs, data, folders, and devices, on the display screen via mouse operation, a user can instinctively operate a computer. In addition, a variety of functions such as menu bars and tool boxes, i.e., a variety of buttons for instantaneously activating every computer processing operation are prepared on the desk top. Accordingly, a style of the command input has become more intelligible for a user by intuition.

Owing to the introduction of the above mentioned GUI environment, a user is enabled to fully operate a computer without specifically learning titles of a specific command and how to use the command, and yet, without executing complex key input operations.

Typically, those coordinate-indicating devices such as a mouse, a track ball, a joy stick, a tablet, or a touch pad are cited as a user input devices operable under the GUI environment. Of these, the mouse has widely been propagated in the computer field, and accordingly, most of computer users are well accustomed to mouse operation based on the drag and drop operation. When newly introducing a computer to business offices or homes, it is not exaggeration to mention that there is no more need to specifically train users how to operate the mouse. As a matter of fact, the GUI based on the mouse operation has already been rooted among many users by way of providing them with a variety of general-purpose functions.

Further, in recent years, as an interactive input/output method in dealing with a computer and other data processing systems, study on interface via the real object has been propagated [refer to annotations 1, 2, 3, and 4].

According to such an interface utilizing the real object, unlike such a basic GUI operating method based on picture information via display output and a general-purpose input device such as a mouse, it is possible to extract such sophisticated function for dealing with real objects properly owned by the human being, and thus, there is such a possibility of utilizing the above interface for computer processing operation.

For example, it is possible for the above interface to quickly operate a plurality of real objects with both hands. Further, by virtue of real affordance [refer to annotation 5] from an real object, it is possible to constitute a more intelligible and intimate interface.

On the other hand, versatility and variableness provided by the GUI will be lost by the introduction of an real object as a means for implementing the user interface. It is relatively difficult to convert use of an real object designed for a specific object, i.e., any physical object, into another object such as computer processing operation. Most of such interface systems thus far proposed have been designed for specific uses, and actually, nothing have been designed to function as general-purpose platforms like the GUI.

Further, in recent years, there is a growing tendency in which interactive means for dealing with a computer or a data network has been shifted from PCs (Personal Computer) to information handling appliances. In other words, instead of executing all the works on a desk top of one computer, there is such a tendency in which users more frequently utilize a wide variety of electric apparatuses such as computer related electronic appliances and mobile apparatuses. Many of these apparatuses incorporate limited number of functions than that of general-purpose computers adopting the GUI, and thus, these apparatuses can utilize more simplified interface. Accordingly, it is conceived that such a simple interface capable of supporting linkage among a number of computers (data exchange appliances) at homes and offices should be designed as urgently as possible.

On the other hand, when computer processes are dispersed to a number of apparatuses due to propagation of network services, it will become greater importance for the operation to execute process for mutually linking a plurality of relevant apparatuses in order to exchange data between individual apparatuses.

For example, in order to transmit data contents comprising video image shown on a TV set in a home to a friend via E-mail using a portable telephone or in order to share a memorandum written on a white board together with an optional picture in an office or project these data on a projection screen, it is necessary to provide such an interface capable of readily executing an operation for exchanging data. However, inasmuch as it is quite difficult to predict combination of those applicable apparatuses and transmission in the form of data in advance, it is desired that such a system capable of easily executing proper function on the part of end users shall be formed.

SUMMARY OF THE INVENTION

It is an aspect of the present invention to provide such a useful user interface environment capable of instinctively and intelligently expressing data by way of harmonizing such a physical interface present in real space with a visual interface such as display for displaying logical space of computers.

It is another aspect of the present invention to provide such a simple user interface environment for supporting mutual linkage between a number of computers (data processing apparatuses) in homes and offices.

It is a further aspect of the present invention to provide such a useful user interface environment capable of easily executing operations for mutually linking a plurality of data processing apparatuses for exchanging data between individual apparatuses.

The present invention has been consummated by way of considering the above-referred problems. The first aspect of the present invention provides such a data input and output system comprising the following: a visual interface comprising a substantially flat operating surface for allowing installation of a physical interface and display function for displaying data on the operating surface; an identifying means for identifying the physical interface installed on the operating surface; and a data processing means for executing data processing operation in correspondence with identified result drawn by the identifying means and externally displaying processed result on the visual interface.

It should be understood that the term "system" specified above refers to logical assemblage of a plurality of apparatuses (or such functional modules for realizing specific functions) without particularly questioning whether individual apparatuses and functional modules are installed within a single cubic casing or not.

Preferably, the above-referred physical interface comprises a substantially flat transparent structure, which comprises the following: a transparent area for allowing data displayed on the back-surface side of the transparent structure to be permeable onto the front-surface side; a property data displaying area which is disposed in part of the back surface or the front surface in order to display property data of the physical interface; and an identification data storing means which is buried in the transparent structure in order to sustain proper identification data.

In the practical form for implementing the present invention to be described later on, the above-referred physical interface is called a "tile" which is disposed on a flat operating surface.

The identification data storing means is formed in the name of "wireless tag" for example, which, in response to the reception of waves having a specific modulated frequency, returns AM-modulated waves corresponding to a proper identification data for example. In this case, an identifying means on the part of the data input and output system identifies proper data of the physical interface, i.e., the tile, based on so-called electro-magnetic transmission and reception method.

The inventive visual interface comprises a flat display such as a liquid crystal display for example. Preferably, the inventive visual interface comprises such a flat display surface integrated with a digitizer capable of reading pen input data via operational surface of the visual interface and the inventive physical interface disposed on the operational surface of the visual interface.

In this case, the above-referred data processing means executes a data processing operation in correspondence with combination of identification data held by the corresponding physical interface disposed on the operational surface and the pen input data added to the physical interface.

A plurality of physical interfaces may be disposed on the visual interface. Further, it is also possible for the data processing means to execute such a data processing operation in correspondence with combination of identification data held by two or more than two of the physical interfaces disposed on the operational surface of the visual interface.

Further, it is also possible for the data processing means to execute such a data processing operation in correspondence with combination of identification data held by two or more than two of the physical interfaces disposed on the operational surface of the visual interface and pen input data added to the physical interfaces.

Further, it is also possible for the data processing means to execute processing operations assigned to a specific identification data in response to the result of detecting the corresponding identification data from the corresponding physical interface disposed on the visual interface and then externally display the processed result onto the installed position of the corresponding physical interface in order that visual feedback can be effected.

Further, it is also possible for the data processing means to execute an application program assigned to a specific identification data in response to the result of detecting the corresponding identification data from the corresponding physical interface disposed on the operational surface of the visual interface and then externally display the result of executing the corresponding application program onto the installed position of the corresponding physical interface in order that visual feedback can be effected.

The inventive data input/output system may further comprise such a communication means for accessing external data resources. In this case, in response to the result of detecting a specific identifying data from any of the physical interfaces disposed on the operational surface of the visual interface, it is possible for the data processing means to access data resources assigned to the identification data and then externally display the acquired data onto the installed position of the corresponding physical interface in order that visual feedback can be effected.

Further, it is also possible for the data processing means to execute own linkage with real world physical object assigned to a specific identification data in response to the result of detecting the corresponding identification data from the corresponding physical interface disposed on the operational surface of the visual interface and then externally display data related to the corresponding physical object onto the installed position of the physical interface in order that visual feedback can be effected. For example, by way of feeding data from one of the physical interfaces onto another physical interface assigned to an real world physical object such as a printer, it is possible for the data processing means to output such a request against the printer for executing a printing operation.

Further, it is also possible for the data processing means to assign data held by one of the physical interfaces adjoining a specific physical interface to this specific physical interface in response to the result of detecting the corresponding identification data from one of the physical interfaces disposed on the operational surface of the visual interface and then externally display the assigned data onto the installed position of the corresponding physical interface in order that visual feedback can be effected. In this way, it is possible for the data processing means to transmit data received from other physical interfaces as though it acts as a container.

Further, it is also possible for the data processing means to assign data held by one of the physical interfaces adjoining a specific physical interface to remotely disposed physical interfaces related to this specific physical interface in response to the result of detecting the corresponding identification data from the corresponding physical interface disposed on the operational surface of the visual interface and then externally display the assigned data onto the position at which the remotely disposed physical interfaces are disposed. For example, by way of designating such a physical interface being the transmitter as the "master" and one of the physical interfaces being the transfer as the "slave", when another physical interface feeds data to the master physical interface, it is possible for the master physical interface to instantaneously and instinctively transfer this data to the slave physical interface.

Further, it is also possible for the data processing means to assign data stored in one of the physical interfaces to another physical interface in response to the pen input operation executed across two or more than two of the physical interfaces. Further, it is also possible to externally display the assigned data to the position at which the other physical interface is disposed so that visual feedback can be effected.

Concretely, according to the data input/output system related to the present invention, by way of applying such a transparent tile which buries an identification data storing means like a wireless tag as an individual interface unit, it is possible to construct such an easy and intelligible interactive technique based on the arrangement of the tile on a flat display or tablet surface. Further, in response to the set-up of the tiles, i.e., the physical interfaces, the data input/output system reads identification data contained in the wireless tag, and then activates the corresponding processing operation. For example, the data input and output system accesses such data resources related to the tiles and then activates the corresponding function and application program. Further, based on physical positional relationship between plural tiles, it is also possible to combine basic capacity provided by individual tiles.

The second aspect of the present invention provides a method of inputting and outputting data for realizing an interactive technique via operation of the physical interfaces on a visual interface comprising a substantially flat operational surface for accommodating a number of physical interfaces and display function for displaying data on the operational display surface. The inventive data input/output method comprises the following: an identifying step for identifying physical interfaces disposed on the operational display surface; and a data processing step for executing data processing operation corresponding to the result of identifying the physical interfaces executed via the above identifying step and an ensuing step of externally displaying the processed result on the visual interface.

The data input/output method according to the second aspect of the present invention may further comprise a digitizing step for reading pen input data shown via the operational surface of the visual interface and the physical interfaces disposed on the operational surface thereof.

In this case, the above data processing step executes a data processing operation in correspondence with combination of identification data held by the physical interfaces disposed on the operational surface and the pen input data added to the physical interfaces.

Further, the above data processing step may also execute a data processing operation in correspondence with combination of identification data held by two or more than two of the physical interfaces disposed on the operational panel or the data processing step may also execute such a data processing operation in correspondence with identification data held by two or more than two of the physical interfaces disposed on the operational panel and the pen input data added to the physical interfaces.

Further, the above data processing step may also execute such a data processing operation assigned to a specific identification data in response to the result of detecting the corresponding identification data from the physical interfaces disposed on the operational surface of the visual interface and then externally display the processed result onto the position at which the corresponding physical interface is disposed in order that visual feedback can be effected. The process assigned to the identification data comprises such an operation to access an application program and data resources and linkage with an real world physical object for example.

Further, the above data processing step may also execute such a process to assign data held by one of the physical interfaces adjoining another physical interface in response to the result of detecting the corresponding identification data from the corresponding physical interface disposed on the operational surface of the visual interface and then externally display the assigned data to the position at which the corresponding physical interface is disposed so that visual feedback can be effected.

Further, in response to the result of detecting any specific identification data from one of the physical interfaces disposed on the operational surface of the visual interface, the data processing step assigns data held by one of the physical interfaces adjoining the above physical interface to a remotely disposed physical interface related to the above physical interface, and then externally displays the assigned data at the position at which the remotely disposed physical interface is present, whereby effecting visual feedback.

Further, the data processing step may also execute such an operation to assign data stored in one of the physical interfaces to another physical interface in response to the act of adding a pen input operation across two or more than two of the physical interfaces disposed side by side on the operational surface of the visual interface. Further, it is also possible to externally display the assigned data to the position at which the assignee physical interface is disposed, whereby effecting visual feedback as well.

The third aspect of the present invention provides such a memory medium which physically stores a computer software based on the computer-readable format. The computer software describes such a data input/output process to be compatible with execution on a computer system. The data input/output process provides such an interactive technique via operation of the physical interfaces on the visual interface incorporating a substantially flat operational surface for accommodating the physical interfaces thereon and such display function for displaying data on the operational surface. The inventive computer software comprises the following: an identifying step for identifying physical interfaces disposed on the operational surface of the visual interface; and a data processing step for processing data in correspondence with the result of identifying the physical interfaces identified via the above identifying step and an ensuing step of externally displaying the processed result on the visual interface.

The computer-readable memory medium according to the third aspect of the present invention comprises such a medium which provides a general-purpose computer system capable of executing a variety of program codes for example with a computer program based on a specific computer-readable format. The above-referred medium comprises such a detachable and portable memory medium such as a compact disc, a floppy disc, or a magneto-optical disc, or the like, for example. It is also technically possible to provide a specific computer system with a computer program via a transmission medium such as a network service based on wireless transmission or cable transmission.

The above program memory medium defines structural or functional cooperative relationship between the computer program and the memory medium in order to realize proper function of a specific computer program on a computer system. In other words, by way of installing a specific computer program into a computer system via the program memory medium related to the third aspect of the present invention, cooperative action is exerted on the computer system, whereby making it possible to achieve such an operating effect similar to that is attainable via the above-referred data input/output system and the data input/output method according to the first and second aspects of the present invention.

Still further aspects, features, and advantages of the present invention will more fully be clarified by the following description based on the description of the preferred embodiments and the accompanying drawings.

BRIEF DESCRIPTION OF THE DRAWINGS

FIG. 2 designates a plan view and a perspective view of the tile 50 comprising a fundamental construction;

FIG. 37 designates a flowchart designating serial processes executed when data contents held by plural tiles are stored in a Container-Tile en bloc;

FIG. 38 designates a flowchart designating serial processes executed for purchasing data contents on the Data-Tile system via a Commerce-Tile; and FIG. 39 designates an aspect in which the Commerce-Tile is disposed at a position adjoining a Music-Tile.

DESCRIPTION OF THE PREFERRED EMBODIMENTS

Referring now to the accompanying drawings, practical embodiments of the present invention are described below.

A: Overall Construction of a Data-Tile System:

The present invention proposes a Data-Tile system as an interface platform system for harmonizing an real world physical interface with a visual interface provided by computer space for constituting one of practical embodiments of the present invention. In the Data-Tile system, the interface is constituted by way of disposing a transparent object (this will be referred to as a tile in the following description) attached with an ID tag capable of notifying identification data via a wireless means (this will be referred to as a wireless tag or an "RF-ID" in the following description) on a flat display surface.

Figure 1:
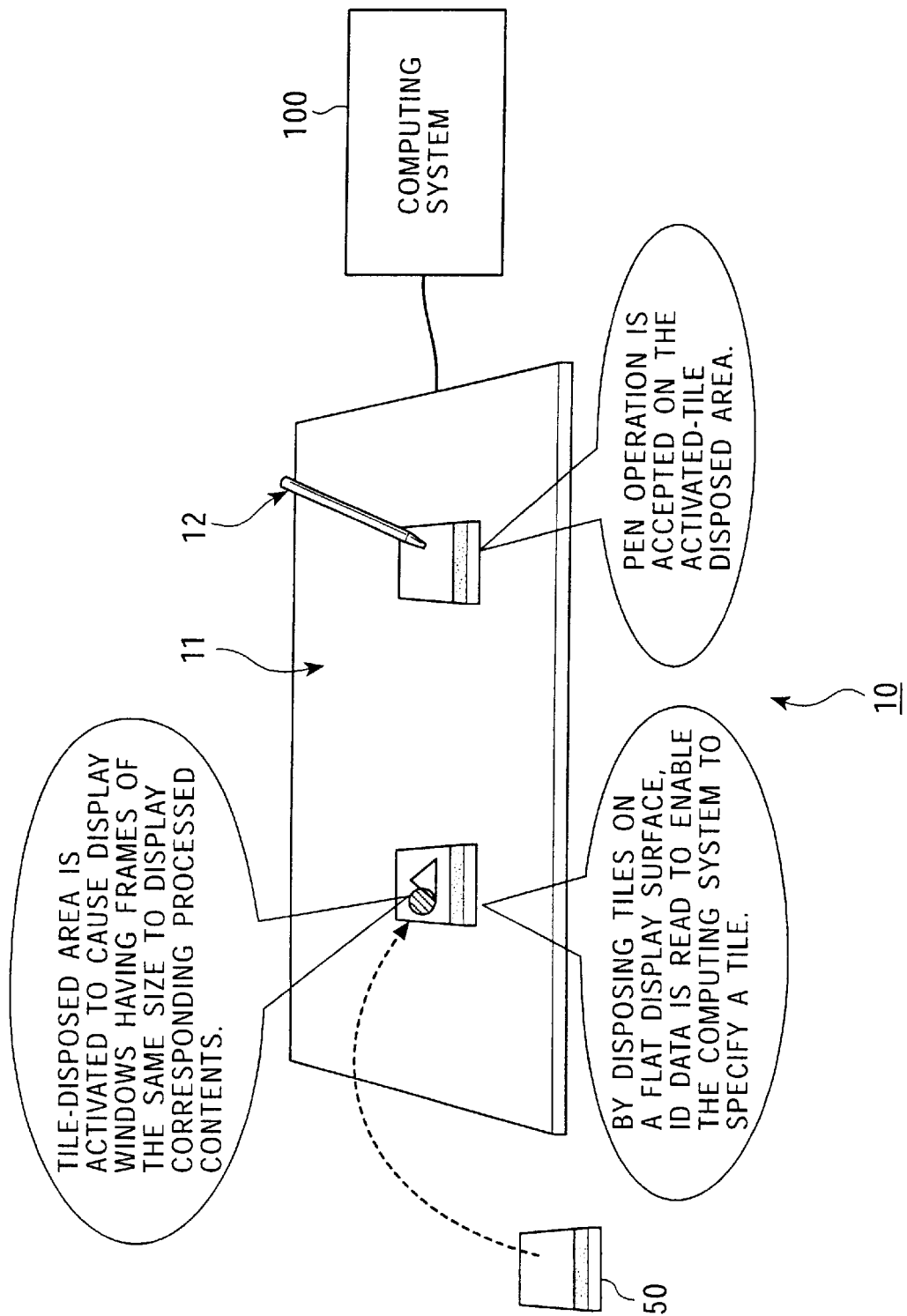
FIG. 1 designates an overall perspective view of the Data-Tile system according to an embodiment of the present invention.

A-1: Basic Construction of the Data-Tile System:

FIG. 1 designates an overall perspective view of the Data Tile system according to an aspect of the present invention. In order to read identification data from the disposed tiles, a plurality of reading elements are disposed on a flat display surface in latticed form at substantially equal intervals. Details of the reading elements will be described later on.

When an individual user sets the tiles on a flat display surface, initially, the system reads relevant identification data and then activates a corresponding process or such a process assigned to the identification data. The process may include such an operation to access data resources related to tiles (in this case, identification data may be related to a specific URL (Uniform Resource Locator) for example), or the process may include function or an application program. Actually, the process related to tiles corresponds to such a data processing operation executed on a computer system locally linked with a flat display surface (or the process related to tiles corresponds to such a data processing operation via cooperative action with a computer system through a network service).

Individual the tiles are made from transparent material such as acrylic resin, and thus, even when the tiles are disposed on a flat display surface, display contents are prevented from being shielded. Because of this, it is possible for the system side to provide such a display window having such a window frame corresponding to the positions of installed individual tiles and an outer frame thereof on the flat display surface via transparent areas of individual tiles.

Concretely, when a certain tile is placed on a certain position on the flat display surface, identification data proper to this tile and the disposed position thereof are identified. Accordingly, this leads to realization of such an interaction in which the tile setting area is activated to cause the processed contents assigned to the tile identification data to be displayed within the tile-setting area. Data owned by each tile comprising a transparent object remains static. However, by causing data assigned to the tile to be displayed via a display unit below the tile, it is possible to constitute such an interface with reinforced visual data. In this case, it is possible to cause physical interface in real space called a tile to be combined with a visual interface in computer space called a display on a flat display surface based on an instinctively intelligible form.

According to the Data Tile system of this invention shown in the accompanying drawings, a static object although physical is combined with a dynamic display data although virtual are able to be combined to utilize a variety of uses. Details of the actual utilization form will be described later on.

When a flat display is concurrently with such a tablet capable of accommodating pen input, by way of executing pen input operation on the tile surface, it is possible to jointly execute real world operation via physical object and such a screen operation conforming to something like a GUI (Graphic User Interface).

Further, by way of disposing a plurality of tiles on a flat display surface, it is possible to dynamically combine such functions assigned to individual tiles to constitute complex system condition and instructions. Details of the combination of plural tiles will also be described later on.

For example, it is also possible for a plurality of individual users to individually operate desired tiles by way of surrounding a flat display surface. In this case, the flat display becomes such an electronically reinforced desk, in other words, it becomes working space.

A-2: Comparison to the Existing Interface Systems:

Such a concept for realizing interaction with a computer via a transparent object is preceded by a GUI interactive method called a Tool Glass and Magic Lens [refer to annotation 6]. Likewise, such an real world-oriented interface by way of utilizing a physical object for constituting interface is also preceded by a technology called a Navi-Cam [refer to annotation 7]. Likewise, there is such a preceding example of a system utilizing a transparent physical object called a Transparent Props [refer to annotation 8]. However, none of the above cited preceding technologies constitutes an interface via physical disposition of a transparent object.

Many of preceding proposals pertaining to a user interface by way of utilizing a real object (for example, refer to annotations [1]~[4]) are oriented for specific uses. In other words, unlike the GUI presented by the present invention, those preceding proposals fail to balance between general-purpose expression capability and affinity of a real object.

One of the preceding arts called an Intelligent-Pad [refer to annotation 9] synthesizes various functions by way of adhering rectangular objects called a pad on a display screen under a visual programming environment. This technology is analogous to one aspect of the Data-Tile system of the present invention because of synthesizing functions via combination of tiles. However, the preceding Intelligent-Pad does not constitute such an interface provided with reinforced visual data based on display output via a transparent object.

Another preceding technology called an Algo-Block [refer to annotation 2] corresponds to such an education system for executing programming via linkage of a cubic body incorporating a micro-processor and switches, and thus, this technology is also analogous to the Data-Tile system in that it also utilizes a specific real object as an unit. However, output from a module provided for the above Algo-Block system is simply based on blinking of light emitting diodes, and thus, it can hardly transmit such data beyond simple feedback. When utilizing such a normal display output unit, input operation via a real object cannot directly be responded by display, whereby retarding user's comprehension. Further, unlike the GUI of the present invention, input means provided for this conventional technology is confined within simple means such as buttons and switches without properly supporting a variety of interactive means and expansibility. Further, inasmuch as electronic parts of the above system are built in a cubic body, freedom for determining price and size is restricted, which in turn requires further work to devise such means for providing the cubic body with power source and communication routes.

On the other hand, inasmuch as the Data-Tile system of the present invention introduces such a system to display data from the back-surface side (corresponding to the display-setting surface) of a transparent object, those problems existing in the above Algo-Block system can be solved. Accordingly, it is possible for the Data-Tile system to establish such a directly responsive relationship between input and output, whereby enabling the inventive system to utilize versatile interactive means via pen input operation or the like. Further, inasmuch as individual tiles dispense with provision of specific hardware components except for a wireless tag (this will be described later on), the inventive Data-Tile system can be manufactured at an inexpensive cost.

In many cases, such a system with an electronically reinforced desk projects video image from a projector onto the desk surface (refer to annotations 1, 10, 11, 12, and 13). Each of these systems realizes such a "real object with reinforced visual data" by way of projecting video image onto a predetermined projection surface such as a desk via visual perception of an real object. However, any of these systems requires provision of a projector on a desk and a camera for visual perception, and thus, practical scale of the system tends to be expanded.

On the other hand, the Data-Tile system of the present invention can be realized by way of providing such a construction in which each of individual sensors for reading wireless tags buried in individual tiles is integrally secured to a flat display surface such as an LCD (Liquid Crystal Display). In other words, by way of storing all the structural elements inside of a horizontal type tray, it is possible to enhance stability and portability of the Data-Tile system.

B: Basic Structural Elements of the Data-Tile System:

The Data-Tile system according to the present invention comprises: a plurality of tiles 50 functioning themselves as a physical interface that can directly be operated via user's manual handling operation; a flat display unit 11 functioning as a visual interface capable of providing a user with visual feedback, and a computing system 100 for arithmetically processing user's input and output operations via the above physical and visual interfaces.

First, construction of the tiles 50 utilized as a physical interface for a user is described below.

FIG. 2 exemplifies a plan view and a perspective view of the tile 50 having a basic construction. The tile 50 is made from such a transparent rectangular acrylic sheet, and each of the tiles 50 shares one of the basic elements of the interface in the Data-Tile system of the present invention. As is apparent from FIG. 2, each of the tiles 50 comprises a transparent area 51, a title bar 52, and a wireless tag 53 containing RF-ID data.

When the tile 50 is disposed on the flat display unit 11, the transparent area 51 enables the display contents output from an activated display area to permeate itself in the upper surface direction.

The title bar 52 corresponds to such an area for visually identifying the name given to the tile 50 or the processed contents assigned to the tile 50. For example, using a conventional printing technique, it is possible to form the title bar 52 on the back surface or the front surface of the tile 50. Alternatively, the title bar 52 may also be formed via inscription or adhesion of printed medium.

The transparent area 51 is utilized to feed such output contents to be displayed on the flat display unit 11 including such variable data varying itself every moment via arithmetic processes executed by the computing system 100. On the other hand, the title bar 52 is utilized for feeding such data fixed on the tile 50.

The wireless tag 53 consists of such a device containing identification data proper to the tile 50. The wireless tag 53 oscillates frequency-modulated RF-ID waves corresponding to identification data in response to the reception of such waves containing a specific frequency.

When implementing the present invention, the wireless tag 53 is buried in a wireless-tag-inserting hole 53' formed through an end surface of the tile 50. Inasmuch as the wireless tag 53 itself is opaque, as shown in FIG. 2, it is desired that the wireless tag 53 be superposed on the title bar 52 instead of disposing it within the transparent area 51.

As will be described later on, the frequency-modulated RF-ID waves oscillated from the wireless tag 53 are received by the flat display unit 11 and then decoded by the computing system 100 to activate proper function assigned to the tile 50 to cause the processed result to be displayed on the flat display unit 11 via the transparent area 51 of the tile 50.

For example, when setting the tile 50 assigned to a weather chart onto the flat display unit 11, presence of the tile 50 is visibly detected on the flat display unit 11. Further, such contents data including weather forecast data and satellite photographs are acquired from an external server (not shown) via internet for example as a result of arithmetic operation executed by the computing system 100, and then, the acquired contents data are displayed below the tile 50.

Figure 3:
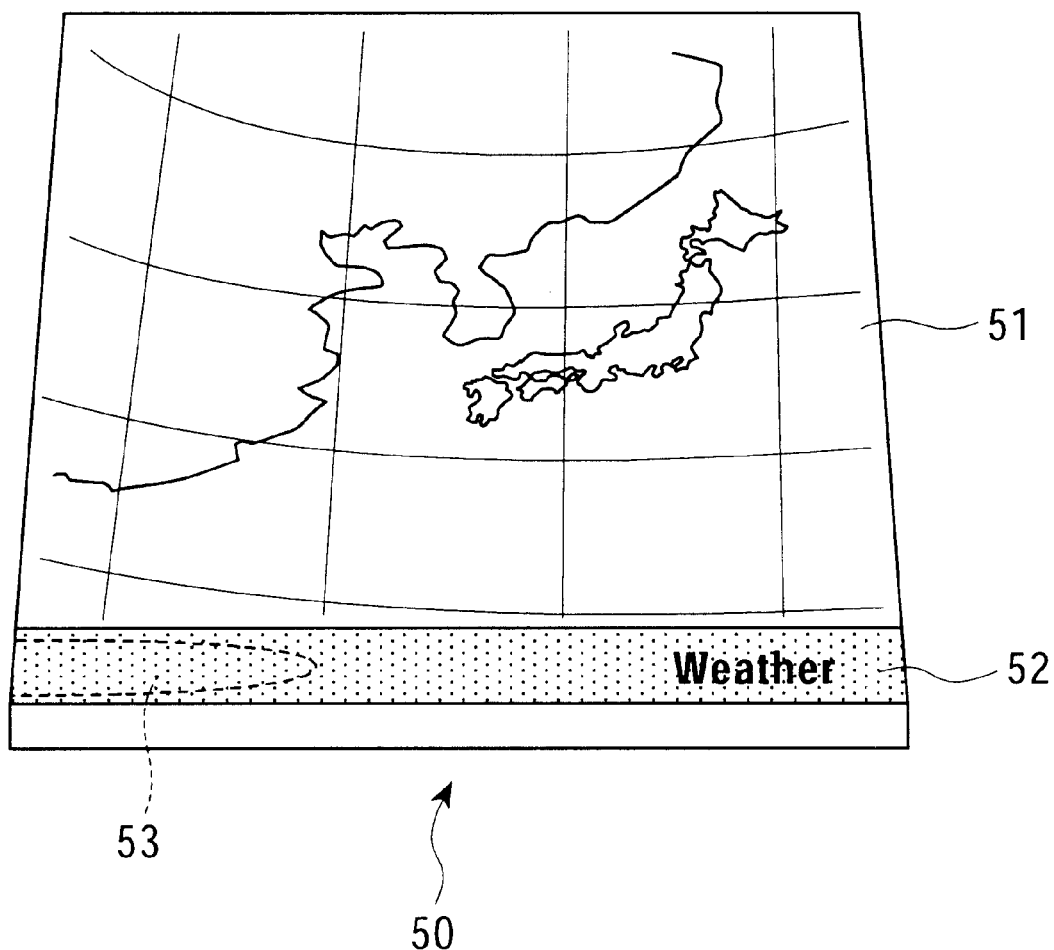
FIG. 3 designates a chart for explanatory of weather forecast data output onto screen on the back of a tile assigned to a weather chart and a map data to be combined with the satellite photographs.

Some of the tiles 50 are previously printed or formed into picture image designating assigned functions, or a visual data organically combined with display contents shown on the flat display unit 11. For example, in the case of a Weather-Tiles assigned to a weather chart, it is also allowable to print such a map data (white map) used in combination with visually output weather forecast data or satellite photograph on the back surface of the tile 50 (refer to FIG. 3).

Further, when setting a previously printed Map-Tile (refer to FIG. 4) such as a plan view or a sketch view of floor inside of a building onto the flat display unit 11, by way of displaying desired data such as distribution of floor temperature or location of an installed printer or a copying machine for example from the underneath of the tile 50, desired data is synthesized with printing data of the tile 50.

Further, it is also allowable to form a groove on the tile surface for guiding operation of a pen tip when inputting data with a pen. For example, by way of forming a linear groove (refer to FIG. 5) at a position corresponding to a scroll bar of the window displayed below the tile, the formed linear groove functions as a guide for operating the scroll operation. For example, it is also allowable to synthesize such a Scroll-Tile with a groove by way of displaying dynamic data such as knob of the scroll bar on the flat display unit 11. When operating the pen on the Scroll-Tile, it is possible to provide a Widget (functioning as interactive parts on the screen) with such physical sense to feel movement of the pen along the guide groove. Inventors of the present invention call it in terms of the Grooved-Widget.

Figure 6:
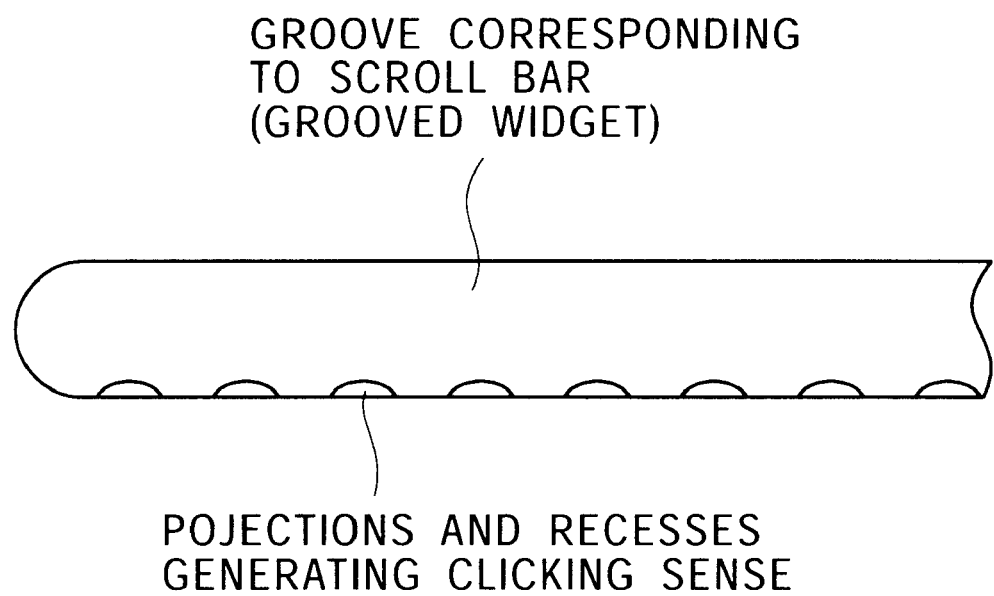
FIG. 6 designates a diagram illustrating projections and recesses finely formed on wall surface of the groove of scroll bars for promoting sense of operating a Widget.

By way of providing the Grooved-Widget, a variety of techniques can be applied in order to promote sense of operating a conventional Widget. For example, by way of forming fine projections and recesses (refer to FIG. 6) on a wall of the groove provided for the scroll bar, it is possible to add click sense to the pen tip at specific intervals while operating the scroll operation. It was difficult to generate such click sense via the GUI operation while using any conventional mouse. Further, by way of forming physical texture such as rough feeling, smooth feeling, and touch of a cloth or rubber, for example, on the groove surface, it is possible to provide a variety of operating sense.

Figure 7:
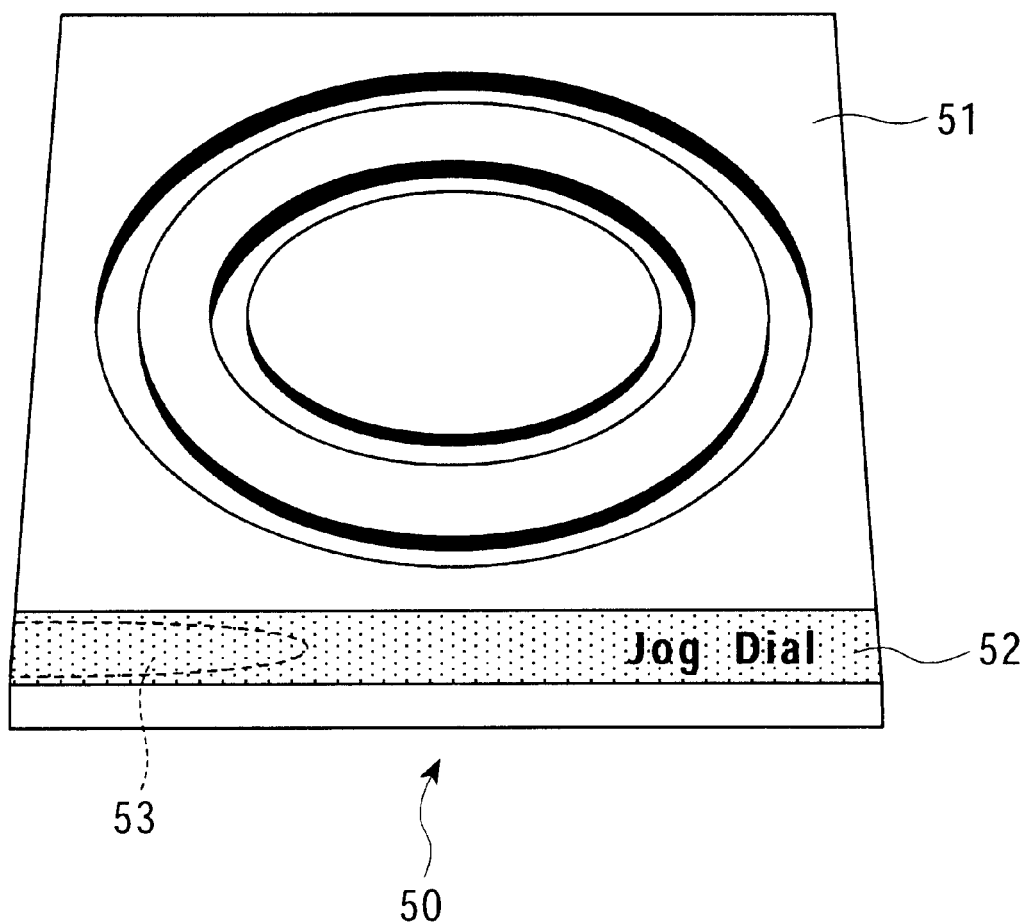
FIG. 7 designates a diagram illustrating an annular groove formed on the surface of the tile 50 in order to provide a Widget which rotates itself like a jog dial.

Further, as shown in FIG. 7, by way of forming annular grooves on the surface of the tile 50, it is possible to provide such Widget capable of rotating itself like a jog dial.

B-2: Flat Display Unit:

Next, construction of the flat display unit 11 functioning as a visual interface is described below.

Figure 8:
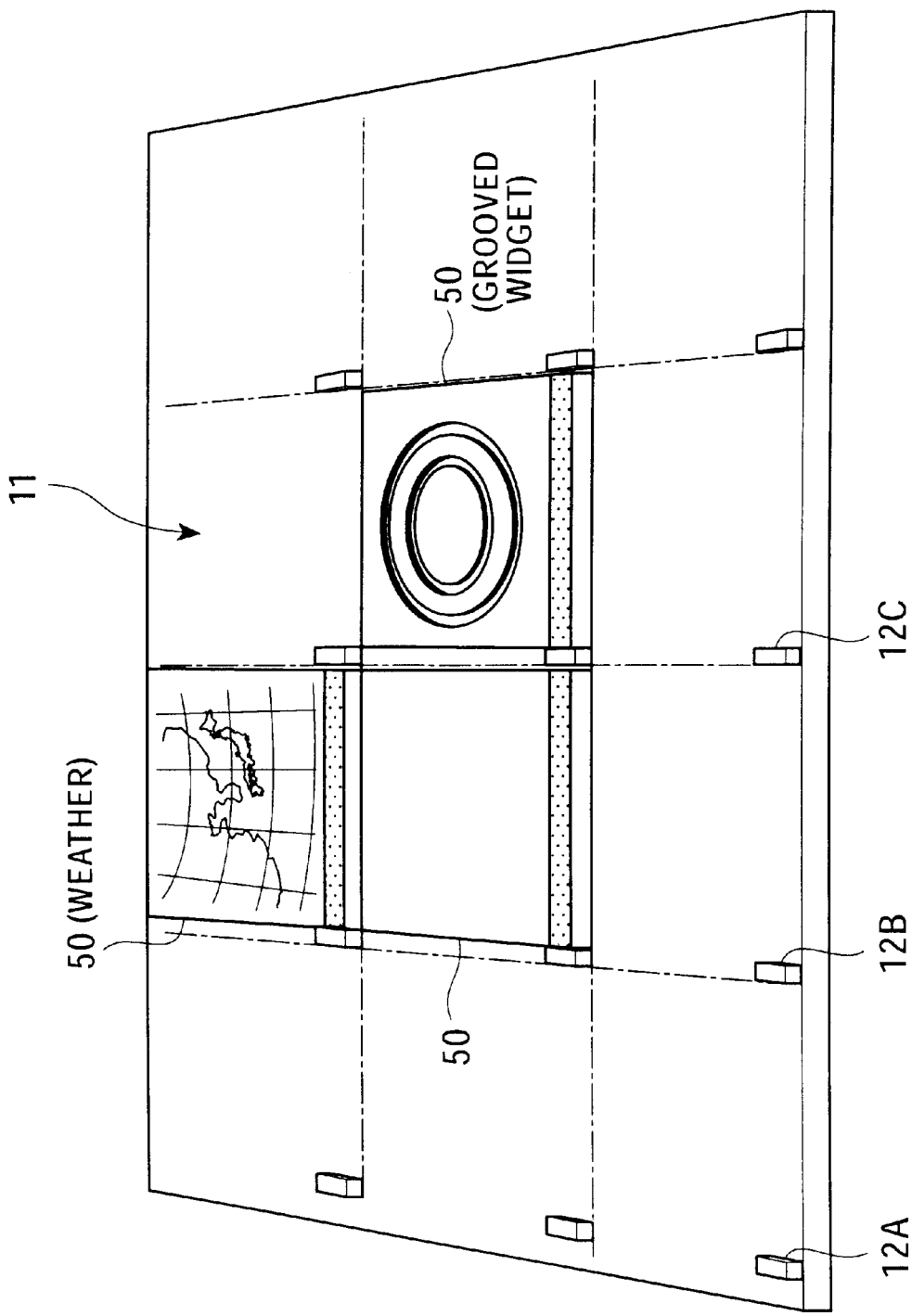
FIG. 8 designates a perspective view of an example of a flat display unit 11 as seen from the upper surface.

FIG. 8 presents a perspective view of the flat display unit 11 as seen from the upper surface.

The flat display unit 11 constitutes a data display unit for displaying result of arithmetic operation executed by the computing system 100, and yet, it also functions as a base substrate for mounting the tiles 50 thereon. Although the flat display unit 11 can be constituted by applying a LCD (Liquid Crystal Display), in order to accept the pen input data, it is preferred that the flat display unit 11 is integrated with a known electromagnetic induction type tablet. In this case, by applying a pen input means, a user can directly operate such data displayed on the tray. This will be described later on.

According to an example shown in FIG. 8, the lattices are formed on the upper surface of the flat display unit 11 by way of partitioning individual areas for mounting the tiles 50. A plurality of projections 12A, 12B, . . . concurrently with an RF antenna for receiving and transmitting waves are disposed within individual lattice at such regions to be abutted with the wireless tag 53 when disposing the tiles 50. In the example shown in FIG. 8, the flat display unit 11 contains twelve areas for setting the tiles 50, where each area is provided with a unit of projections 12.

Inasmuch as each projection 12 comes into contact with the wireless tag 53 of the disposed tile 50, each projection 12 can receive modulated wave RF-ID oscillated from the tile 50 via an RF antenna 19 built therein.

Figure 9:
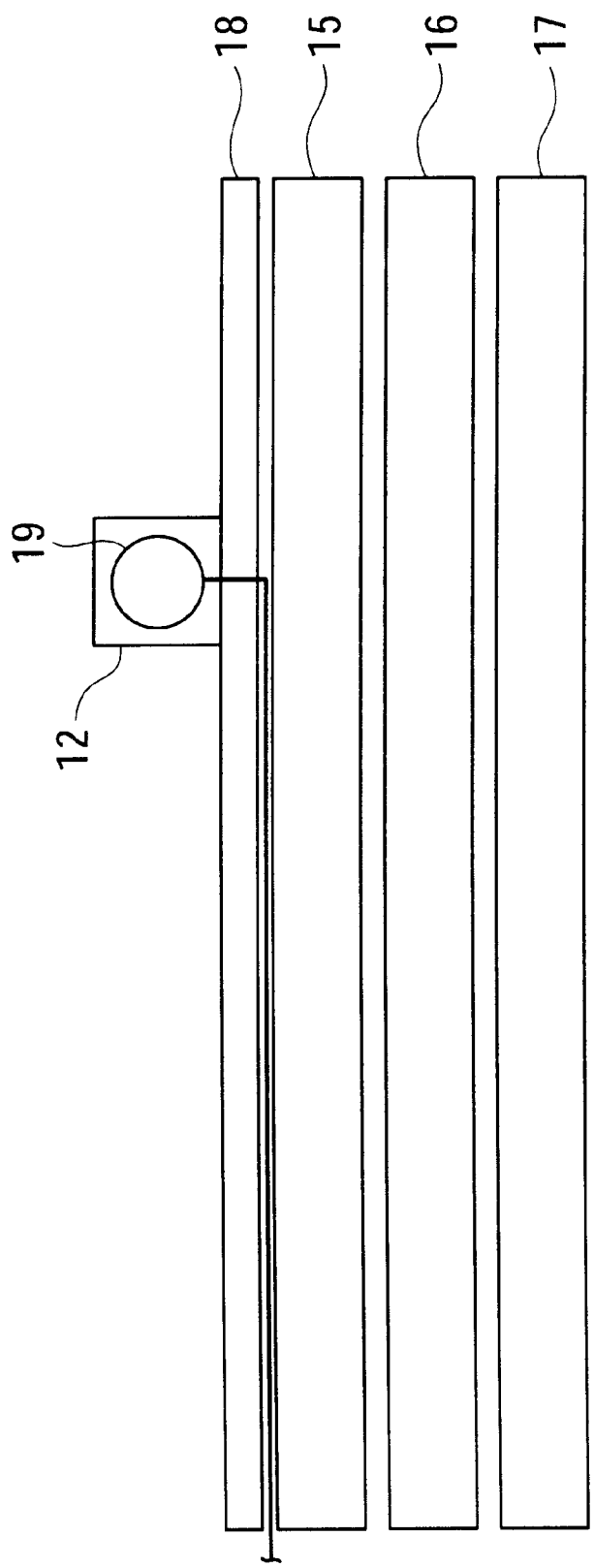
FIG. 9 designates a schematic illustration of cross-section of the flat display unit 11.

FIG. 9 schematically exemplifies cross-sectional construction of the flat display unit 11. As shown in FIG. 9, the flat display unit 11 consists of such a structural body laminated with a liquid crystal layer 15 for driving the display; a back-light layer 16 for illuminating image contents shown in the liquid crystal layer 15 in the direction of the front surface of the flat display unit 11; a digitizer antenna layer 17 for accommodating electromagnetic inductive pen input data; and a cover 18 for shielding surface of the liquid crystal layer 15 from external atmosphere.

Further, as just mentioned above, a plurality of projections 12 each incorporating an RF antenna 19 are projected from the surface of the flat display unit 11. An RF lead-wire connected to the RF antenna 19 for data transmission and reception are inserted between the cover 18 and the liquid crystal layer 15.

A group of the RF antennas 19 and the RF-ID wave readers for reading waves received by the RF antenna 19 are mutually connected by an antenna multiplexing circuit (not shown), for example. The antenna multiplexing circuit consists of such a device for electronically switching a plurality of antennas via an FET (Field Effect Transistor) switch. Only one RF antenna 19 is connected to the RF-ID reader at all times. The switching operation of the RF antennas 19 and the reading operation of the RF-ID number are executed by the computing system 100. Further, by virtue of the introduction of the above antenna multiplexing circuit, irrelevant to the number of the simultaneously identifiable RF-ID data, it is possible to simplify the hardware construction.

Figure 10:
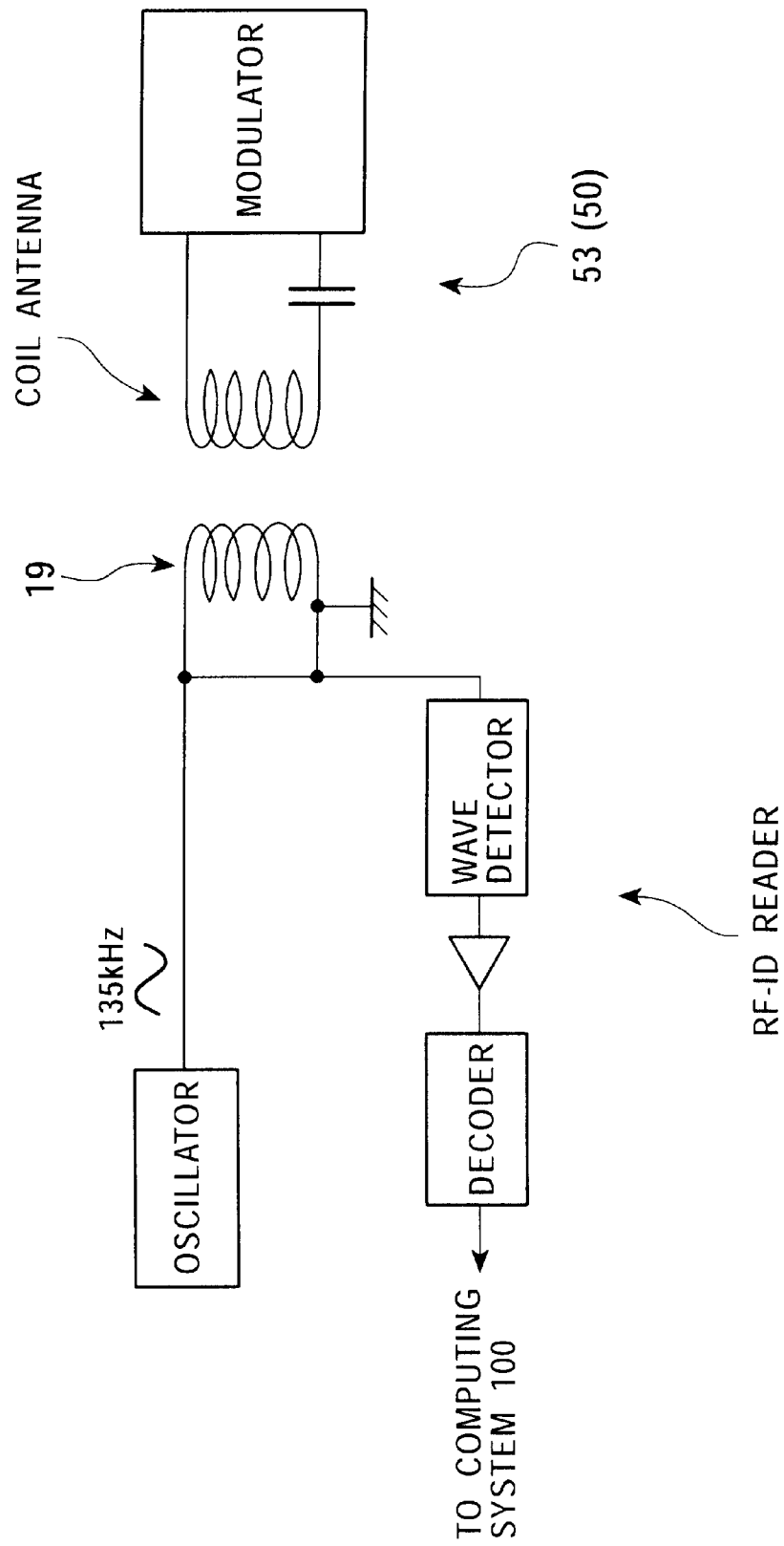
FIG. 10 designates a functional block diagram for explanatory of the operation for reading RF-ID from a wireless tag 53 built in the tile 50.

FIG. 10 schematically designates a functional block diagram for explanatory of an operation to read RF-ID data from the wireless tag 53 built in each of the tiles 50. In the example shown in FIG. 10, an electromagnetic transmission and reception method is introduced to effect wireless transmission and reception.

The RD-ID reader on the part of the flat display unit 11 initially amplifies waves containing 135 KHz of frequency for example oscillated from an oscillator, and then externally outputs the amplified radio waves via the RF antenna 19 for transmission and reception.

On the other hand, as a result of the setting of the tile 50 onto a predetermined position of the flat display unit 11, the wireless tag 54 approaches the RF antenna 19 for transmission and reception to properly receive radio waves. A coil antenna provided inside of the wireless tag 53 is resonated with the received radio waves and stores resonant energy.

A modulator is driven by such electric energy generated via conversion of accumulated resonant energy, then executes modulation process for the received radio waves via AM modulation, for example, and then generates a specific modulated frequency corresponding to the ID data assigned to the tile 50, and finally outputs the modulated frequency signal via the coil antenna.

The RF antenna 19 for transmission and reception receives radio waves containing a modulated frequency signal from the wireless tag 53. A decoder then decodes a specific identification data RF-ID assigned to the modulated frequency signal, and then transfers the identified result to the computing system 100.

Upon receipt of the RF-ID data, the computing system 100 activates a proper function and application program defined to the installed tile 50, and then drives the LCD component of the flat display unit 11 to display the processed result from the back side of the tile 50.

Figure 11:
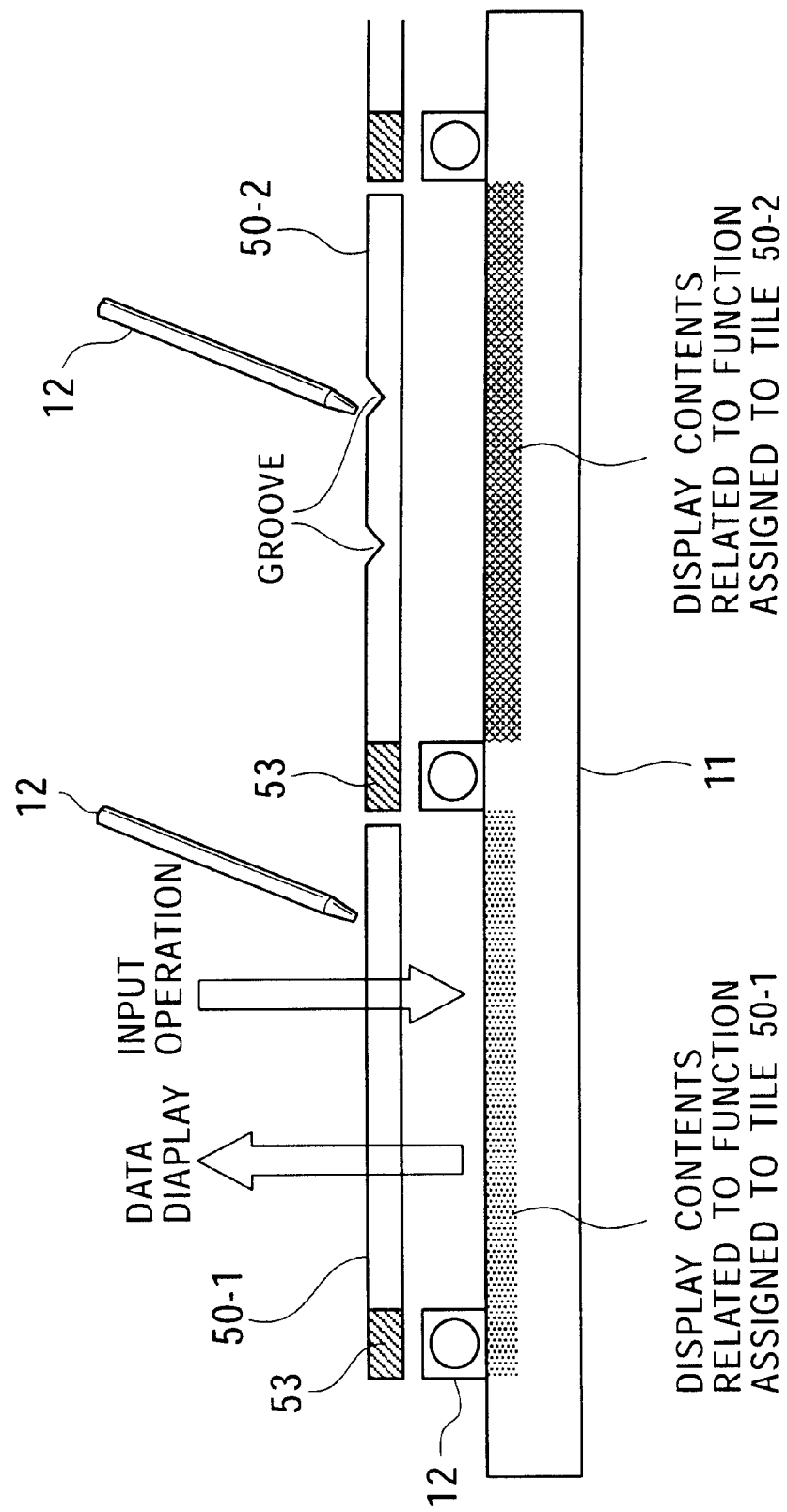
FIG. 11 designates a diagram illustrating an aspect of forming interfaces by way of disposing the tile 50 equipped with an ID tag on the flat display unit 11.

FIG. 11 exemplifies such an aspect in which an interface is constructed by way of disposing the tiles attached with ID tags on the flat display unit 11.

As shown in FIG. 11, variable visual data is displayed from the underneath of a transparent physical object such as the tile 50. By harmonizing the variable visual data with the stationary image data on the tile 50, it is possible to construct such interface containing reinforced visual data. Concretely, practical utility is generated via harmonization of the static real object although physical with the dynamic display data although virtual.

Further, it is also possible to jointly utilize operation of a physical object called a tile and another GUI-oriented operation via transfer of cursor and click operation by effect of pen input operation performed on the surface of the tile 50. It is allowable to form such Grooved-Widget on the surface of the tile 50 in order to guide the pen input operation as described earlier.

Further, by way of disposing a plurality of tiles on the surface of the flat display unit 11, it is possible to express complex condition and instructions via combination of proper functions of individual tiles.

Figure 12:
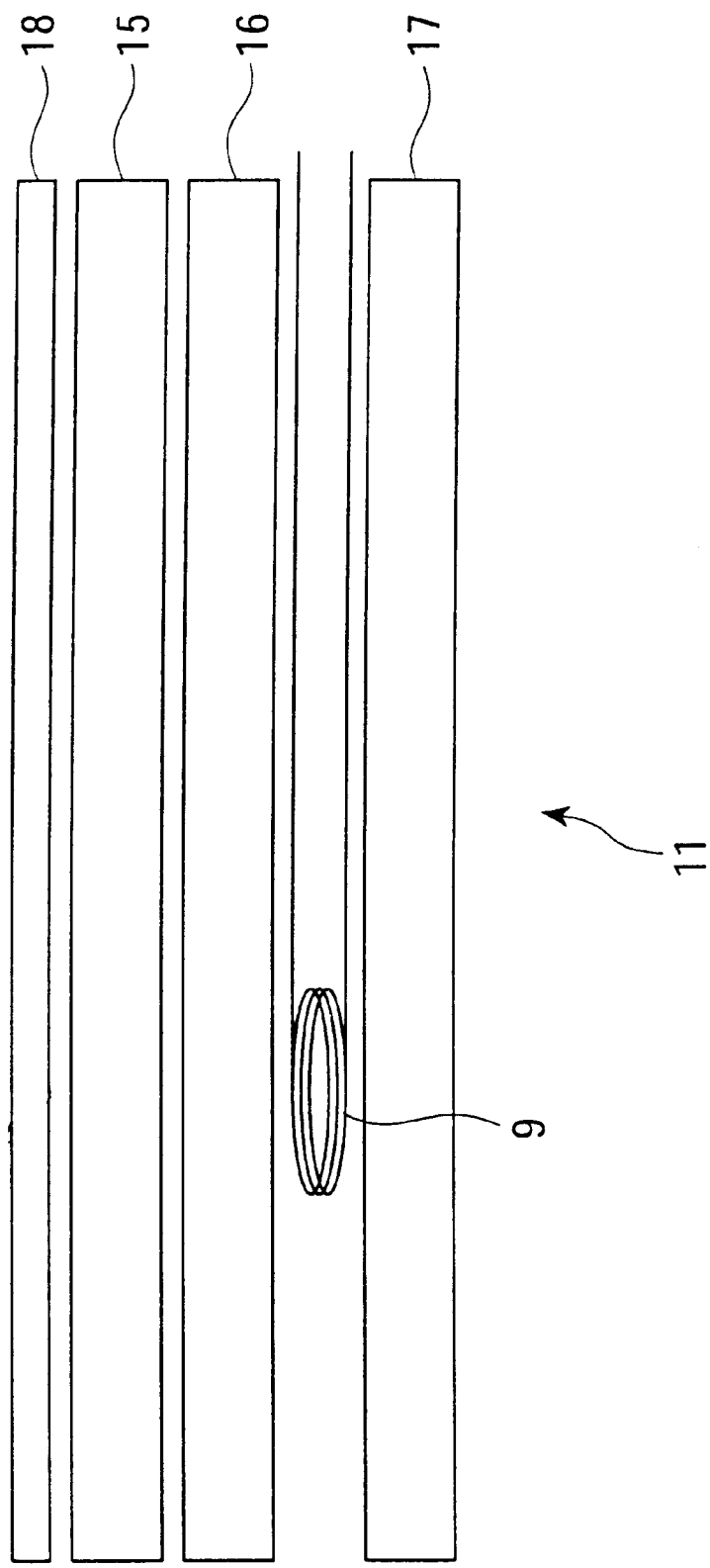
FIG. 12 designates a schematic diagram of another example of the cross-sectional structure of the flat display unit 11.

FIG. 12 schematically exemplifies another example of cross sectional construction of the flat display unit 11. The flat display unit 11 shown in FIG. 12 consists of a laminated structure comprising a liquid crystal layer 15 for driving display components; a back-light layer 16 for illuminating image contents shown in the liquid crystal layer 15 on the surface of the flat display unit 11; a digitizer antenna layer for accepting a pen input based on the electro-magnetic transmission and reception method; and a cover 18 for shielding surface of the liquid crystal layer 15 from external environment.

In the example shown in FIG. 12, the RF antenna 19 for receiving RF-ID waves oscillated from the wireless tag on the part of the tile 50 is buried below the back-light layer 16 without emerging itself from the surface of the flat display unit 11 as the projection 12.

In the example shown in FIG. 9, a winding direction of the coil of the RF antenna 19 buried in the projection 12 corresponds to the superficial direction of the flat display unit 11, and yet, wave-receiving direction of the RF antenna 19 also corresponds to the superficial direction thereof. On the other hand, in the example shown in FIG. 12, by way of setting the winding direction of the coil for the RF antenna 19 in the normal direction on the surface of the flat display unit 11, it is possible to intensify receiving sensitivity. Further, inasmuch as the flat display unit 11 dispenses with provision of projections such as the projections 12 on its surface, the appearance becomes smart. Further, when the flat display unit 11 does not use such physical object such as the tile 50, it is easily operable as a normal display unit or a table.

B-3: Computing System:

Next, construction of the computing system 100 of the present invention is described below, which arithmetically processes user input/output operation by way of jointly utilizing such a physical interface called the tile 50 and such the visual interface called a flat display unit 11.

Figure 13:
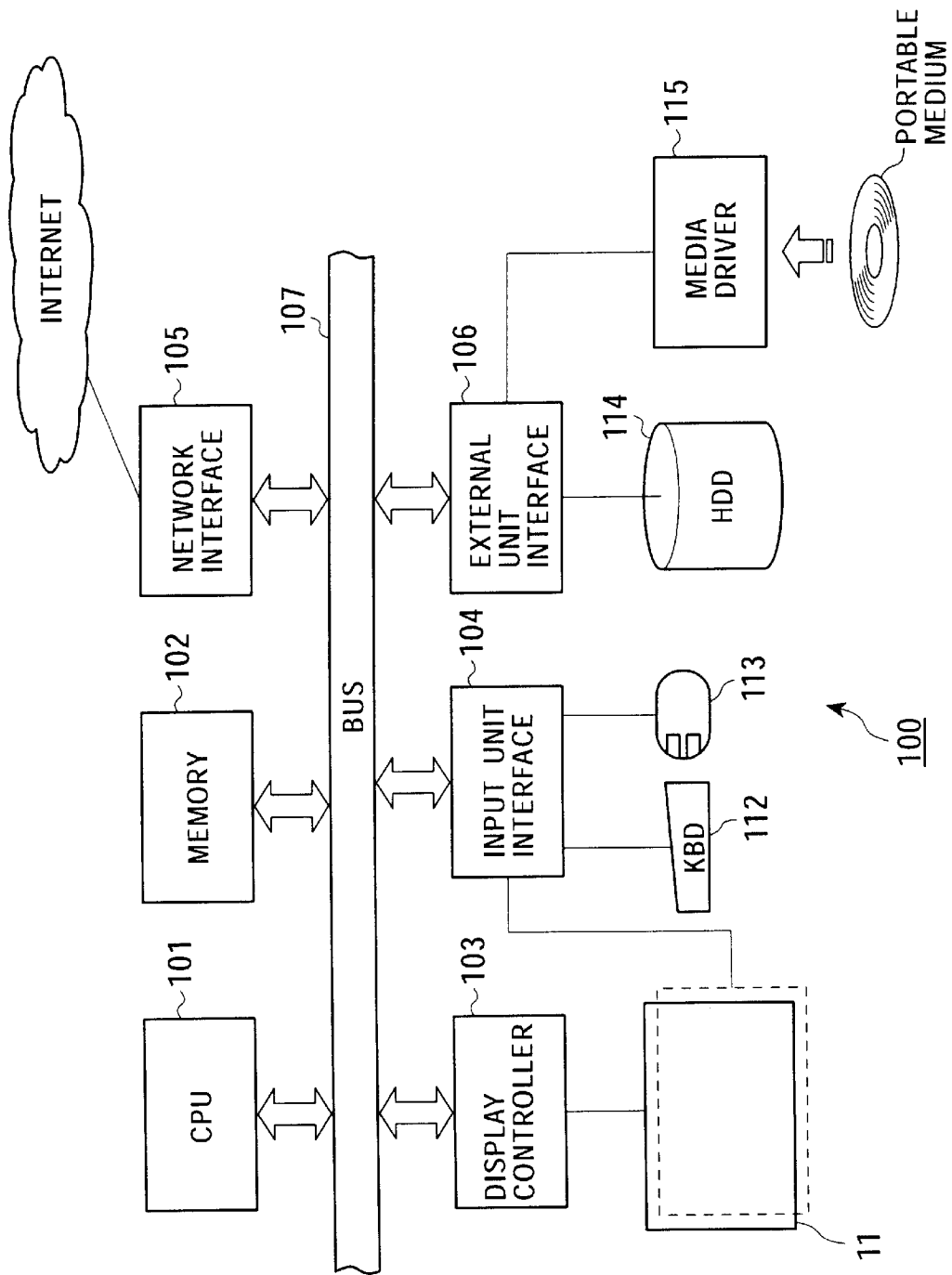
FIG. 13 designates a schematic diagram illustrating hardware construction of a computer system 100.

FIG. 13 schematically exemplifies a hardware construction of the computing system 100 of the present invention.

The central processing unit 101 so called as CPU (Central Processing Unit) functioning as a main controller in the computing system 100 executes a variety of application programs under control of a specific OS (Operating System). Preferably, the OS (Operating System) provides a GUI (Graphic User Interface) environment. This may be sufficed by applying UNIX or Windows 98/NT of Microsoft Corporation, U.S.A., for example.

As shown in FIG. 13, the CPU 101 is mutually connected to a variety of operating components (to be described later on) via a bus line 107. Each of the component units on the bus 107 is provided with a proper memory address or an I/O (Input/Output) address to enable the CPU 101 to access a specific component unit via these addresses. The bus 107 itself constitutes a common signal transmission route comprising a data bus, an address bus, and the control bus. This is typically exemplified by a PCI (Peripheral Component Interconnecting) bus, for example.

A memory 102 stores program codes to be executed by the CPU 101 or provisionally stores such working data under execution. It should be understood that the memory 102 shown in FIG. 13 comprises non-volatile or volatile memories.

A display controller 103 exclusively controls those processes for actually executing such data painting instructions generated by the CPU 101. For example, the display controller 103 supports such function to paint a bit map corresponding to SVGA (Super Video Graphic Array) or an XGA (extended Graphic Array). Paint data processed by the display controller 103 is provisionally written into a frame buffer (not shown), and then externally displayed via the liquid crystal layer 15 of the flat display unit 11.

Structurally, the flat display unit 11 of the present invention consists of such a display unit integrated with a tablet. As described above by referring to FIGS. 9 and 12, the flat display unit 11 also consists of such a laminated structural body comprising the liquid crystal layer 15 and the antenna layer 17 used for the digitizer for executing the pen input operation based on the electromagnetic induction method.

An input-unit interface 104 is utilized to connect a user input means such as a keyboard 112, a mouse 113, and a tablet integrated with the flat display unit 11, to the computing system 100. The input-unit interface 104 generates an interruption signal against the CPU 101 in response to key input via the keyboard 112, a coordinate designation input via the mouse 113, and pen operation via the antenna layer 117 used for the digitizer.

In accordance with a predetermined communication protocol such as an Ethernet or the like, a network interface 105 can be connected to a local network such as a LAN (Local Area Network) or a wide area network such as Internet for example. Generally, the network interface 105 is provided in the form of a LAN adaptor card which is inserted into a PCI bus slot on a mother board (not shown).

A plurality of host computers (not shown) are mutually connected to each other on a network in a transparent condition, whereby constructing a decentralized computing environment. It is possible to distribute software programs and data contents onto the network. For example, it is possible to down-load such an application program capable of executing harmonization of a physical interface with a visual interface via the network. Further, it is possible to down-load such an application program corresponding to such a function assigned to the tile 50 disposed on the flat display unit 11 via the network. Further, it is also possible to access such data resources assigned to the tile 50 disposed on the flat display unit 11 via the network as well.

An external unit interface 106 enables external apparatuses such as a HDD (Hard Disc Drive) 114 and a media drive unit 115 to be linked with the computing system 100. The external unit interface 106 is compatible with a plurality of interface standards such as an IDE (Integrated Drive Electronics) and a SCSI (Small Computer System Interface).

The HDD 114 comprises a known external memory device which fixedly mounts a memory carrier consisting of rotating magnetic discs. The hard disc drive 114 incorporates a greater memory capacity and faster data transfer rate than that of other external memory devices. An conduct of loading a software program on the hard disc driver 114 is conventionally called as installation of a program to the system. Normally, the hard disc drive 114 stores program codes, application programs, and a device driver of such an operating system to be executed by the CPU 101 in a non-volatile form.

For example, it is possible to install such an application program for harmonizing a physical interface with a visual interface on the hard disc drive 114. Further, it is also possible to install such an application program corresponding to such function assigned to the tile 50 disposed on the flat display unit 11 on the hard disc drive 114. Further, it is also possible to down-load such data resources assigned to the tile 50 on the flat display unit 11 on the hard disc drive 114 via the network.

The media drive 115 accepts a variety of portable type storage media such as a CD (Compact Disc), a MO (Magneto-Optical) disc, a DVD (Digital Versatile Disc), or the like, and then, accesses the data recorded surfaces thereof.

Any of the above-cited portable type storage media is mainly used for backing up the software programs and the data files as computer-readable data and also for transferring them between computer systems for the purpose of marketing and distributing them. For example, according to those portable media, it is possible to physically distribute the application program corresponding to such function for harmonizing a physical interface with a visual interface, function assigned to the tile 50 disposed on the flat display unit 11 and the data resources assigned to the tile 50 disposed on the flat display unit 11 between corresponding computer systems.

The above computing system 100 exemplified in FIG. 13 consists of such a computer compatible with or successor to the IBM's personal computer standard called as PC/AT (Personal Computer/Advanced Technology), a product of International Business Machine Corporation, U.S.A. It is of course possible to utilize such a computer incorporating other architectures as the computing system 100 of the present invention.

Practically, harmonization of a physical interface and a visual interface according to the Data-Tile system of the present invention is realized by way of activating such an application program for causing the physical interface to be combined with visual interface on the computing system 100.

It is possible to construct an application software pertaining to the Data-Tile system of the present invention by applying such a programming language called a Java, for example.

When a user places the tile 50 on the flat display unit 11, the Data-Tile system reads the identification data RF-ID from the disposed tile 50, and then, based on the RF-ID data, the computing system 100 retrieves data. If necessary, the Data-Tile system dynamically reads classified files corresponding to RF-ID data and such data including memorandum data of the memo-pad proper to individual instances of the tile 50.

Inasmuch as individual tiles respectively contain proper threads, it is possible to perform animations and reproduction of moving pictures per tile with parallel processing.

When two or more than two of tiles are disposed side by side, each tile 50 dynamically checks operation groups that can be processed by the opposite-side tile in order to determine a type of combination. This process can be realized by applying function of the Java language (instance of operator) for checking object class and interface type in the course of execution.

C: Operation of the Tiles in the Data-Tile System:

According to the Data-Tile system related to the present invention, it is possible to reinforce the visual data presented by the computing system 100 by way of harmonizing stationary printed data owned by tile bars of individual tiles 50 with dynamic picture display executed via the transparent area 52. Further, by executing such a process for forming the groove on the tile surface and varying touch feeling in the course of pen input operation, it is possible to introduce a variety of techniques for improving operating feeling owned by the Widgets, i.e., such interactive parts on the screen.

Practical examples for constructing a variety of tiles as the modules of the user interface via application of basic function of the above-referred Data-Tile system are described below.

C-1: Application Tile:

This description specifically refers to such tiles containing previously and fixedly assigned with a specific function (or an application program) as the application tiles.

Figure 14:
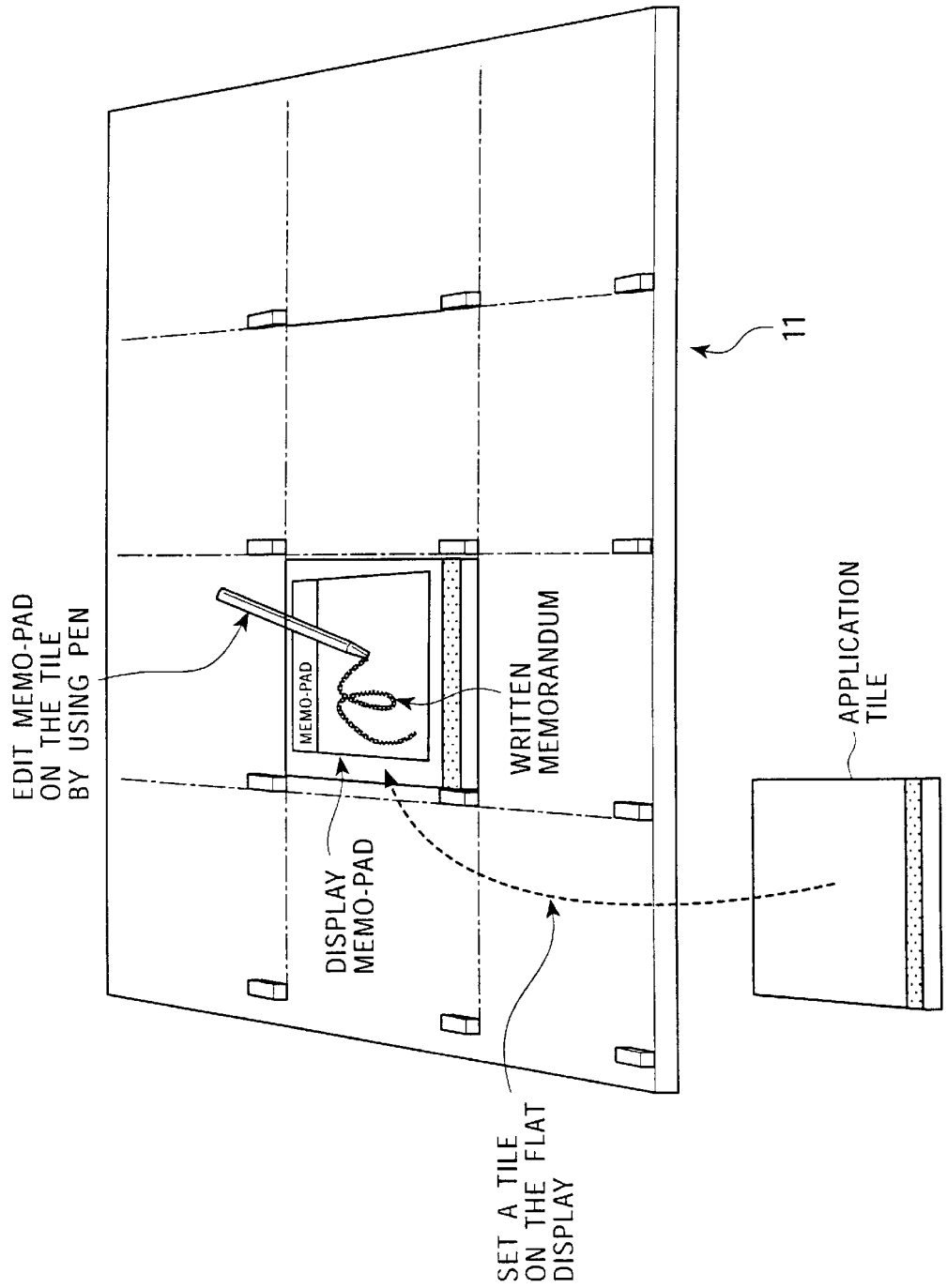
FIG. 14 designates an aspect of a memo-pad allocated application tile disposed on a flat display in which the corresponding application program is activated; and another aspect in which additional memorandum is written onto this application tile.

For example, when such an application tile assigned with a memo-pad is disposed on the flat display unit 11, a manual-writing memo-pad application program is activated on the computing system 100, and then, a memo-pad editing window is displayed via transparent area of the tile. This enables a user to write a memorandum on this tile with a pen (refer to FIG. 14).

It is permissible to store such data written on the tile in the computing system 100 with reference to the corresponding Memo-pad-Tile. In this case, it is also possible to provisionally remove the Memo-pad-Tile from the flat display unit 11 and then causes the contents of the preceding memorandum to be restored automatically by disposing the Memo-pad-Tile again on the flat display unit 11.

Figure 15:
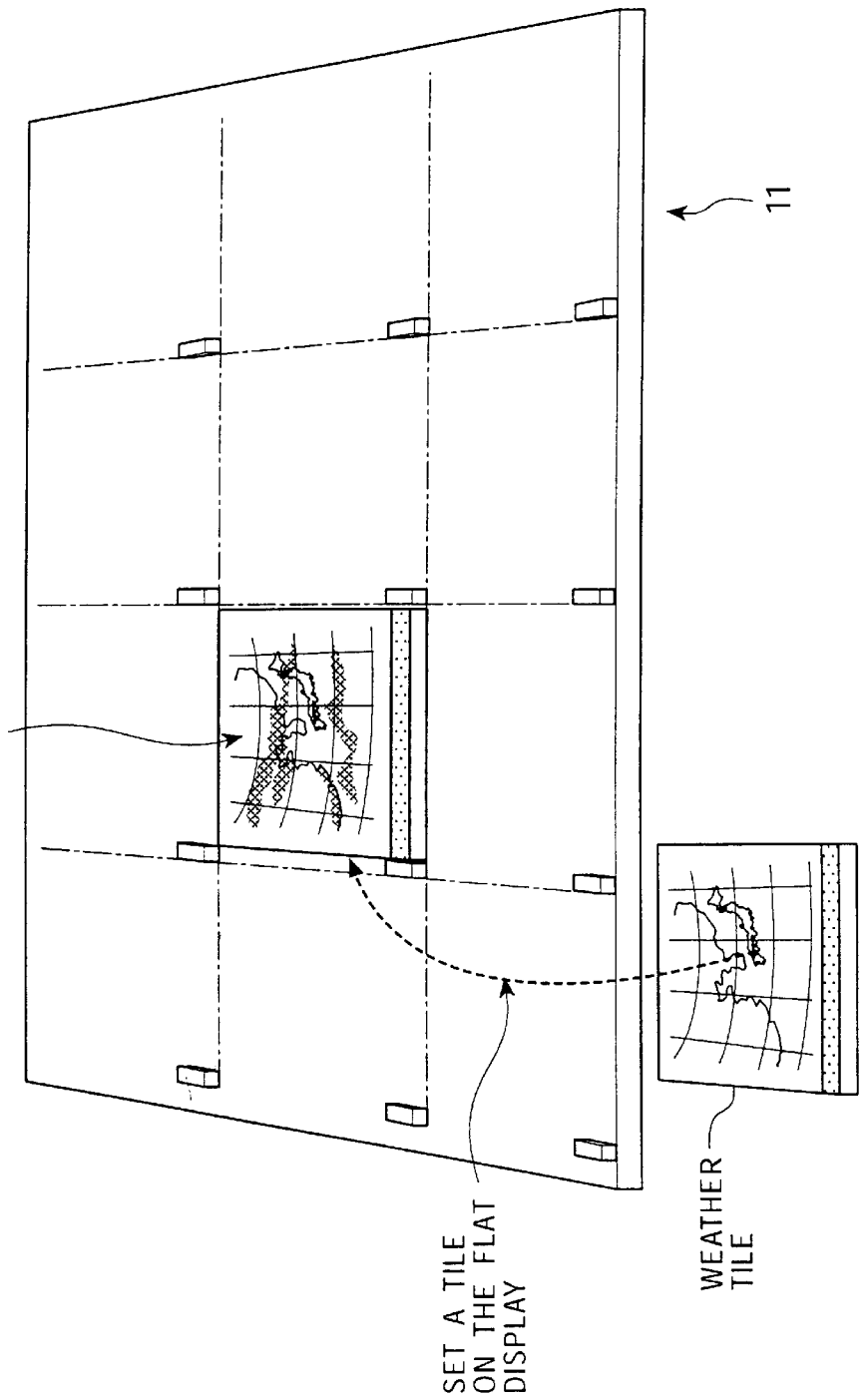
FIG. 15 designates a chart illustrating an application tile assigned to weather forecast data, where the application tile is disposed on the flat display unit 11; the chart illustrates such an aspect in which motion display images such as weather forecast data and satellite photographs are combined with still image data such as a white map printed on the tile to designate such an aspect in which visual data pertaining to weather forecast is reinforced.

Further, by way of disposing such Weather-Tile (refer to FIG. 3) assigned to a weather chart on the flat display unit 11, the above computing system 100 accesses a specific server which delivers weather forecast data via the Internet line, for example, to automatically down-load the weather forecast data or such contents data related to meteorological data such as satellite photographs before outputting these data on the display screen. This in turn causes stationary data such as a white map printed or imaged on the Weather-Tile to be combined with dynamic display data such as the weather forecast data and satellite photographs shown on the flat display unit 11, whereby consequently reinforcing the visual data related to the weather chart (refer to FIG. 15).

In the same way, it is possible to embody a variety of applications and data services in the form of a tile for conversion into a module. Such data services may be of the one accumulated in the stand-alone computing system 100 or the one externally acquired via a communication medium such as the Internet service line.

Figure 35:
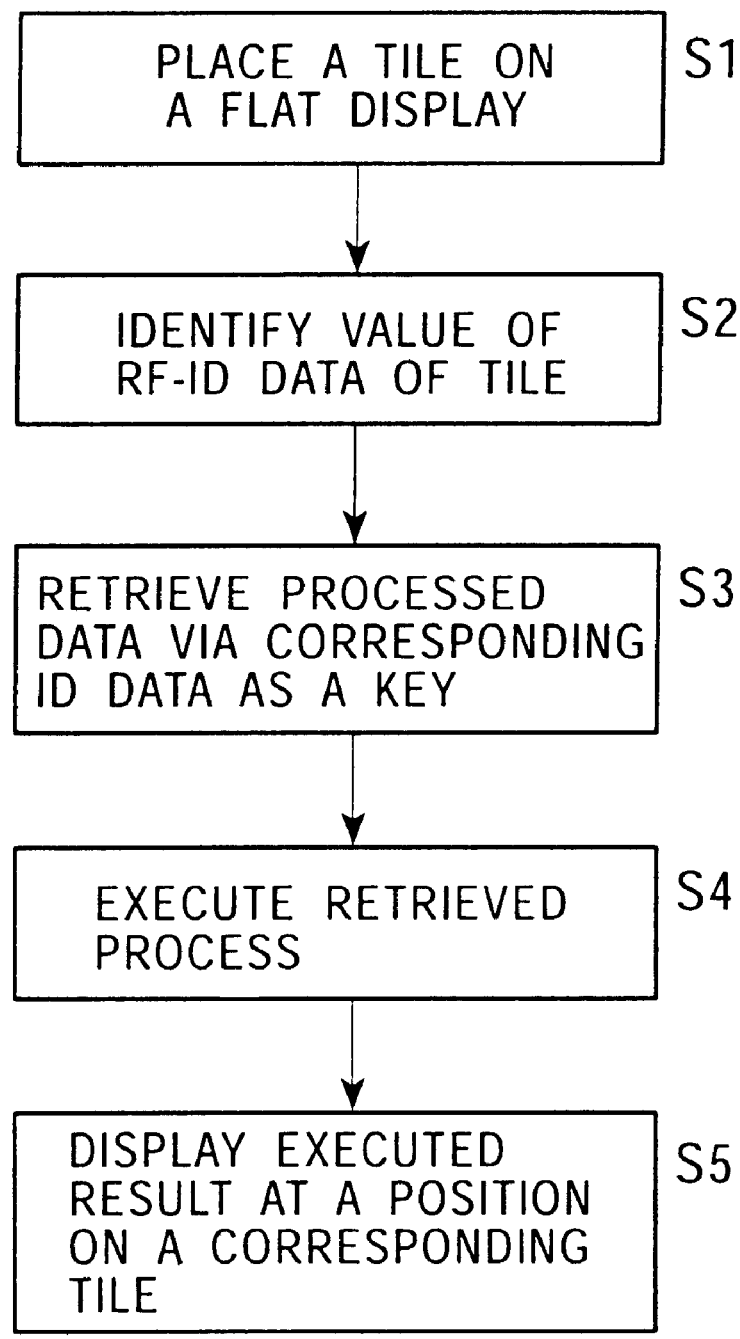
FIG. 35 designates a flowchart designating serial processes executed when a Weather-Tile is operated on the flat display unit 11.

Now, taking the Weather-Tile for example, referring to the flowchart shown in FIG. 35, serial steps for operating the above-cited application tiles on the flat display unit 11 are described below.

Initially, step S1 is underway, in which an application tile is placed on the flat display unit 11. Next, the computing system 100 reads identification data, i.e., the RF-ID data, held by the application tile via the electromagnetic transmission and reception method, whereby proceeding the process to step S2.

In response to the above data-reading operation, the Data-Tile system retrieves the processed contents by operating the corresponding ID (IDentification) data as a key, whereby entering into step S3.

Next, step S4 is entered, in which the retrieved process is executed. When dealing with the Weather-Tile shown in FIG. 15, the computing system 100 accesses a weather forecast site. Result of execution of the accessing operation is displayed at the tile-disposed position on the flat display unit 11 to enable a user to visually confirm the displayed result via a transparent area of the Weather-Tile.

As will be described later on, by way of cooperating with other tiles, the application tile can execute more sophisticated processes.

C-2: Portal Tile:

Such a specific tile corresponding to real world objects including humans, physical objects, and locations, is referred to as a portal tile in this description.

Figure 16:
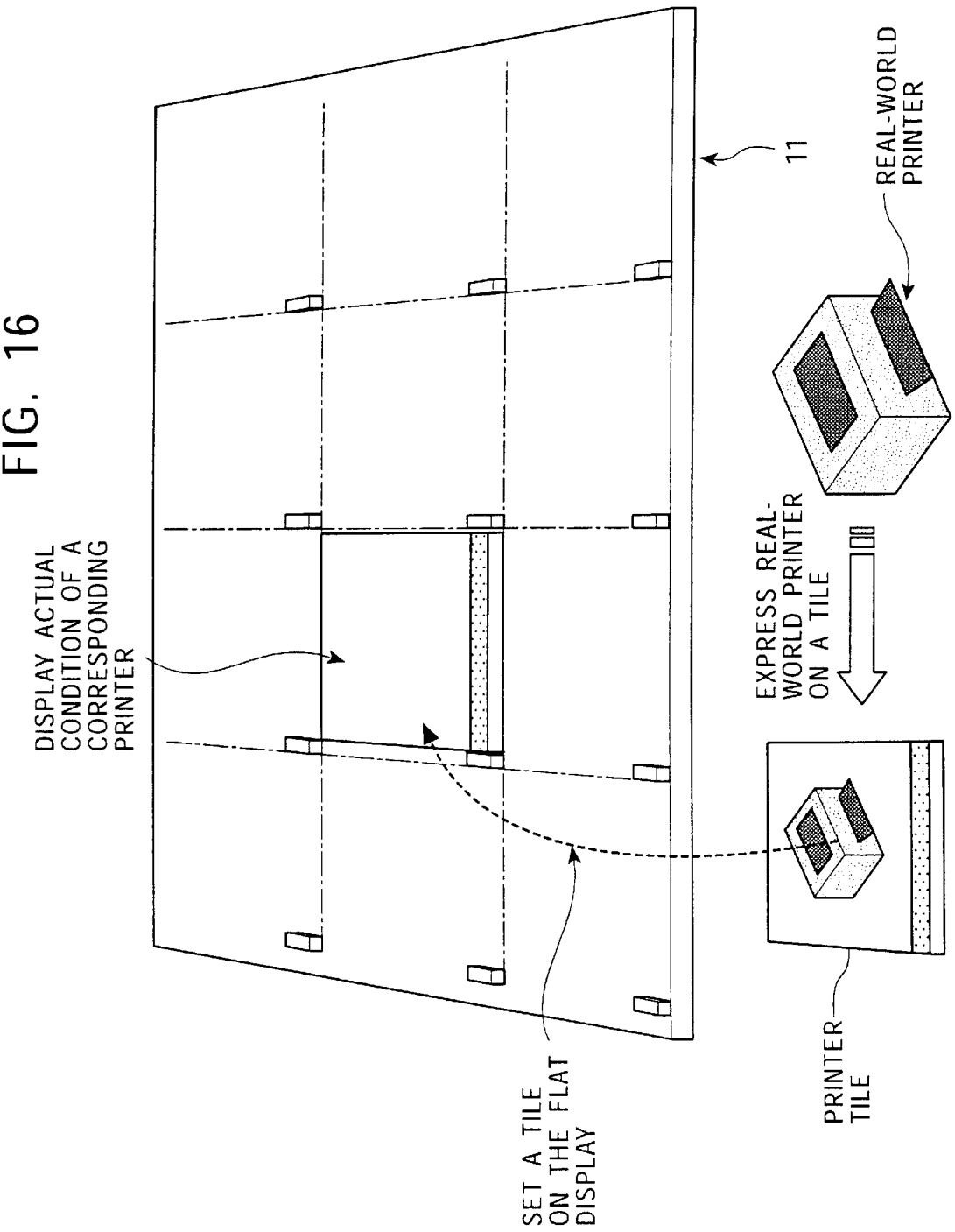
FIG. 16 designates a chart illustrating such an aspect in which motion display data pertaining to the condition of a printer is combined with picture pattern of the printer printed on the tile in response to the setting of a Printer-Tile assigned to a specific printer on the flat display unit 11, whereby visual data related to the printer is reinforced.

For example, such a Printer-Tile corresponding to one of examples of the portal tile expresses such an real world object called a printer as a tile. When the Printer-Tile is disposed on the flat display unit 11, in response to this action, the computing system 100 accesses a corresponding printer to acquire the actual condition, and then causes the actual printer condition to be displayed via transparent area of the Printer-Tile. In this case, picture image printed by the corresponding printer is combined with dynamic display data to designate the actual condition, whereby reinforcing the visual data (refer to FIG. 16).

Further, it is possible to provide such function for delivering data acquired from an adjoining tile to the printer. When transferring data from an adjoining tile, it is possible to utilize such an interactive technique fixed in the GUI environment such as the drag and drop operation executed between tiles via the pen input operation, for example. This will also be described later on.

Figure 17:
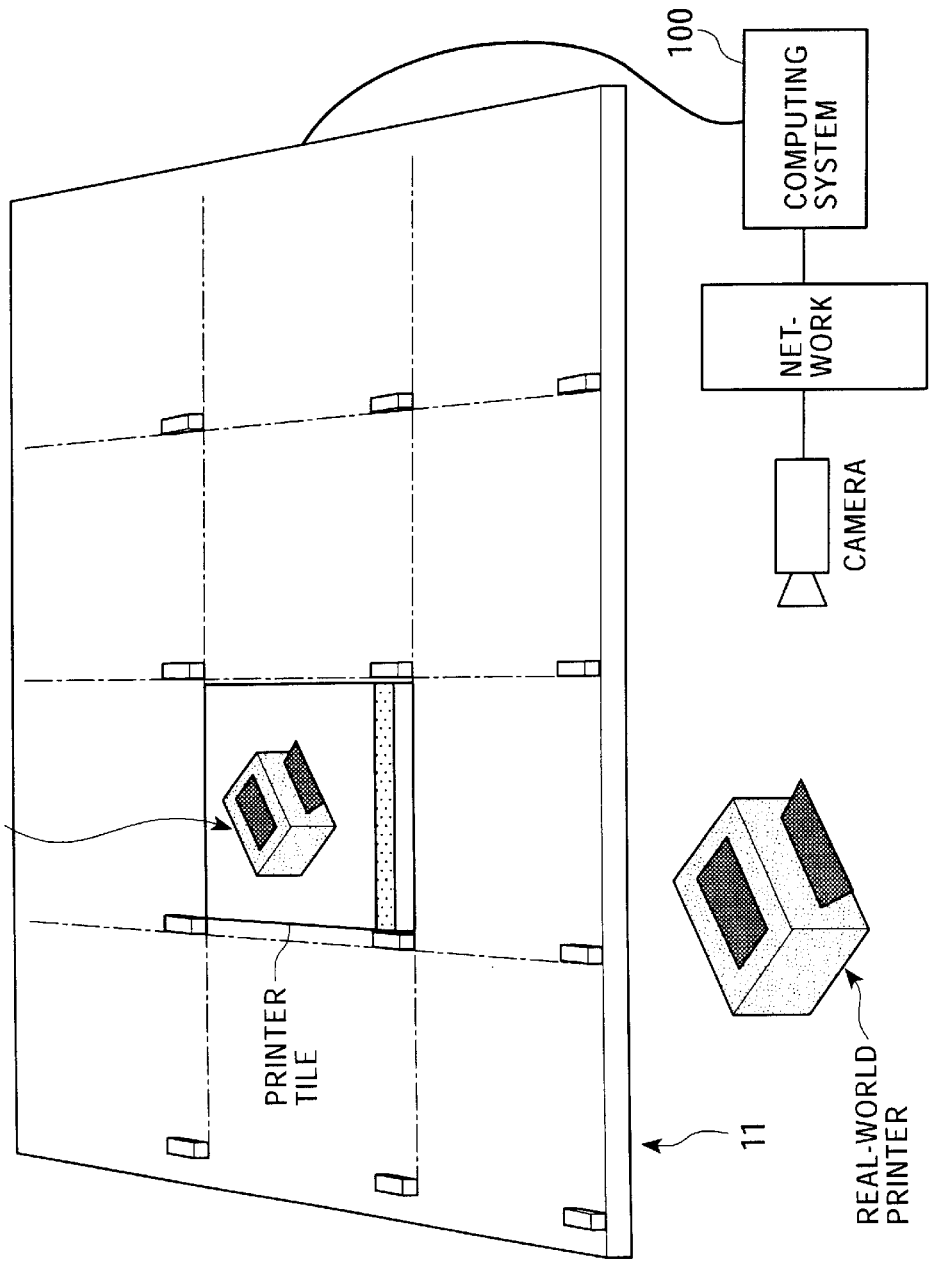
FIG. 17 designates a chart illustrating such an aspect in which real video image from a camera shooting a printer is displayed by way of utilizing transparent area of the tile in response to the setting of a Printer-Tile assigned to a specific printer on the flat display unit 11.

The portal tile may be connected to image of a corresponding real world physical object. For example, in response to the conduct of placing the Printer-Tile on the flat display unit 11, it is possible for the computing system 100 to acquire a real picture image from a camera shooting an actual printer via a network service line and then display picture image of the real object via transparent area of the portal tile (refer to FIG. 17). In this case, a user can observe actual aspect of the printer output via the Printer-Tile. In other words, the portal tile literally provides such function serving as an entrance window into the real world.

Figure 36:
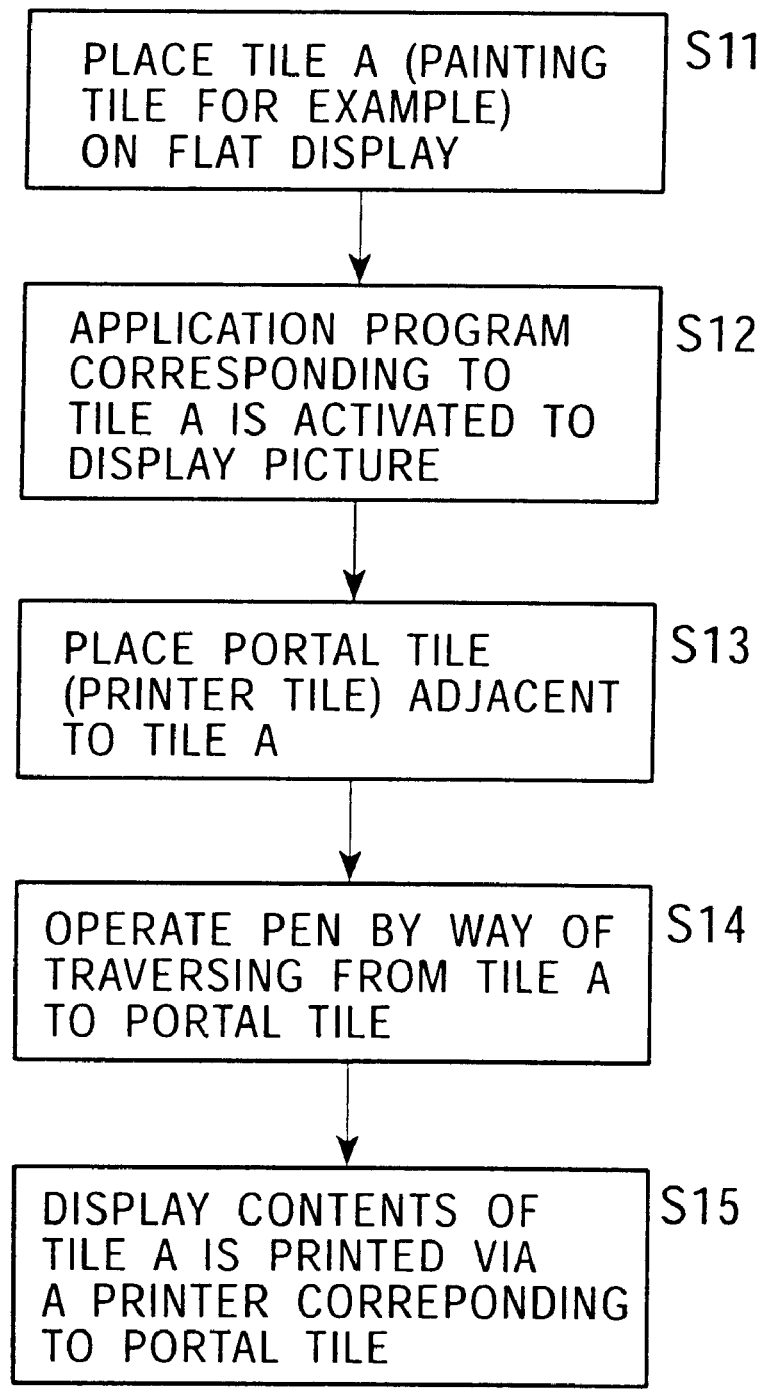
FIG. 36 designates a flowchart designating serial processes executed when a Printer-Tile is operated on the flat display unit 11.

Taking the Printer-Tile for example, referring now to the flowchart shown in FIG. 36, serial steps for operating the portal tile on the flat display unit 11 are described below.

Initially, step S11 is entered, in which a tile A holding the data is disposed on the flat display unit 11. The tile A holding the data refers to such tiles including such an application tile (Paint-Tile) containing picture-data file and such a photographic tile containing static picture data such as photographs, for example.

Initially, the tile A is disposed on the flat display unit 11 whereby entering into step S11. In response to this, the computing system 100 reads an identification data, i.e., RF-ID data, held by the tile A via the electromagnetic transmission and reception method. In response, the Data-Tile system retrieves the processed contents by applying the corresponding identification data as a key and then executes the retrieved processes. This activates step S12, in which the processed result is displayed on the flat display unit 11 the via transparent area of the tile A.

Next, the Printer-Tile as one of examples of the portal tile is disposed at a position adjoining the tile A, whereby entering into step S13. The computing system 100 then reads such an identification data, i.e., RF-ID data, owned by the Printer-Tile by applying the electro magnetic transmission and reception method. This in turn enables the Data-Tile system to retrieve the corresponding physical object in the real world and then display the real image of the printer via the transparent area of the portal tile.

Next, such a pen gesture by way of traversing from the tile A to the Printer-Tile is input on the tile, whereby activating step S14.

The above-mentioned pen gesture is detected by a digitizer based on the electromagnetic induction method to enable the computing system 100 to identify the detected results. Next, step S15 is entered, in which contents displayed on the tile A is printed by the printer corresponding to the portal tile. In the meantime, the Data-Tile system transfers data between the corresponding physical objects.

C-3: Parameter Tile:

This description specifically refers to such a tile for adjusting functions and properties of other tiles as a Parameter-Tile, which acts itself as a kind of property sheet.

Figure 5:
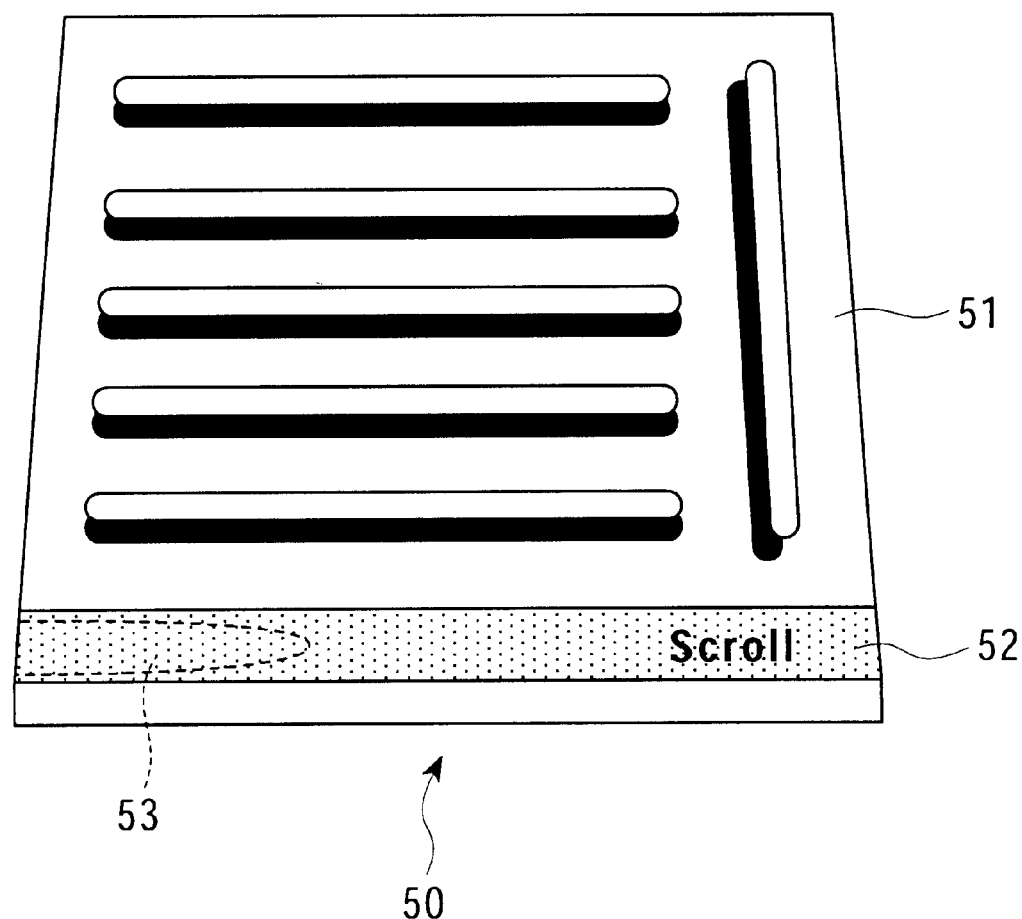
FIG. 5 designates a Scroll-Tile inscribed with a linear groove for functioning as a guide while the scroll operation is underway.

Such a tile superficially inscribed with a plurality of grooves for guiding the pen input operation performed by a user as the one shown in FIGS. 5 and 7 may be utilized for constituting the Parameter-Tile.

For example, it is possible to utilize such a tile inscribed with a plurality of linear grooves as the one shown in FIG. 5. In order to dynamically retrieve data from adjoining tiles such as an application tile or a portal tile, such a Query-Tile may also be used. Name and value of the retrieving parameter are variable in correspondence with adjoining tiles, which are jointly synthesized with display picture image shown on the flat display unit 11.

Further, it is also possible to utilize such a tile inscribed with a circular groove shown in FIG. 7 as a Time-axis (time-machine)-Tile for adjusting time data corresponding to rotary angle or functioning as a Jog-dial Tile.

Figure 18:
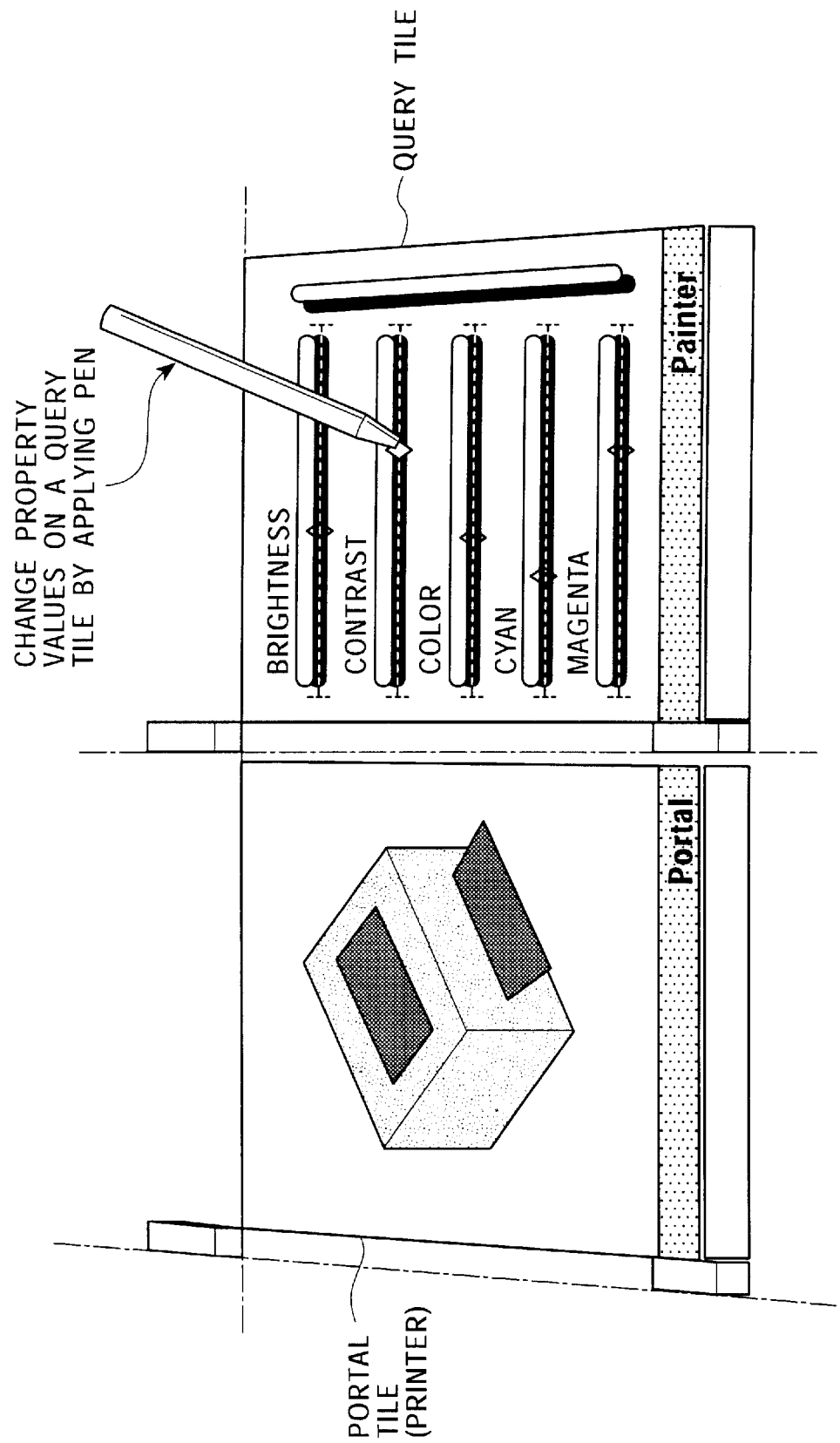
FIG. 18 designates an operating example when an Query-Tile is set to a position adjoining a portal tile expressing a printer.

FIG. 18 exemplifies an operating example when the Query-Tile is disposed at a position adjacent to a portal tile that is expressing a printer.

As shown in FIG. 7, in order to adjust attributes (designation of brightness, tint, and color) of a printer in correspondence with positions of grooves formed in the Query-Tile, a picture image is shown on the flat display unit 11. In consequence, those grooves for guiding the pen input operation and the picture image showing the printer's attributes are synthesized, whereby providing such an interface with reinforced visual data.

By way of manually moving the pen tip along a predetermined groove, a user can optionally vary the values of the corresponding attributes of the printer.

Figure 4:
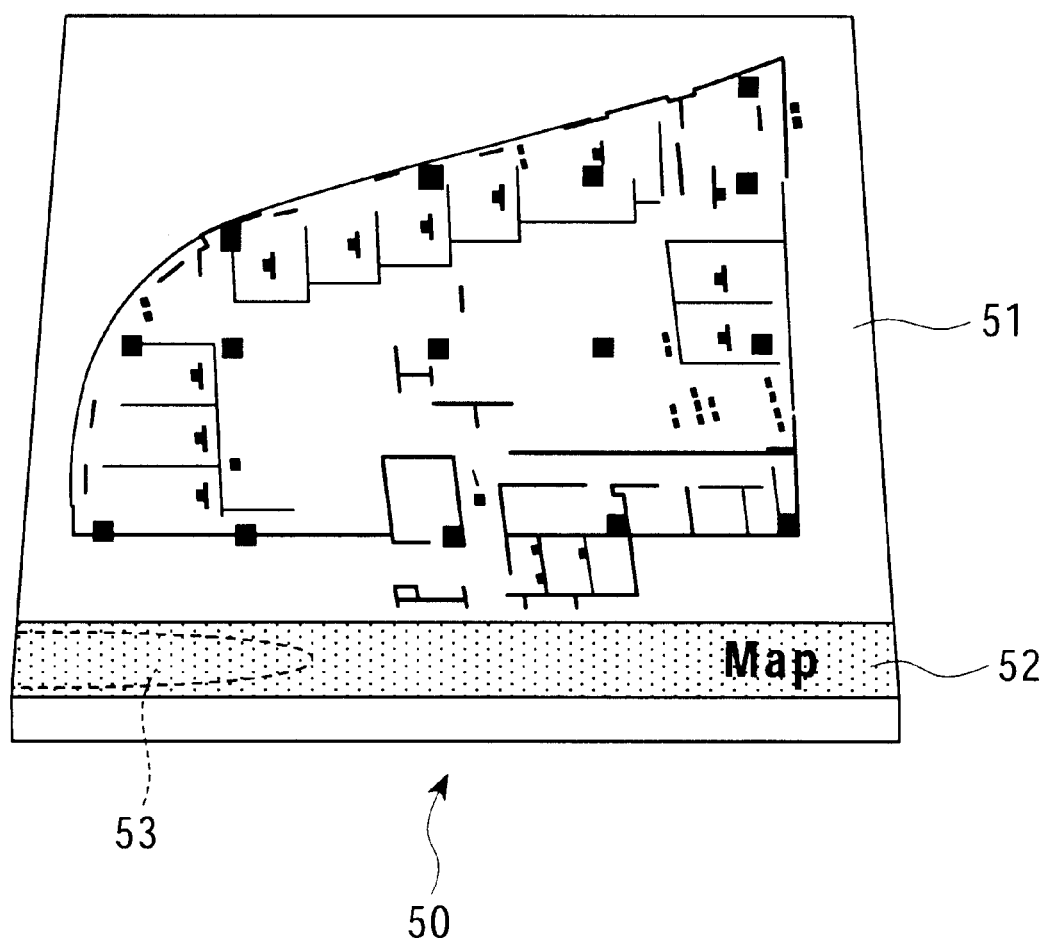
FIG. 4 designates a Map-Tile containing a previously printed plan view and a sketch view inside of a building site.
Figure 19:
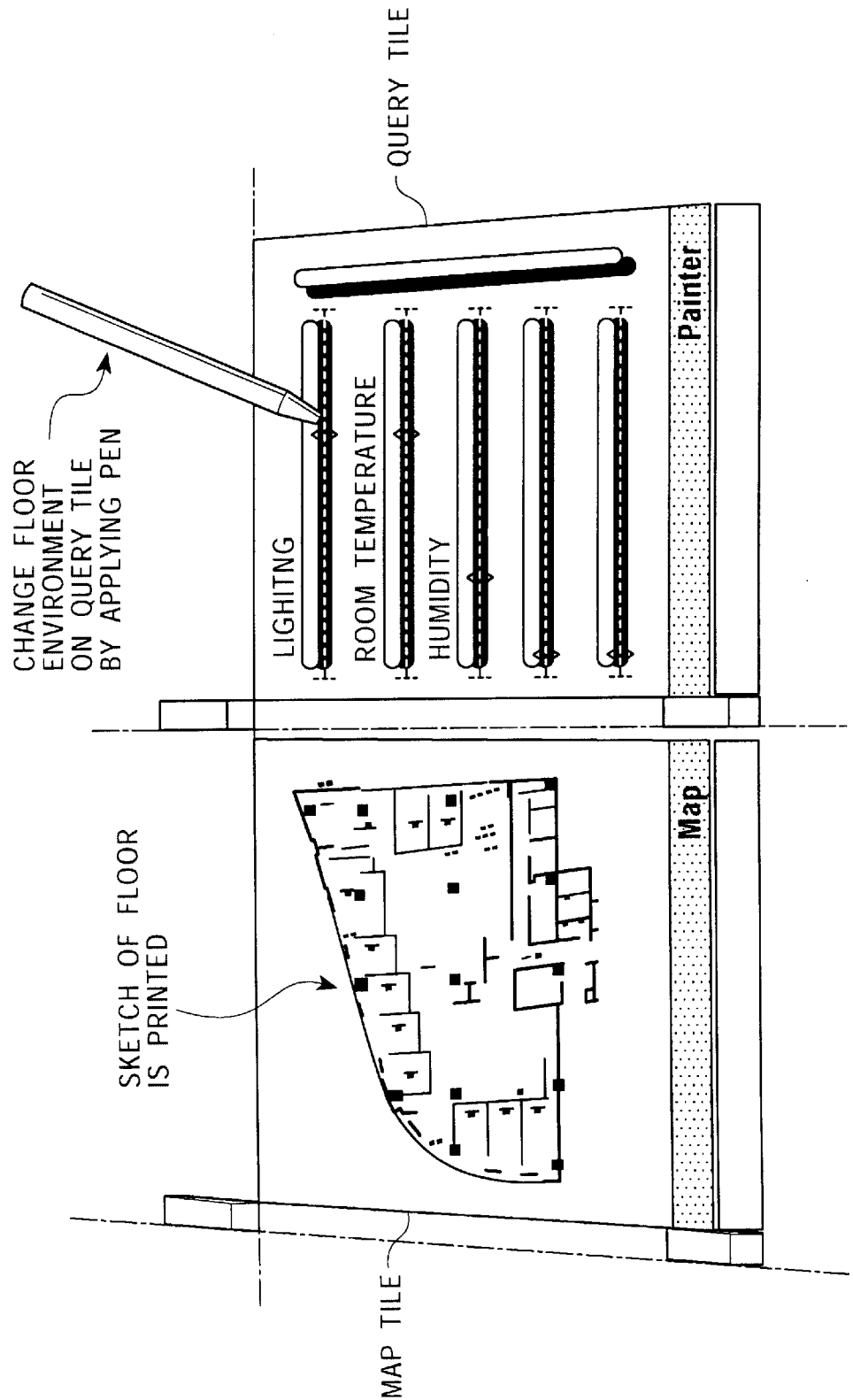
FIG. 19 designates an operating example when an Query-Tile identical to the one shown in FIG. 18 is set to a position adjoining a Map-Tile shown in FIG. 4.

FIG. 19 exemplifies an operating example when the Query-Tile identical to the one shown in FIG. 18 is set to a position adjacent to the Map-Tile shown in FIG. 4.

As shown in FIG. 19, in order to adjust environmental condition such as illumination, room temperature, and humidity inside of the floor displayed on the Map-Tile, in correspondence with positions of those grooves formed in the Query-Tile, a picture image is shown on the flat display unit 11. In consequence, those grooves for guiding the pen input operation are synthesized with the picture image exhibiting actual environmental condition of the floor, whereby providing such an interface with reinforced visual data. Further, even when utilizing an identical Query-Tile, because of the difference between adjoining tiles, it is possible to provide a discrete property sheet.

Further, by way of manually moving the pen tip along a predetermined groove, a user can optionally vary the values of the environmental value of the corresponding floor.

C-4: Container-Tile:

This description specifically refers to such a tile for storing data and contents data as Container-Tile.

By way of disposing the Container-Tile at a position adjacent to another tile capable of holding any data for example, it is possible for the Container-Tile to transfer, exchange, and copy data via execution of pen gesture such as the drag and drop movement between tiles. By causing the computing system 100 to sustain such data specified against such an object symbolized by the Container-Tile in the related form for example, it is possible to realize such Container-Tile.

Figure 20:
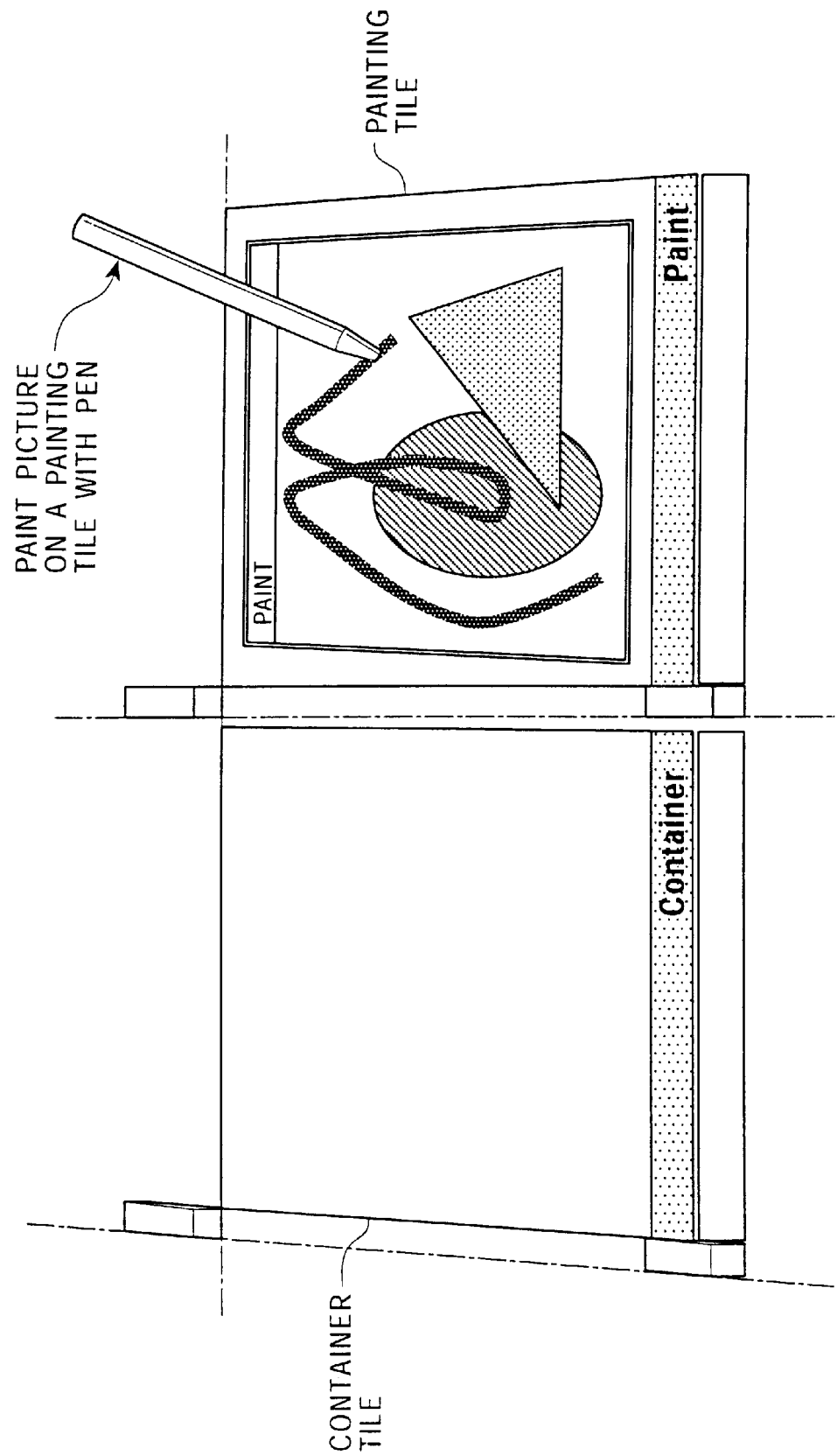
FIG. 20 designates a chart illustrating such an aspect in which data is transferred, exchanged, and copied by way of performing pen gesture via a drag and drop operation between a Container-Tile and another adjoining tile; more concretely, such an aspect is shown, in which painting image data is transferred between a Container-Tile and another adjoining Paint-Tile.
Figure 21:
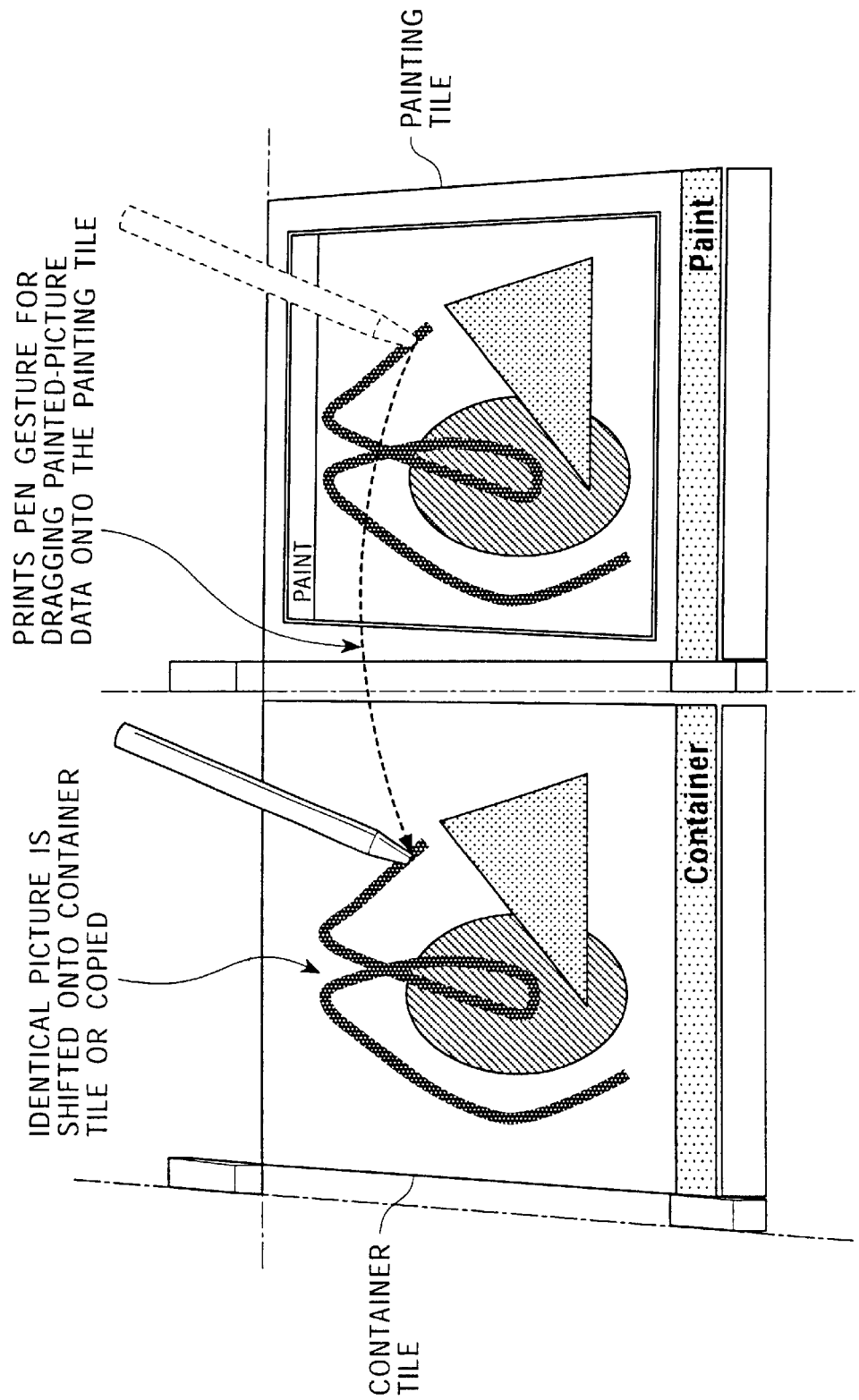
FIG. 21 designates a chart illustrating such an aspect in which painted picture data is transferred between a Container-Tile and another adjoining Paint-Tile.

For example, FIGS. 20 and 21 respectively illustrate such an aspect in which paint data is transferred between the Container-Tile and the adjoining Paint-Tile.

Initially, when the Paint-Tile is disposed on the flat display unit 11, the computing system 100 identifies a specific RF-ID data owned by the corresponding wireless tag 53, and then activates a corresponding Paint-Tile. Next, by applying a transparent area of the Paint-Tile, paint picture area is shown on the flat display unit 11. Because of this, a user can paint any desired picture on the Paint-Tile by way of executing the pen input operation.

After completing a picture painting operation on the Paint-Tile, a user adds such a pen gesture onto the Paint-Tile by way of drag an object from the Paint-Tile to the Container-Tile. As a result, picture contents painted onto the Paint-Tile are transferred to the Container-Tile or copied. Simultaneously, as shown in FIG. 21, visual feedback is given to a user in order that such a picture data identical to that of the adjoining Paint-Tile can be shown via transparent area of the Container-Tile.

Such a paint picture data edited on a painting application is realized by causing the computing system 100 to hold such painted picture data edited via the painting application program based on a method related to the Container-Tile or related to the RF-ID data of the Container-Tile. Thenceforth, it is possible to carry related picture data through the medium of an real world physical object called a Container-Tile. Further, it is possible to access accumulated picture data merely by placing the Container-Tile on the flat display unit 11.

Figure 22:
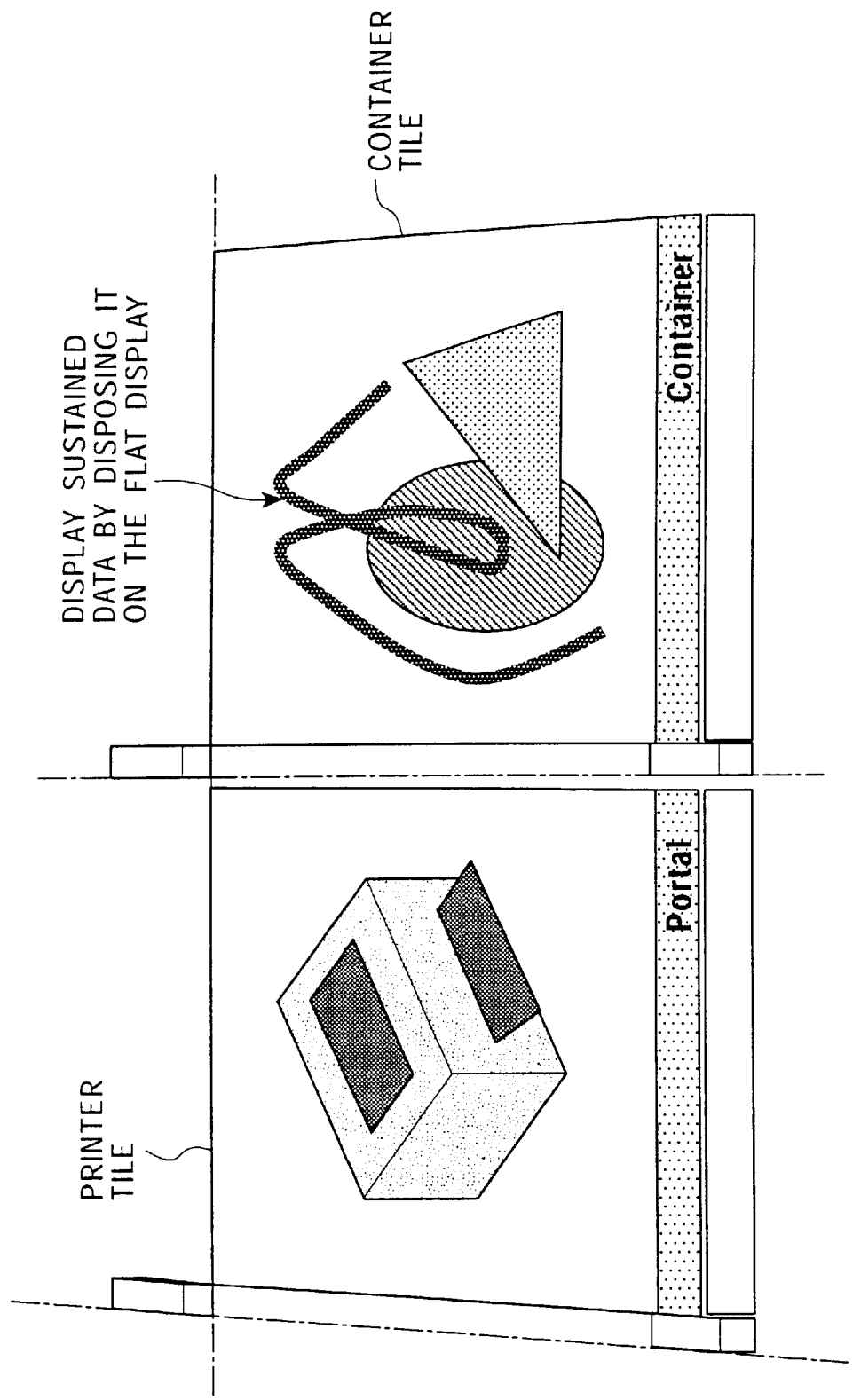
FIG. 22 designates a chart illustrating such an aspect in which data is transferred, exchanged, and copied by way of performing pen gesture via the drag and drop movement between a Container-Tile and another adjoining tile; more concretely, such an aspect is shown, in which data on a Container-Tile is transferred to a Printer-Tile.
Figure 23:
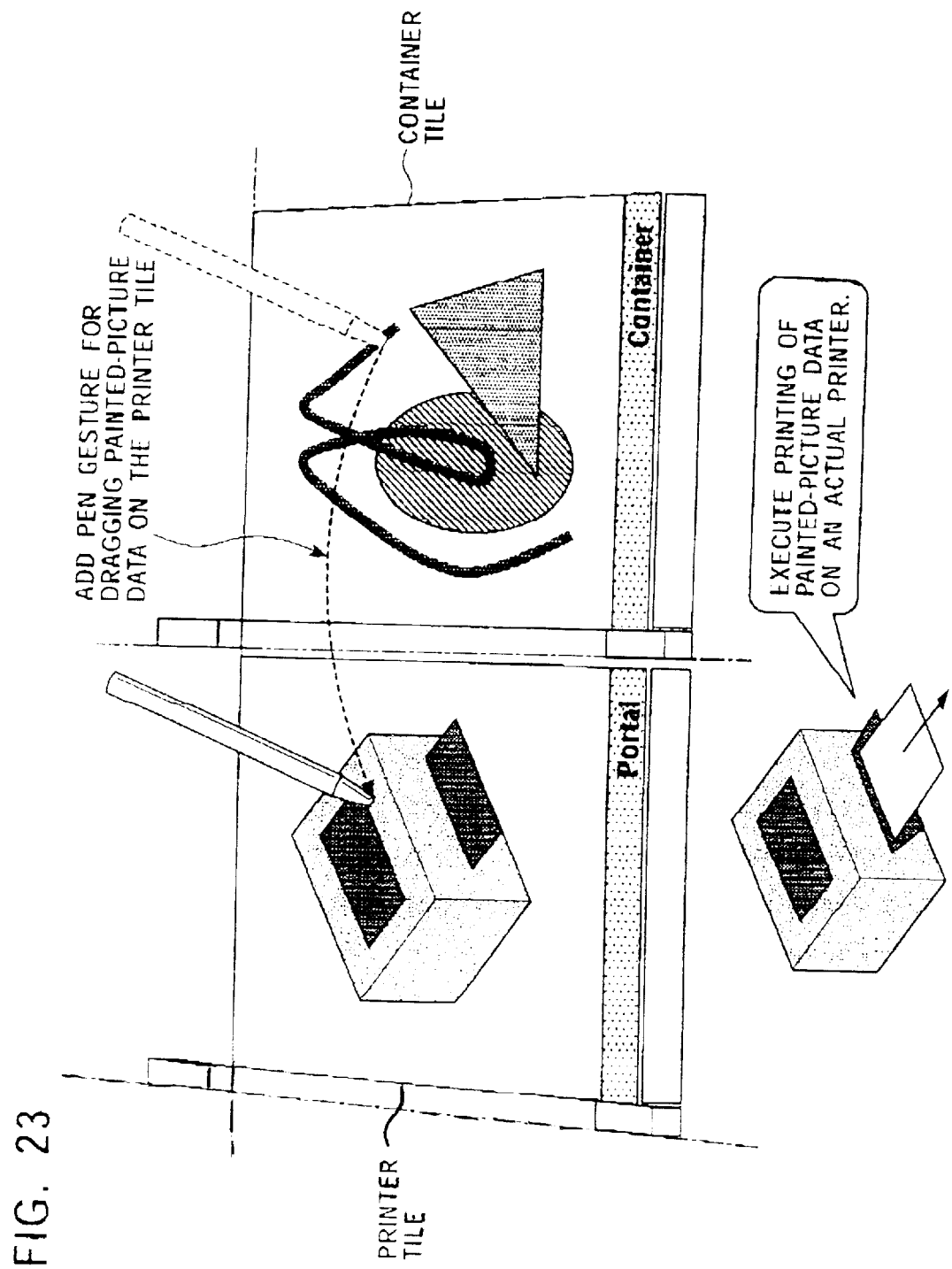
FIG. 23 designates a chart illustrating such an aspect in which data on a Container-Tile is transferred to a Printer-Tile.

FIGS. 22 and 23 respectively illustrate such an aspect in which data is transferred between the Container-Tile and an adjoining portal tile. It is assumed in the exemplified illustration that painted picture data is held by the Container-Tile via the above-referred processes. In this example, the Printer-Tile is used for serving as a portal tile. In response to the transfer of data from the Container-Tile to the Printer-Tile, the real world printer assigned to the portal tile executes printing operation of the transferred data.

Further, when the Container-Tile previously provided with painted picture data is disposed on the flat display unit 11, an RF-ID data owned by a wireless tag of the Container-Tile is identified. Then, the computing system 100 reads the painted picture data assigned to the Container-Tile to cause the corresponding picture data to be shown on the flat display unit 11 by applying the transparent area of the Container-Tile.

Next, a user adds such a pen gesture onto the Printer-Tile by way of drag an object from the Container-Tile to the adjoining Printer-Tile. As a result, the painted picture data is transferred from the Container-Tile to the Printer-Tile to cause the real world printer assigned to the Printer-Tile to execute an operation to print the transferred data.

Simultaneously, the computing system 100 may acquire real image from a camera shooting the actual printer via a network service line, and then, display image of real object, in other words, actual aspect of the print output by applying the transparent area of the Printer-Tile.

By utilizing the Container-Tile, it is possible to cause data to be transferred between computers in order to effect a pick and drop [refer to annotation 14] and/or a media block [refer to annotation 15]. For example, by way of storing the picture data such as stationary pictures and moving pictures in the Container-Tile, in other words, by assigning to the Container-Tile, it is possible to reproduce data on the other tiles.

The operation called pick and drop cited above corresponds to such an aspect in which the GUI operation called drag and drop has been expanded in the real space. Actually, this corresponds to such an interactive technique comprising the transfer of a plurality of data objects between a plurality of computers into mapping of instinctive operation in the real world. When pointer exceeds picture screen via continuous drag of a certain object on a desk top of a computer for allowing user's pen input operation, the drag operation is continued up to a desk top of another adjoining computer to lead to appearance of the pointer as of the state of drag the corresponding object.

Figure 24:
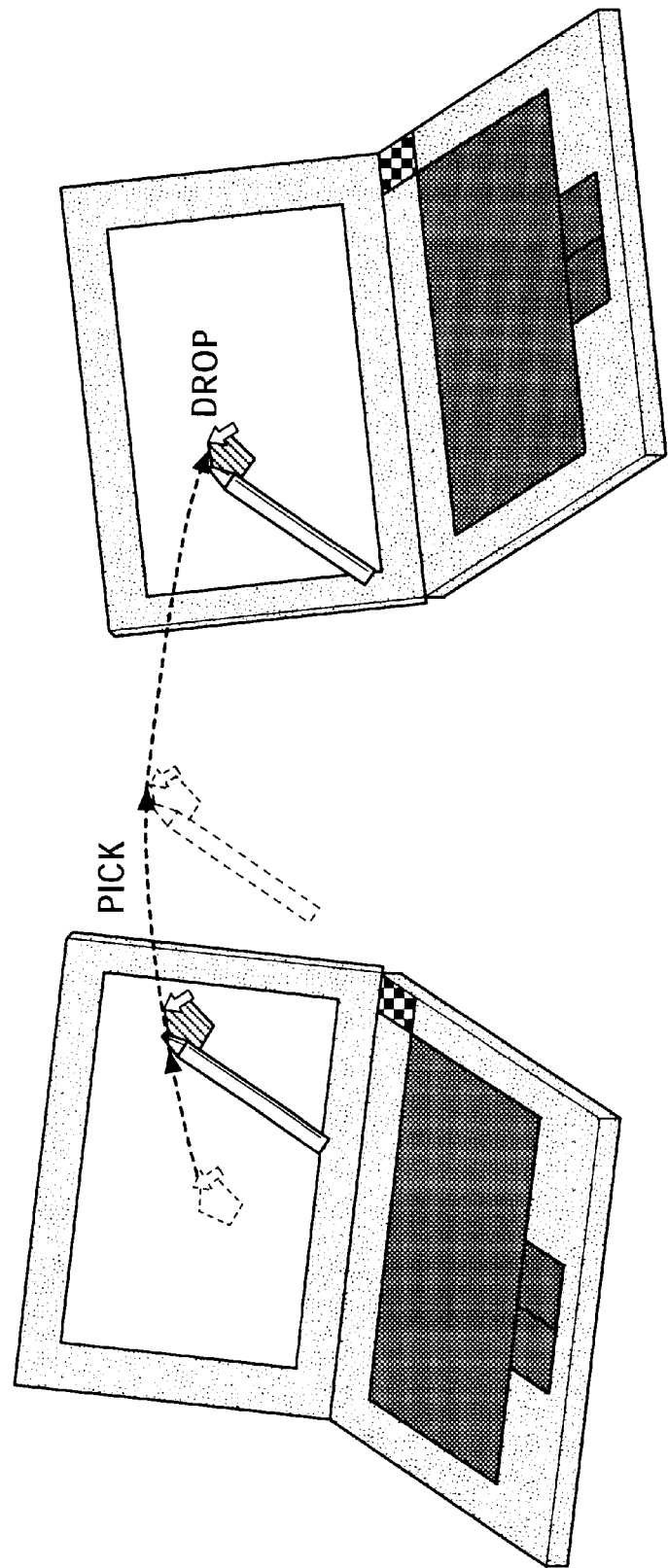
FIG. 24 designates a chart for explanatory of a pick and drop operation; more concretely, such an aspect is shown, in which GUI operation is continued between display screens of adjoining lap-top type computers, where digital object on a display is dropped onto another display across real spaces.

When the pointer on the desk top of another computer arrives at an end of the picture screen, the pointer disappears as of the state of drag some object. This action is called a pick of digital object. Such action to cause the pointer to appear itself on the desk top of another computer as of the state by way of continuing drag of the corresponding object is called a drop of the object. On the other hand, entity (comprising data files for example) of the corresponding object on the background of such a computer for executing the pick and drop process is transferred via a network line. FIG. 24 illustrates such an aspect in which a digital object is subject to the above pick and drop process between adjoining lap-top type computers. The pick and drop process is already disclosed in the Japanese Patent Laid-Open Publication No. H11-53236 of 1999 which is also assigned to the Applicant of the present invention.

It is possible for the above Container-Tile to combine those data held by plural tiles altogether and to store them. For example, as shown in FIG. 25, it is possible for the Container-Tile to store individual moving pictures such as video clips, for example, by combining them with each other via serial steps including alignment of Movie-Tiles in the horizontal direction and a process of adding such a pen gesture for drag on these tiles to terminate the drag process at the Container-Tile.

Referring now to the flowchart shown in FIG. 37, serial processes for storing data contents held by a plurality of tiles en bloc is described below. It is assumed that such the Movie-Tile containing movie contents is used as the data for sustaining data contents.

Figure 25:
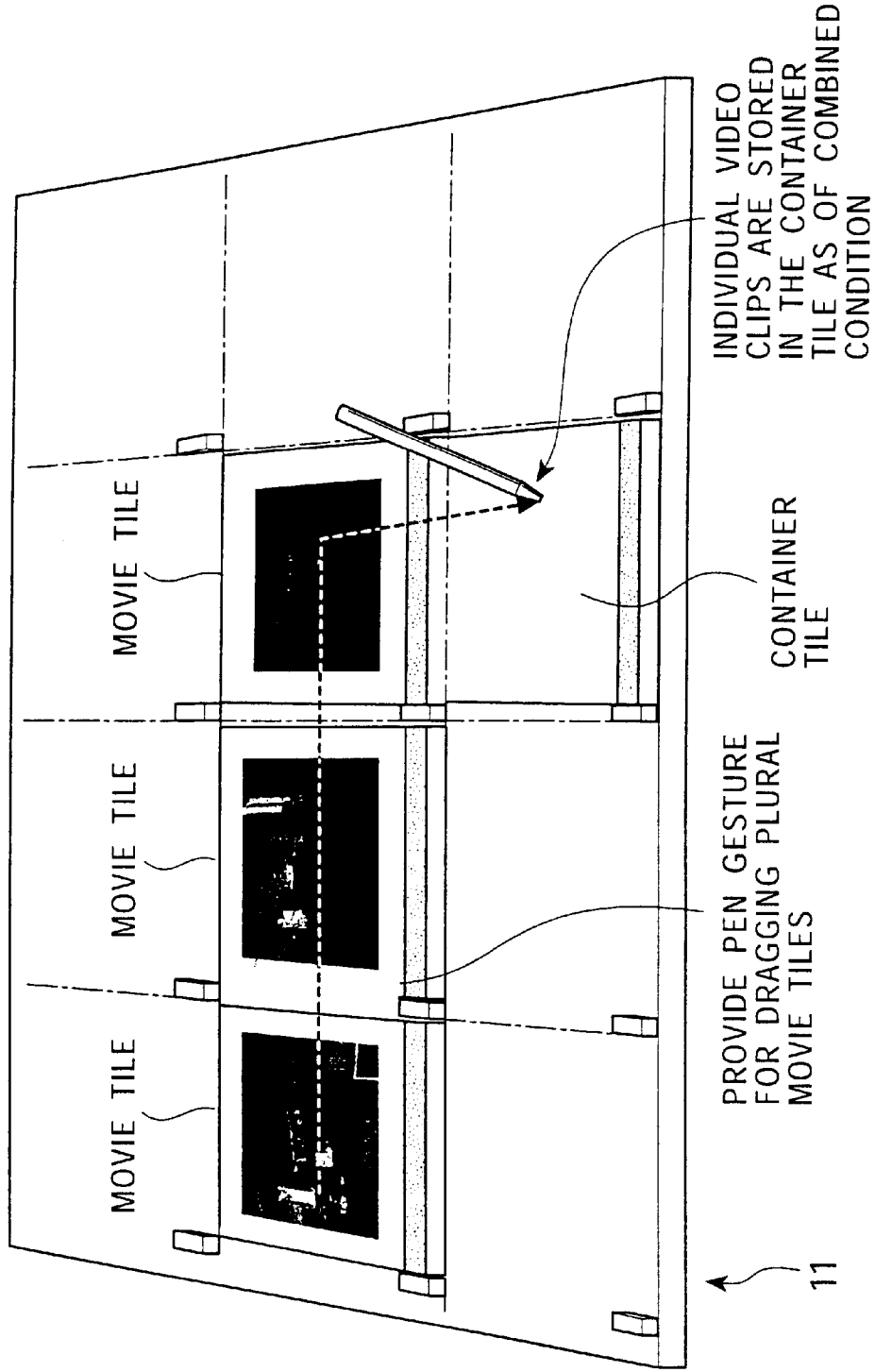
FIG. 25 designates a chart illustrating such an aspect in which a plurality of Movie-Tiles are aligned in a row in the horizontal direction, and then, pen gesture for drag on these tiles is added to cause the Container-Tile to terminate drag movement.

First, step S21 is entered, in which, as shown in FIG. 25, a plurality of Movie-Tiles are horizontally aligned on the flat display unit 11 in linkage with each other.

Initially, the computing system 100 reads identification data, i.e., RF-ID data, owned by individual Movie-Tiles by applying electro magnetic transmission and reception method. In response, the Data-Tile system retrieves the processed result by applying the corresponding ID data as a key, and then displays the retrieved moving picture or its key frame via transparent areas of individual tiles.

Next, step S22 is entered, in which the Container-Tile is placed on the side of the Movie-Tiles. The computing system 100 reads identification data, i.e., RD-ID data, owned by individual Movie-Tiles by applying electromagnetic transmission and reception method, whereby identifying presence of the Container-Tile.

Next, step S23 is entered, in which, as shown in FIG. 25 via a dot line with an arrow, the pen gesture is manually added by way of traversing individual Movie-Tiles.

Next, step S24 is entered, in which the added pen gesture is detected by the digitizer based on the electromagnetic induction method to enable the computing system 100 to identify this result. Then, the movie data is stored in the Container-Tile as of the state in which horizontally aligned Movie-Tiles are linked with each other along the pen-input operating direction.

The data contents comprising individually linked movies are stored in the Data-Tile system in relation with identification data of the Container-Tile. Accordingly, by way of operating the Container-Tile on the flat display unit 11, it is possible to recall (i.e., display) the linked movies again.

The description further refers to a Macro-Tile as a modified example of the Container-Tile. The Macro-Tile has such function which initially records the pen-input operation performed on an adjoining tile and then reproduces the recorded pen-input operation.

The above Container-Tile merely holds such data and contents dragged on tiles. It is also possible to provide the act of storing data in the Container-Tile with such metaphor called a conduct of purchasing. In this description, such an example of applying the Container-Tile is referred to as a Commerce-Tile.

Next, referring to the flowchart shown in FIG. 38, serial processes for purchasing data contents on the Data-Tile system by applying the Commerce-Tile are described below. It is assumed that music data is purchased through the medium of a Music-Tile which contains music data.

First, step S31 is entered, in which the Music-Tile is placed on the plain display unit 11.

Next, step S32 is entered, in which, based on the electromagnetic transmission and reception method, the computing system 100 reads identification data, i.e., RF-ID data, owned by individual Movie-Tiles. In response, the Data-Tile system retrieves the processed result by applying the corresponding identification data as a key, and then reproduces the retrieved music data or sample of this music data.

Next, step S33 is entered, in which the Commerce-Tile is placed on the flat display unit 11. In response, based on the electromagnetic transmission and reception method, the computing system 100 reads identification data, i.e., RF-ID data, owned by the Commerce-Tile, whereby identifying presence of the Commerce-Tile.

FIG. 39 illustrates such an aspect in which the Commerce-Tile is disposed at a position adjacent to the Music-Tile. Not only the RF-ID data for identifying the Commerce-Tile itself, but the Commerce-Tile may also contain a specific identification data proper to the purchasing person or such a user authentication data as well. Further, the Commerce-Tile may also contain such a purchasing button used for entering an instruction to determine whether such a music source heard via a corresponding sample held in the Music-Tile should be purchased or not.

In such a case in which a user, in other words, owner of the Commerce-Tile has decided to purchase such a favorite music data after listening to the corresponding sample, step S34 is entered, in which the user performs a pen input operation against the purchasing button on the Commerce-Tile. The pen input operation is detected by the digitizer via the electromagnetic induction method to cause the computing system 100 to identify the detected result, whereby activating the predetermined purchasing procedure.

To effect such a purchasing procedure, it is possible to introduce such an on-line purchasing system. The purchasing procedure includes a charging process. It is possible for the Data-Tile system to utilize a variety of settling means including: cash payment, payment via a pre-paid card, payment via a credit card, instant payment via a debit card, and payment via electronic money, or the like. Inasmuch as the procedure for purchasing the data contents deviates from the essentials of the present invention, further description is deleted.

The above description exemplifies such the Music-Tile for bearing music data. It is of course possible to apply the Commerce-Tile to effect procedure for purchasing the movie data, pictures, actual commodities, a variety of products, and a variety of services procurable via the on-line services.

As a varied example of the utility of the Commerce-Tile, it is also possible to dispose an authentication apparatus such as a portable telephone for example other than such tiles incorporating RF-ID data at a position adjacent to these tiles. In this case, it is suggested for a user to prepare a certain button corresponding to the above-referred purchasing button on the liquid crystal display on the surface of the corresponding apparatus.

C-5: Remote-Tile:

This description specifically refers to such tiles for linking a plurality of working environments as a Remote-Tile.

The Remote-Tile comprises a master tile functioning itself as the transmitter and a slave tile functioning as the transferee. The master tile is set to a position adjacent to a certain tile on the flat display unit 11, whereas the slave tile is disposed on another flat display unit 11. This establishes connection between the two tiles to enable data received by the master tile to be transferred to the slave tile.

The computing system 100 assigns such data or contents dealt on tiles adjacent to the master tile to the master tile, and yet, the computing system 100 establishes such network communication with another computing systems for controlling another flat display unit 11 superficially disposed with the slave tile, whereby transferring data stored in the master tile. On the other hand, by utilizing the transparent area of the slave tile, the above-referred another computing system visually feeds back the effect of the data transfer by causing the received data to be displayed on the flat display unit 11. Not only the display contents of picture image, but the pen input data added onto the master tile is also transferred to the slave tile.

Figure 26:
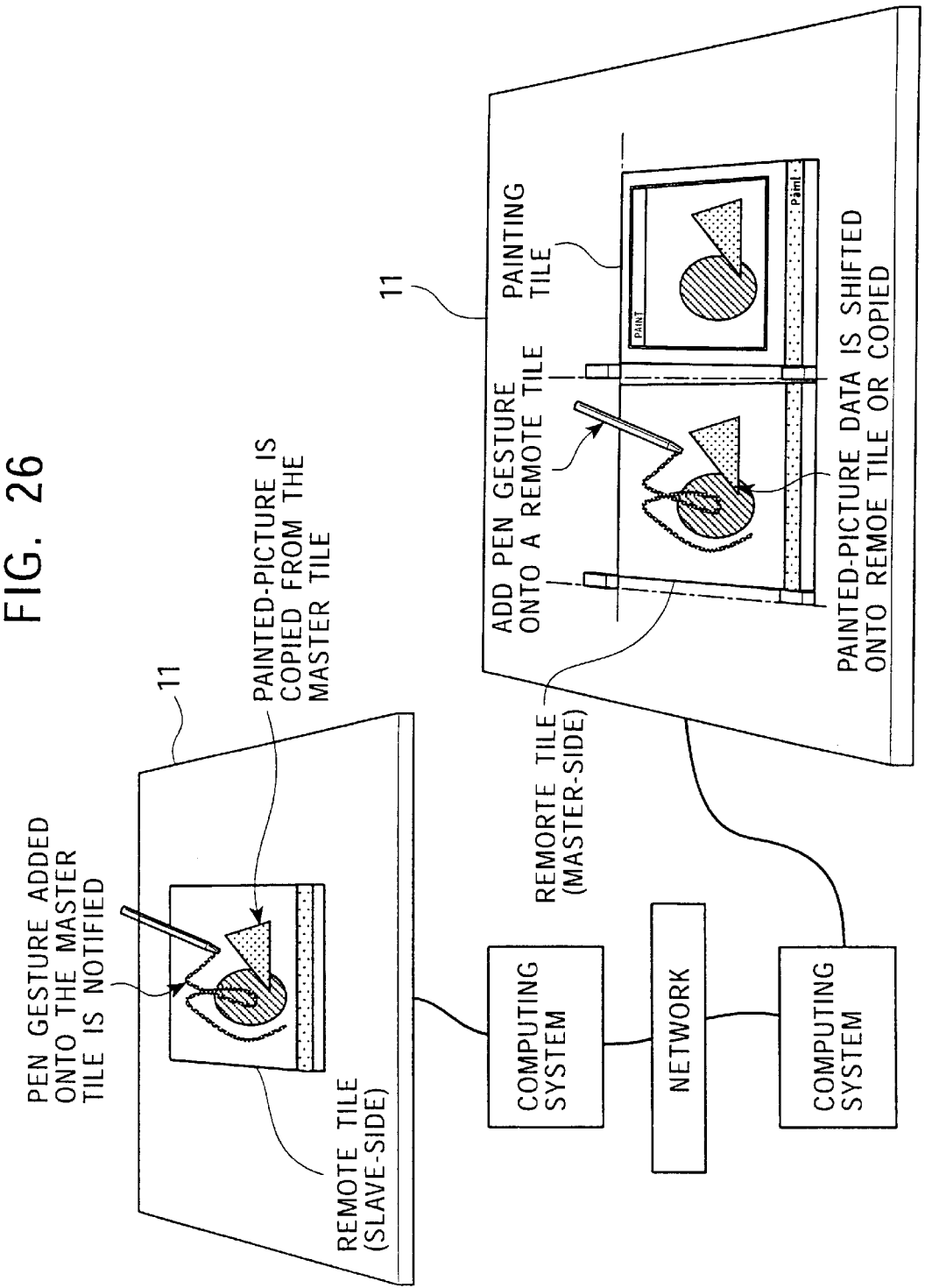
FIG. 26 designates a chart illustrating an operating example of a Remote-Tile; more concretely, such an aspect is shown, in which pen operation and picture data on a master tile is transmitted to a slave tile via a communication network.

FIG. 26 illustrates an example of the operation performed by the Remote-Tiles.

In the example shown in FIG. 26, the master tile is disposed by way of adjoining the above-referred Paint-Tile which constitutes an example of the application tile. After identifying the RF-ID data owned by the wireless tag of the master tile, the computing system 100 transfers painted picture data edited on the Paint-Tile to the Container-Tile or copies the picture data. Simultaneously, by utilizing transparent area of the Container-Tile, the computing system 100 provides a user with visual feedback effect by way of displaying painted picture data identical to that is shown on the adjoining Paint-Tile.

Next, the slave tile is disposed on another flat display unit 11. By way of reading RF-ID data owned by a wireless tag of the slave tile, another computing system tries to establish its own network communication with such a computer system on the way of identifying the master tile. On receipt of the painted picture data stored in the master tile, by utilizing transparent area of the master tile, the above-referred another computing system externally displays the received picture data. In addition, such pen input operation added onto the master tile is informed to the slave tile via the network service line, and then, the computing system 100 provides a user with visual feedback by operating display screen of the flat display unit 11.

D: Synthesis of Functions Via Combination of Tiles:

As described above, specific functions are assigned to individual tiles. Individual users are enabled to execute corresponding functions merely by way of placing tiles as physical tiles on a flat display unit 11 functioning as a visual interface.

Further, by way of combining a plurality of tiles with each other, it is possible to express further sophisticated functions via synthesis of individual functions. The following description exemplifies synthesis of functions based on the arrangement of the adjoining tiles to be disposed.

(1) Disposition of the Map-Tile Adjacent to Portal Tile:

By way of disposing the Map-Tile at a position adjacent to the above referred portal tile, it is possible to check actual positions of real world objects corresponding to the portal tile and change the relationship between the portal tile and real world objects.

Figure 27:
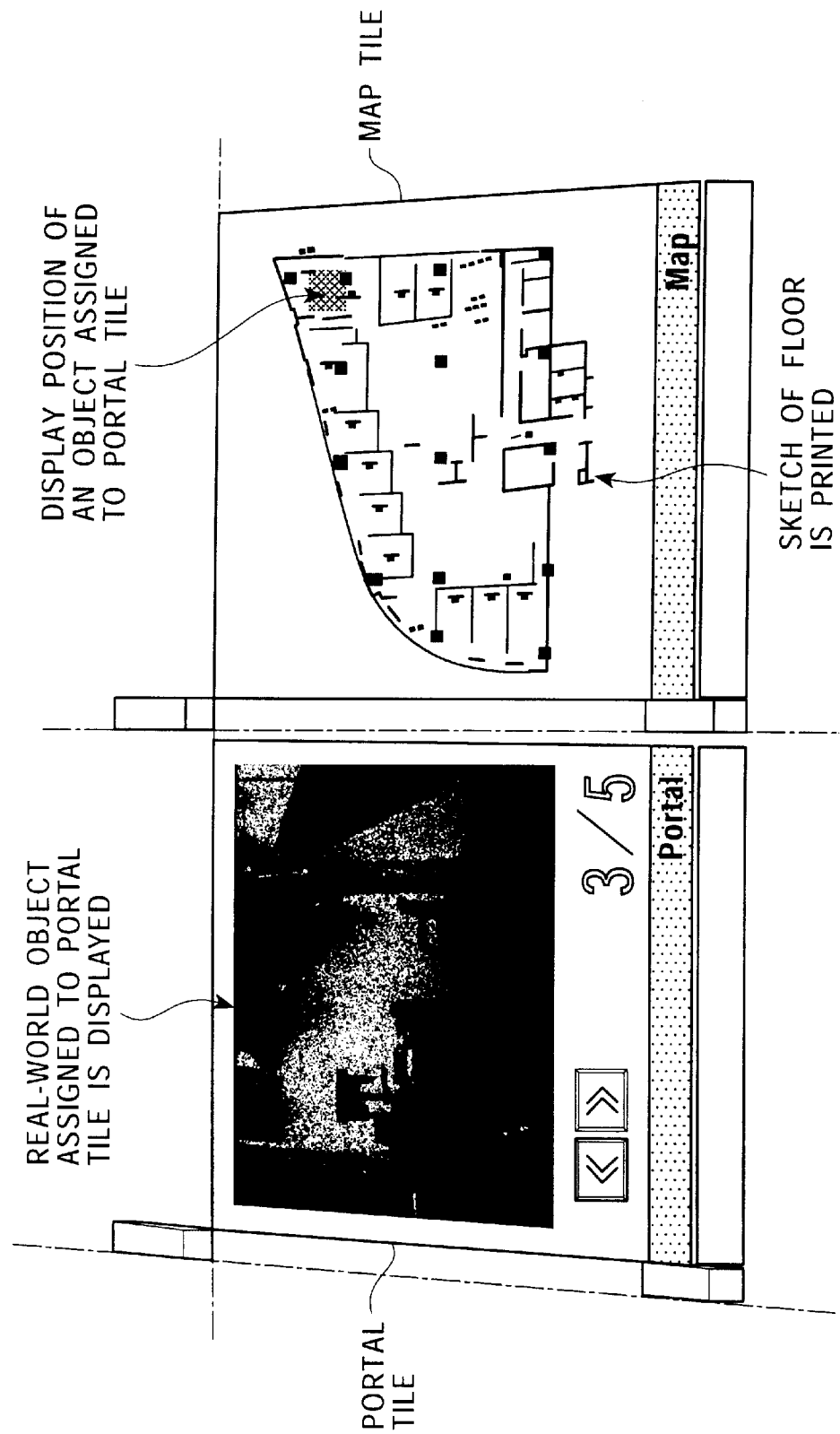
FIG. 27 designates a chart illustrating cooperative operation via a Map-Tile and a portal tile; more concretely, such an aspect is shown, in which presence of real world objects assigned to the portal tile is displayed on the Map-Tile by way of placing the Map-Tile on a position adjoining the portal tile.
Figure 28:
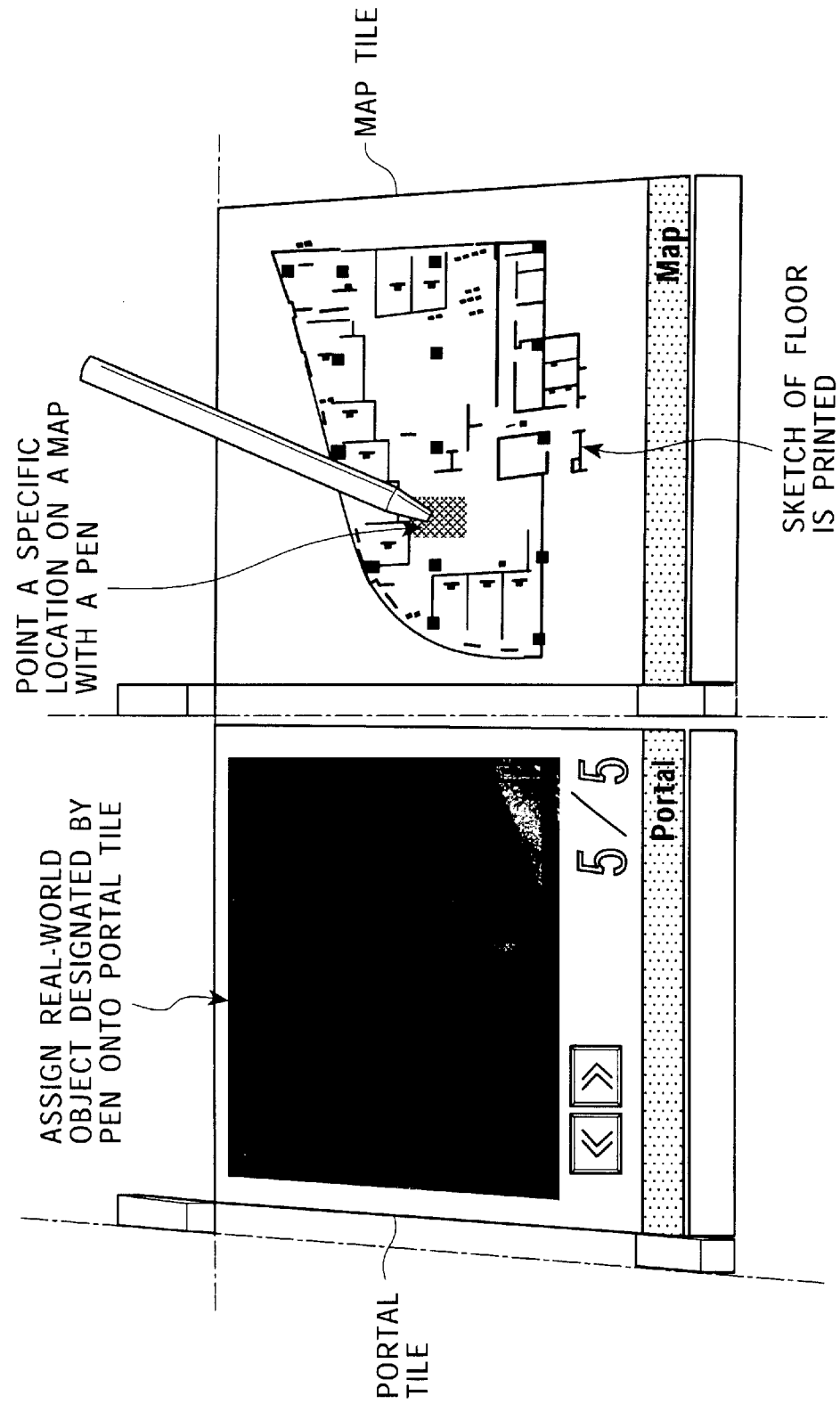
FIG. 28 designates a chart illustrating cooperative operation via the Map-Tile and the portal tile; more concretely, such an aspect is shown, in which real world objects that should be assigned to the portal tile is specified by way of placing the Map-Tile on a position adjoining the portal tile and by way of designating a specific position on the Map-Tile with a pen.

For example, by way of placing the Map-Tile at a position adjacent to the portal tile, it is possible to display presence of real world objects assigned to the portal tile (refer to FIG. 27).

On the other hand, by way of instructing a specific position on a map (or sketch) printed on the Map-Tile via the pen input operation, such an real world object corresponding to the specified position is newly assigned to the portal tile. As a result, the computing system acquires photographs from a camera on the way of shooting the newly assigned objects, and then, by utilizing transparent area of the portal tile, displays photographed picture of the newly assigned object, or display contents are switched from an old object over to a new object.

Figure 29:
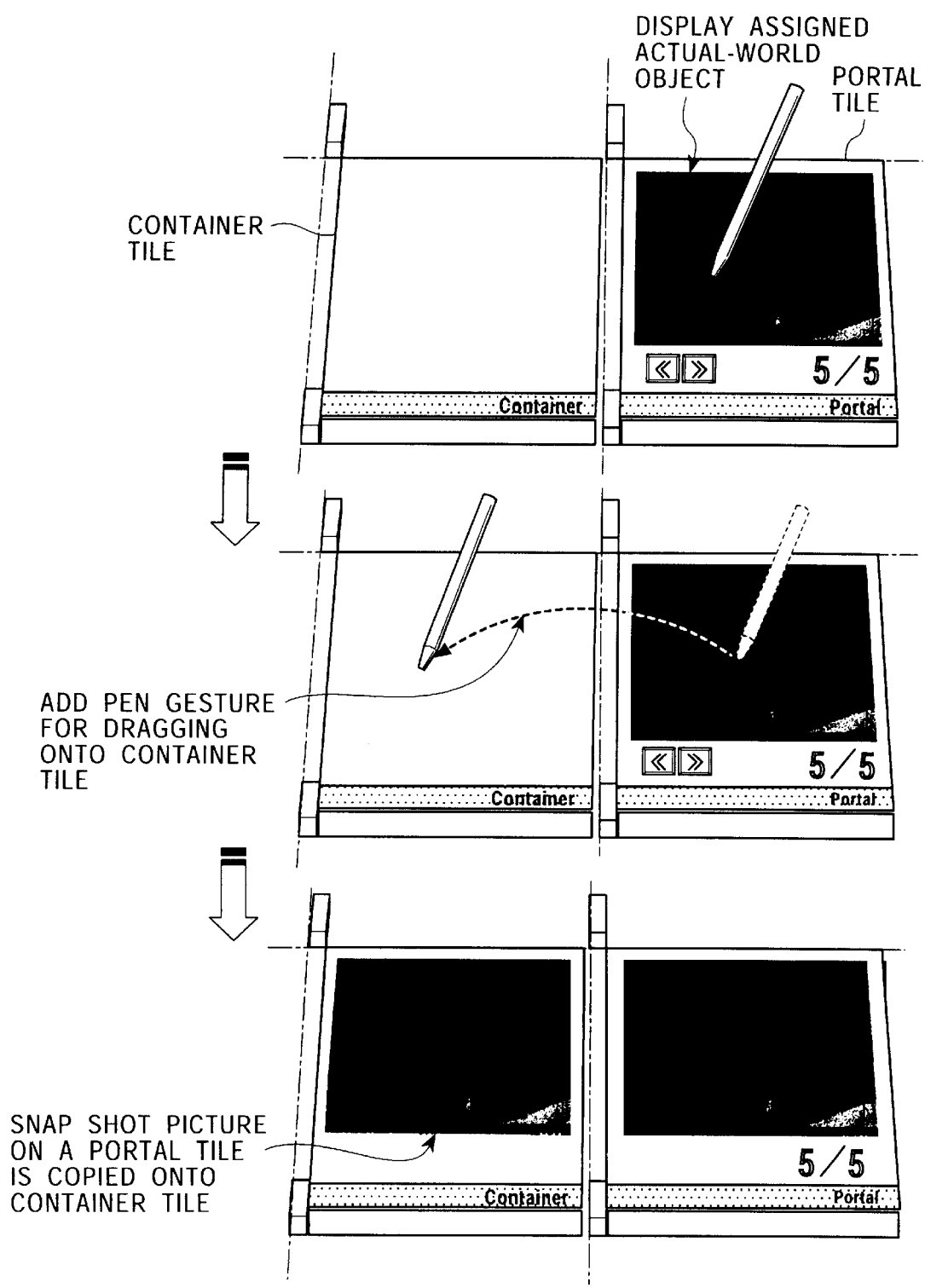
FIG. 29 designates a chart illustrating cooperative operation via the Container-Tile and the portal tile; more concretely, such an aspect is shown, in which snap shot of picture displayed on the portal tile is stored in a Container-Tile in response to pen gesture performed between tiles.

(2) Disposition of the Container-Tile Adjacent to the Portal Tile:

By way of initially placing the Container-Tile at a position adjacent to the portal tile and then adding the pen gesture via drag across tiles, it is possible to store picture image (real picture of an assigned object) displayed on the portal tile in the Container-Tile (refer to FIG. 29).

In this case, the computing system 100 acquires snap shots of image photographed by a camera used for shooting real world objects assigned to the portal tile, and then the acquired photographs are correspondingly stored in the Container-Tile.

Figure 30:
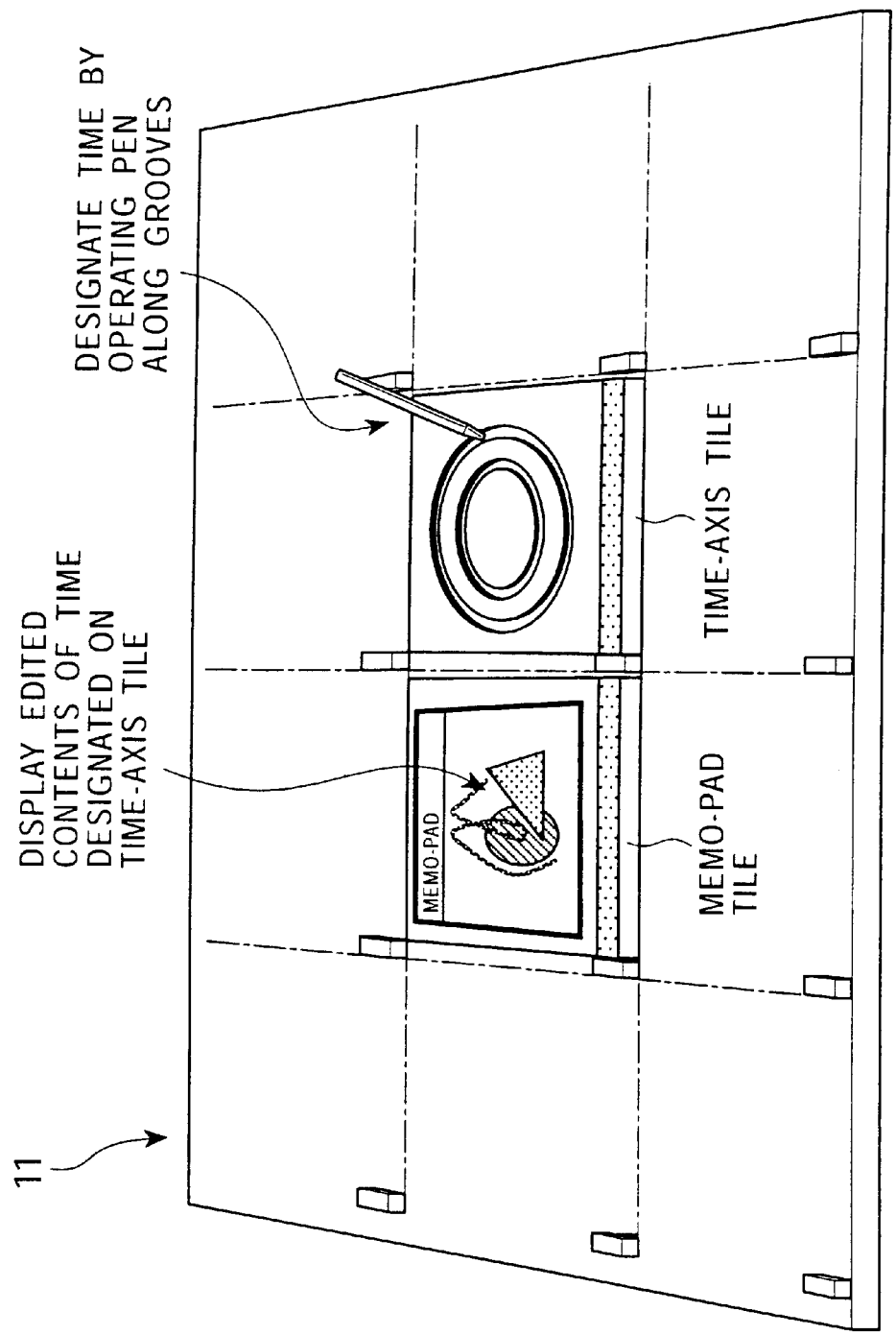
FIG. 30 designates cooperative operation via the Parameter-Tiles and the portal tiles; more concretely, such an aspect is shown, in which a Time-axis-Tile is disposed at a position adjoining a Memo-pad-Tile, and then, past editing contents designated on the Time-axis-Tile are displayed on the Memo-pad-Tile.
Figure 31:
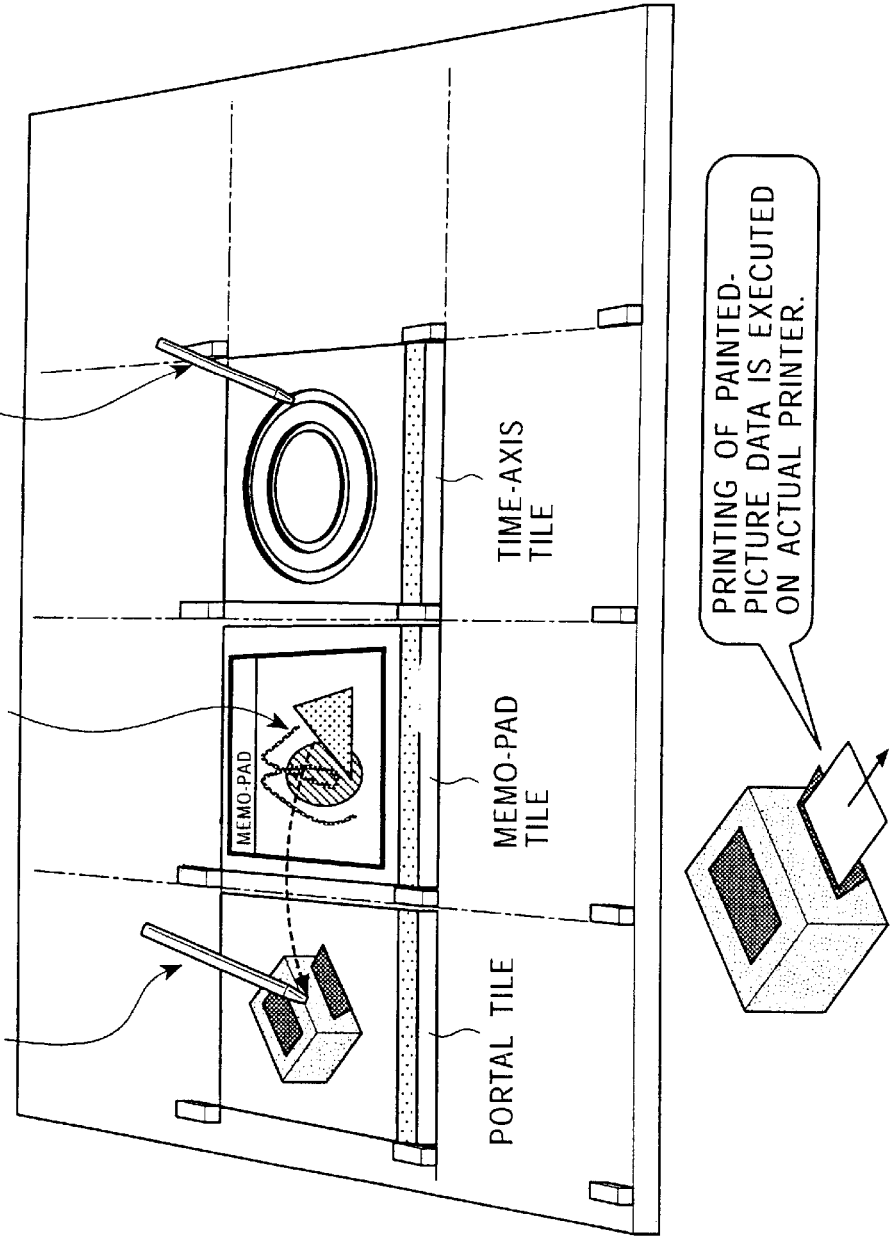
FIG. 31 designates cooperative operation via a Parameter-Tile and an application tile; more concretely, such an aspect is shown, in which picture data painted at the time designated on the time axis is printed by applying the portal tile.

(3) Disposition of the Time-axis-Tile Adjacent to Portal Tile:

It is possible to utilize such Parameter-Tile superficially formed with circular grooves shown in FIG. 7 for specifying time on the time axis. By way of disposing such Time-axis-Tile at a position adjacent to the Memo-pad-Tile, it is possible to display the contents edited in the past by ascending to the time specified on the time axis (refer to FIG. 30).

Further, it is also possible to execute a printing operation by disposing the portal tile assigned to the real world printer at the side of the Memo-pad-Tile. In this case, by adding such a pen gesture onto the Memo-pad-Tile by way of drag picture data on the Memo-pad-Tile onto the Printer-Tile, a printing job is issued.

Simultaneously, the computing system 100 acquires the real video image from a camera on the way of shooting an actual printer via the network service line, and then, by utilizing transparent area of the Printer-Tile, the computing system 100 also displays actual aspect of the print output operation.

Irrespective of simple function executed by individual tiles, by way of allowing combination of mutual functions between plural tiles, it is possible to construct flexible and versatile functions.

There may be such a case in which an identical tile exerts such different function in accordance with a surrounding condition. For example, inasmuch as the above-referred Time-axis-Tile is usable for navigation on a tile bearing concept of time and for general purposes, by disposing the Time-axis-Tile at a position adjacent to a video tile assigned to the moving-picture display application program, the Time-axis-Tile also functions as a jog dial. On the other hand, when the Time-axis-Tile is disposed at a position adjacent to the Memo-pad-Tile, as mentioned earlier, the Time-axis-Tile functions itself as the Time-axis-Tile for recalling the contents edited in the past.

When coinciding relationship is confirmed, adjoining tiles are combined with each other, whereby synthesizing respective functions. Form of the combination includes such a discrete type that causes data to be transferred between tiles in response to an explicit instruction such as user's pen input gesture and another type that causes data to be transferred automatically and continuously solely because tiles are in the mutually adjoining relationship.

As a typical example of the former discrete type, for example, such a relationship between the Container-Tile and other tiles is exemplified (refer to FIGS. 20, 21, 22, and 23). As a typical example of the latter continuous type, such a process is exemplified, in which a video tile is linked with the Remote-Tile on the master side to enable execution of streaming against the Remote-Tile on the slave side.

Figure 32:
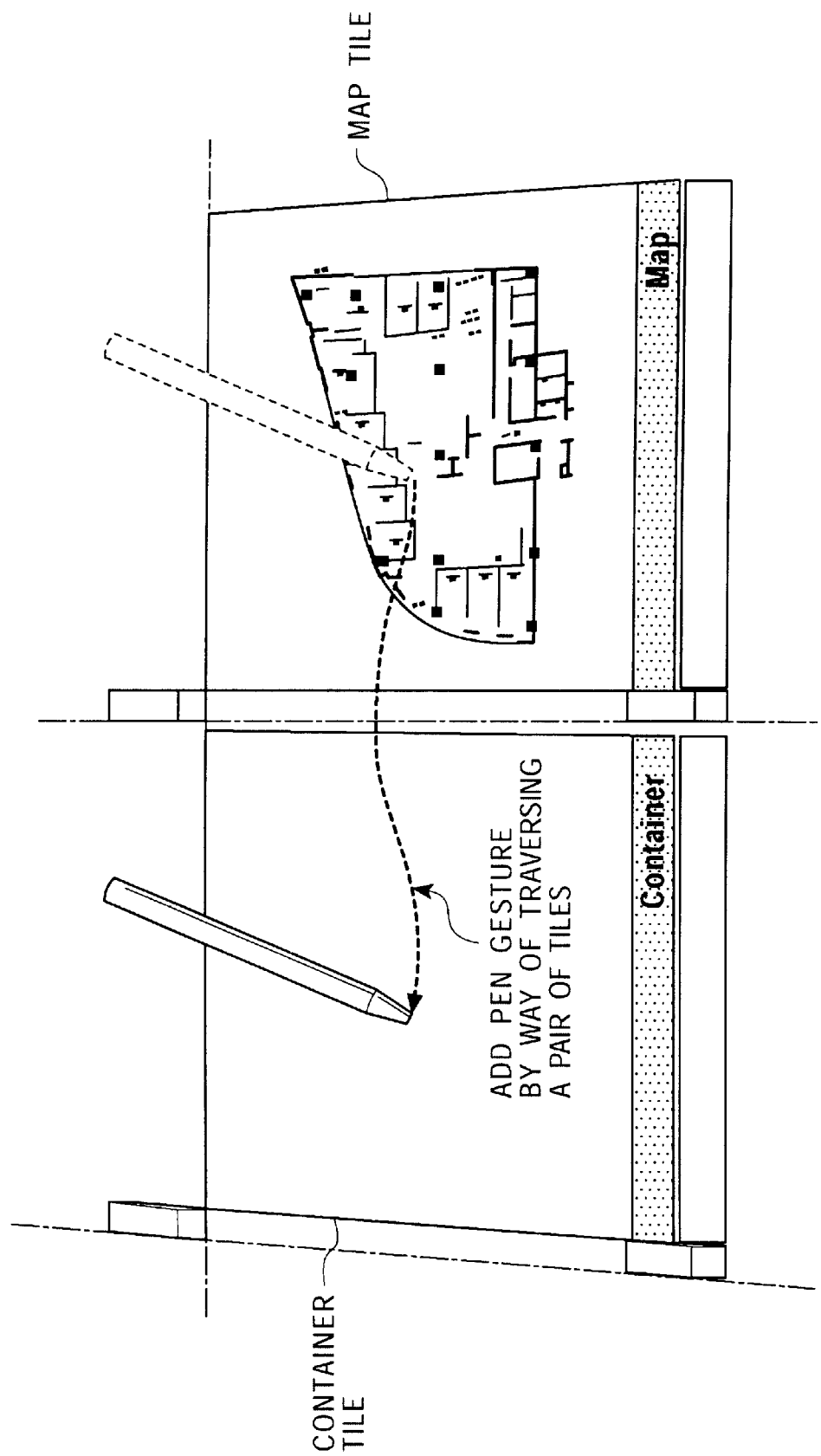
FIG. 32 designates a chart for exemplifying pen gesture for triggering discrete transfer of data; more concretely, such an aspect is shown, in which trigger forming data is effected by such a drag operation for traversing tiles.
Figure 33:
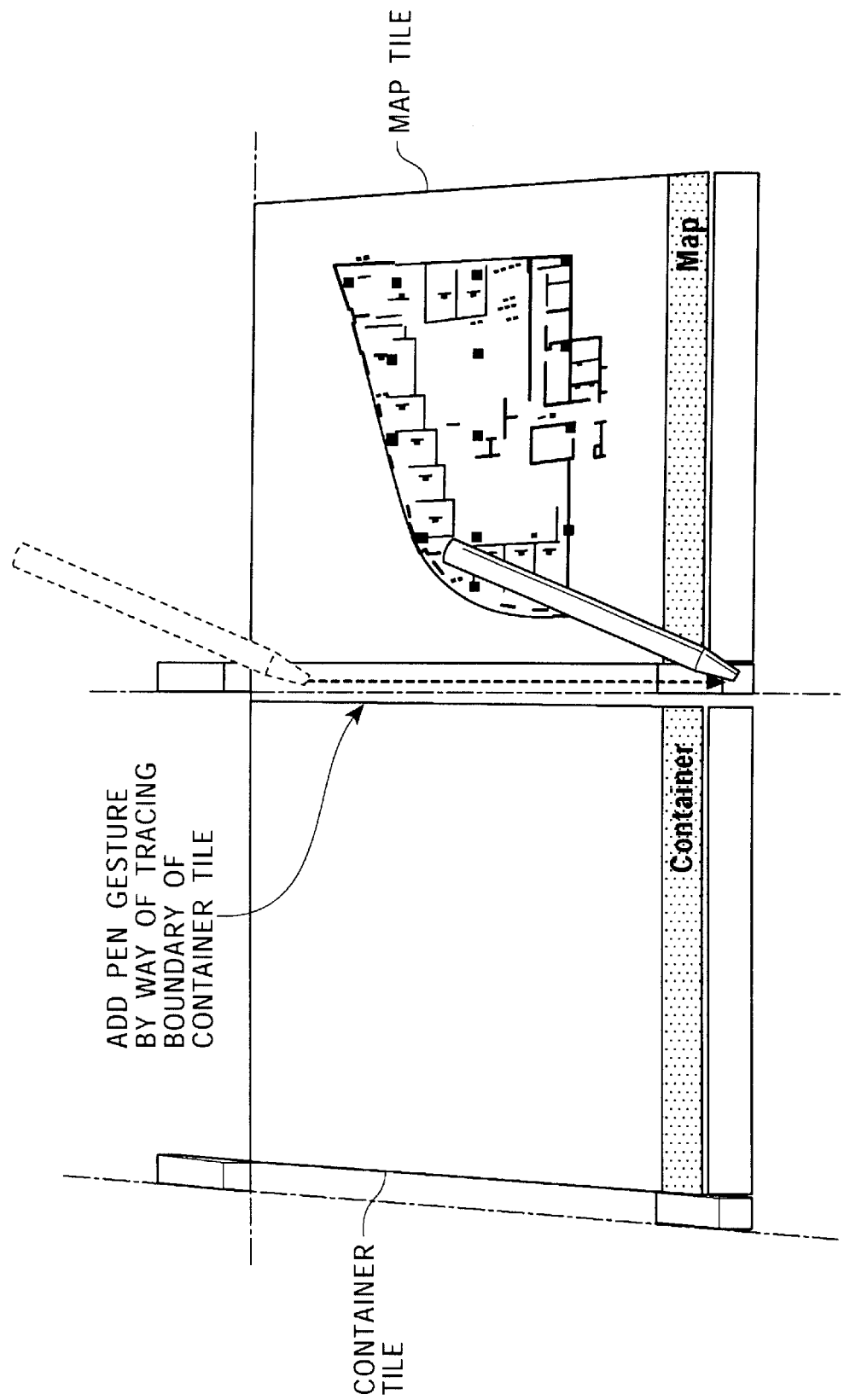
FIG. 33 designates a chart for exemplifying pen gesture for triggering discrete transfer of data; more concretely, such an aspect is shown, in which trigger for transferring data is effected by way of tracing boundary between tiles.
Figure 34:
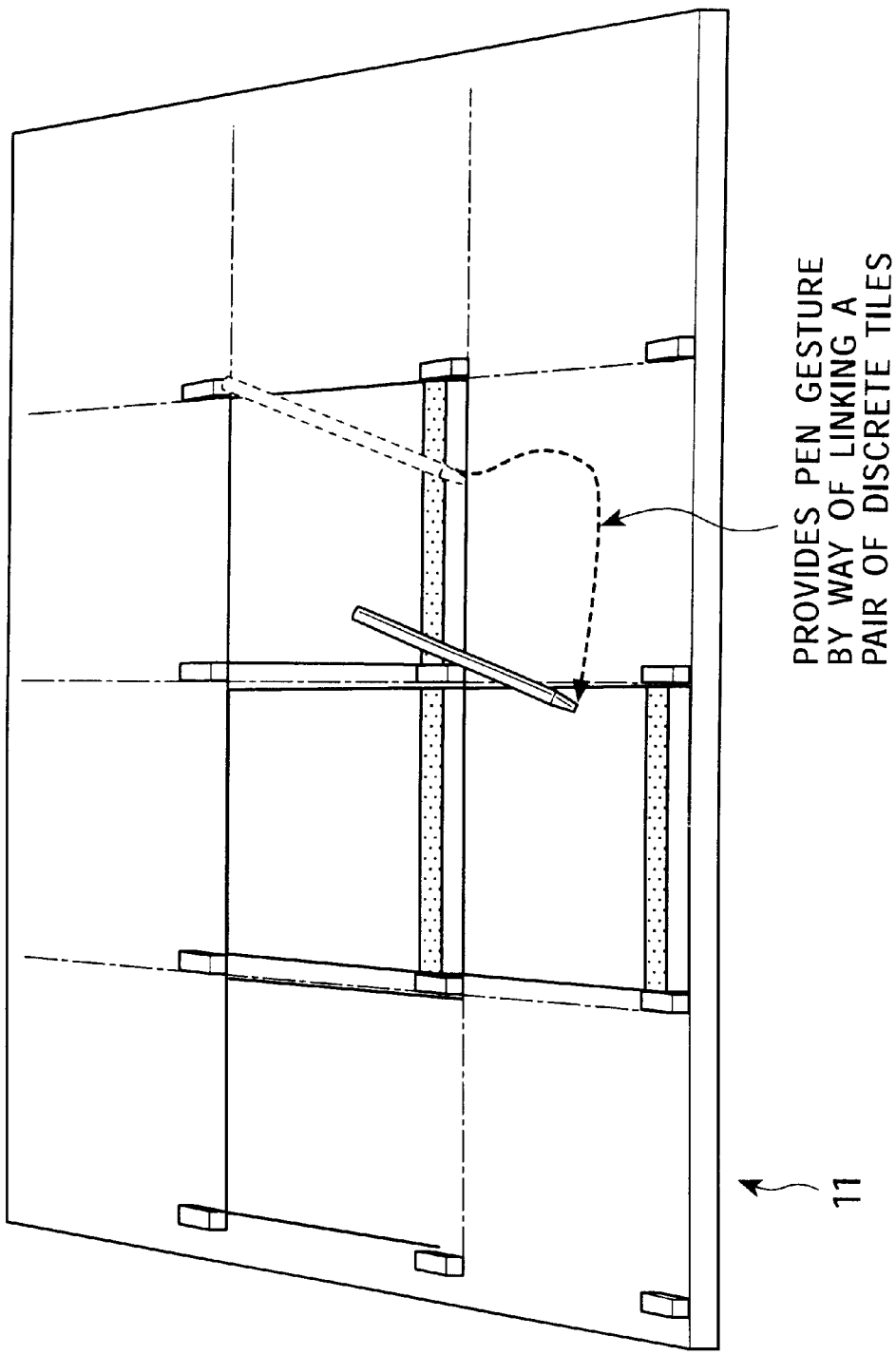
FIG. 34 designates a chart for exemplifying pen gesture for triggering discrete transfer of data; more concretely, such an aspect is shown in which trigger for transferring data is effected by way of performing pen gesture for linking a pair of discretely disposed tiles.

FIGS. 32~34 respectively exemplify such pen input gesture for triggering transfer of the discrete data. FIG. 32 exemplifies such a case in which, by way of performing drag across tiles, the data transfer process is triggered. FIG. 33 exemplifies such a case in which the data transfer process is triggered by way of tracing boundary between tiles. Further, FIG. 34 exemplifies such a case in which the data transfer is triggered by adding the pen input gesture by way of linking a pair of discretely disposed tiles with each other.

By referring to specific practical embodiments, the above description has fully explained about the present invention. However, it is quite explicit that the above embodiments may be subject to proper modification or substitution within such a scope that does not deviate from the essentials of the present invention. Concretely, scope of the present invention should not be understood definitively, but the present invention has solely been disclosed by way of typical exemplification. In order to properly judge the essential substance of the present invention, contents of the appended claims should be taken into consideration to full extent.

As described above in full detail, according to the present invention, by way of integrating a physical interface present in a real space with such a visual interface such as display for displaying logical space of a computer, it is possible to provide such a useful user interface environment capable of instinctively and intelligibly expressing it.

Further, according to the present invention, it is possible to provide such an easy user interface for supporting mutual cooperation of a large number of computers such as data communicating appliances installed in homes and offices.

Further, according to the present invention, it is possible to provide such a useful user interface environment capable of easily executing such operation for mutually connecting a plurality of apparatuses for exchanging data between individual apparatuses.

According to the present invention, by way of utilizing such a pen input type display tablet to serve as a visual interface, it is possible to visually feed back action in response to operation of a physical interface on a display tablet. Further, by way of accepting direct data inputting operation performed by a user via pen gesture, it is possible to utilize a variety of interactive techniques and provide such a user interface environment that can be expressed instinctively and intelligibly.

According to the present invention, by way of synthesizing picture image from a flat display unit through a transparent object such as a tile, it is possible to provide pen-operating function on the surface of the corresponding tile. Accordingly, it is possible to utilize a variety of interactive techniques developed via the GUI while preserving such a sense of operating an real object.

It is possible to utilize the Data-Tile system of the present invention for constituting such a digital-dashboard for controlling data communicating appliances installed in homes and offices. In addition, it is conceived that the Data-Tile system can also be applied to video editing process, educational tools, electronic toys (media toys for example), and programming tools, or the like.

For example, in terms of such a video editing tool, by way of expressing material (clip) such as moving picture and audio signal as a tile and by way of laying out related contents, it is possible to execute a video editing process. It is suggested that a variety of video effects may be expressed as a tile or the Parameter-Tile. In order to reproduce media, it is possible to utilize the Container-Tile for carrying the editing result via activation of the above-referred Time-axis-Tile. Further, by applying the same technique, it is also possible to utilize the Data-Tile system for editing music data.

In regard to educational tools and electronic toys, it is possible to execute such a programming process by way of combining a plurality of blocks as described in the Algo-Block cited earlier. According to the Data-Tile system of the present invention, inasmuch as internal condition of individual tiles can be expressed on the surface of the corresponding tiles, internal condition of program can be designated instinctively and intelligibly. Further, it is also possible to control execution of an applied program via user's pen input operation and execute an interactive process as well.

In order to expand applicable range of the Data-Tile system of the present invention, it is quite essential that many kinds of variations (such as size, thickness, and unit number that can simultaneously be disposed on a flat display unit) related to the form of tiles shall be examined. Further, it is an interesting issue to implement expansion of the scope of the existing system construction. For example, it is also possible to utilize such tiles on an identical flat display unit, where each tile incorporates a physical switching means and a simplified electronic circuit in mixture with such a passive tile solely fitted with a wireless tag mentioned earlier. It is also conceived that such function for recording voice memorandum may be formed as a tile, which is supposed to be combined with the Container-Tile or a transmission tile.

Further, it is also possible to consider that such portable appliances including a portable telephone incorporating RF-ID data and a PDA (Personal Digital Assistance) may be provided as special tile components. By way of mounting these portable appliances on a flat display unit, it is possible to exchange data with other tiles.

It is also allowable to internally combine the RF-ID data reading unit inside of a certain unit other than the flat display unit such as a rack for storing tiles. In this case, it is also practicable to inform a user of the reception of an electronic mail via blinking of the Mail-Tile stored in the rack, for example.

Annotation:

[1] Pierre Weller: "The Digital Desk Calculator", Tangible manipulation of a desk top. In proceedings of USIT 91, ACM Symposium on User Interface Software and Technology, pp. 27~34, November 1991.

[2] H. Suzuki and H. Kato: "Algo-Block"; a tangible programming language, a tool for collaborative learning. In proceedings of the 4th European Logo Conference, pp.297~303, August 1993.

[3] George W. Fitsmaurice, Hiroshi Ishii, and William Buxton, "Bricks": laying the foundations for graspable user interface. In CHI's 1995 Conference, pp 442–449, 1995.

[4] Hiroshi Ishii and Brygg Ullmer, "Tangible Bits: Towards seamless interfaces between people, bits and atoms. In CHI' 1997 Proceedings, pp. 234–241, 1997.

[5] J. J. Gibson, "The ecological approach to visual perception": Houghton Mifflin Company, 1979.

[6] Eric A. Bier, Maureen C. Stone, Ken Pier, William Buxton, and Tony DeRose, "Tool-glass and Magic Lens"; The see-through interface. In James T. Kajiya, Editor, Computer Graphics (SIGGRAPH' 93 Proceedings), Vol. 27, pp. 73–80, August 1993.

[7] Jun Rekimoto and Katashi Nagao, "The world through the computer"; Computer augmented interaction with real world environments. In proceedings of the ACM symposium on User Interface Software and Technology (USIT' 95), pp. 29–36, November 1995.

[8] Dieter Schmalsteig, Miguel Encarnacao, and Zsolt Szalavari, "Using transparent props for interaction with the virtual table": In proceedings of Interactive 3D graphics (13DG' 99), 1999.

[9] Y Tanaka and T. Imataki, "A hypermedia system allowing functional composition of active media objects through direct manipulations": In proceedings of the IFIP 11th World Computer Congress, pp. 541–546, 1998.

[10] Itiro Siio, "Infor-Binder": a pointing device for a virtual desk-top system. In the 6th International Conference on Human-Computer Interaction (HCI International '95), pp. 261–264, July 1995.

[11] John Underkoffler and Hiroshi Ishii: "Illuminating Light": An optical design tool with a luminous tangible interface. In CHI'98 proceedings, pp. 542–549, 1998.

[12] Jun Rekimoto and Masanori Saitoh: "Augmented Surfaces"; A specially continuous work-space for hybrid computing environments. In proceedings of ACM CHI'99, pp. 378–385, May 1999.

[13] Hideaki Koike, Yoichi Sato, Yoshinori Kobayashi, Hiroaki Tobita, and Motoki Kobayashi: "Interactive text book and interactive venn diagram": Natural and intuitive interfaces on augmented desk system. In CHI'2000 proceedings, pp.121–128, 2000.

[14] J. Rekimoto, Pick-and-Drop: A Direct Manipulation Technique for Multiple Computer Environments. In USIT' 97, pp. 31–39, October 1997.

What is claimed is:

1. A data input and output system comprising:
a visual interface comprising a substantially flat operating surface for accommodating disposition of a physical interface and display function for displaying data on said operating surface;
an identifying means for identifying said physical interface disposed on said operating surface;
a data processing means for executing a data processing operation in correspondence with a result of identification by said identifying means and for externally displaying a result of said execution on said visual interface; and
a digitizer for reading a pen input via said operating surface of said visual interface and also via said physical interface disposed on said operating surface; wherein
said data processing means executes a data processing operation corresponding to combination of identification data owned by said physical interface disposed on said operating surface and said pen input operation added to said physical interface.

2. The data input and output system according to claim 1, wherein
a plurality of said physical interfaces may be disposed on said operating surface of said visual interface; and
said data processing means executes such a data processing operation corresponding to combination of identification data owned by two or more than two of said physical interfaces disposed on said operating surface and said pen input added to said physical interfaces.

3. The data input and output system according to claim 1, wherein
in response to the pen input added across two or more than two of said physical interfaces disposed to positions adjacent to said operating surface, said data processing means assigns data stored in one of said physical interfaces to the other physical interface.

4. The data input and output system according to claim 1, further comprising:
a digitizer for reading a pen input via said operating surface of said visual interface and also via said physical interface disposed on said operating surface; wherein
in response to the pen input added across two or more than two of said physical interfaces disposed to positions adjacent to said operating surface, said data processing means assigns data stored in one of said physical interfaces, and then, displays said assigned data at a position at which the other physical interface is disposed.

5. A data input and output system comprising:
a visual interface comprising a substantially flat operating surface for accommodating disposition of a physical interface and display function for displaying data on said operating surface;
an identifying means for identifying said physical interface disposed on said operating surface;
a data processing means for executing a data processing operation in correspondence with a result of identification by said identifying means and for externally displaying a result of said execution on said visual interface; and
wherein in response result of detecting a predetermined identification data from said physical interface disposed on said operating surface of said visual interface, said data processing means assigns data held by another physical interface adjacent to said physical interface to a remotely disposed physical interface related to said another physical interface, and then, displays said assigned data to a position at which said remotely disposed said physical interface is present.

6. A method of inputting and outputting data which provides an interactive technique via a physical interface on a substantially flat operating surface for accommodating disposition of said physical interface and also on a visual interface incorporating display function for displaying data on said operating surface; said data input and output method comprising the steps of:
a step of identifying said physical interface disposed on said operating surface;
a data processing step for initially executing a data processing operation in correspondence with identified result generated via said identifying step followed by a step of displaying processed result on said visual interface; and a digitizing step for reading a pen input via said operating surface of said visual interface and also via said physical interface disposed on said operating surface; wherein said data processing step executes a data processing operation corresponding to combination of identification data owned by said physical interface disposed on said operating surface and said pen input added to said physical interface.

7. A method of inputting and outputting data which provides an interactive technique via a physical interface on a substantially flat operating surface for accommodating disposition of said physical interface and also on a visual interface incorporating display function for displaying data on said operating surface; said data input and output method comprising the steps of:

a step of identifying said physical interface disposed on said operating surface;

a data processing step for initially executing a data processing operation in correspondence with identified result generated via said identifying step followed by a step of displaying processed result on said visual interface; and a digitizing step for reading a pen input via said operating surface of said visual interface and also via said physical interface disposed on said operating surface; wherein a plurality of physical interfaces can be disposed on said operating surface of said visual interface; and said data processing step executes a data processing operation in correspondence with combination of identification data owned by two or more than two of said physical interfaces disposed on said operating surface and said pen input added to said physical interface.

8. The data input and output method according to claim 7, wherein, in response to result of detecting a predetermined identification data from said physical interface disposed on said operating surface of said visual interface, said data processing step assigns such data held by one of said physical interfaces adjacent to said physical interface to said physical interface, and then, displays said assigned data at a position at which said physical interface is disposed.

9. The data input and output method according to claim 7, wherein, in response to result of detecting a predetermined identification data from said physical interface disposed on said operating surface of said visual interface, said data processing step assigns such data held by one of said physical interfaces adjacent to said physical interface to a remotely disposed said physical interface related to said physical interface, and then, displays said assigned data at a position at which said physical interface is disposed.

10. The data input and output method according to claim 7, wherein, in response to addition of pen operation across two or more than two of said physical interfaces adjacent to said operating surface, said data processing step assigns data stored in one of said physical interfaces to another physical interface.

11. The data input and output method according to claim 7, wherein, in response to addition of said pen operation across two or more than two of said physical interfaces adjacent to said operating surface, said data processing step assigns data stored in one of said physical interfaces to another physical interface, and then, displays said assigned data at a position at which said another physical interface is disposed.

* * * * *